US010241307B2

(12) United States Patent
Kawamura

(10) Patent No.: US 10,241,307 B2
(45) Date of Patent: Mar. 26, 2019

(54) IMAGE FORMING LENS SYSTEM AND IMAGE PICKUP APPARATUS INCLUDING THE SAME

(71) Applicant: OLYMPUS CORPORATION, Hachioji-shi, Tokyo (JP)

(72) Inventor: Kazuteru Kawamura, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/818,990

(22) Filed: Nov. 21, 2017

(65) Prior Publication Data

US 2018/0172959 A1    Jun. 21, 2018

(30) Foreign Application Priority Data

Dec. 15, 2016 (JP) .................................. 2016-243855

(51) Int. Cl.
G02B 3/02 (2006.01)
G02B 13/02 (2006.01)
G02B 9/64 (2006.01)
G02B 13/18 (2006.01)

(52) U.S. Cl.
CPC ............... *G02B 13/02* (2013.01); *G02B 9/64* (2013.01); *G02B 13/18* (2013.01)

(58) Field of Classification Search
CPC .................................................... G02B 13/02
USPC ........................................................ 359/708
See application file for complete search history.

(56) References Cited

U.S. PATENT DOCUMENTS

| 7,626,771 B2 | 12/2009 | Yokoyama |
| 7,715,116 B2 | 5/2010 | Kato |
| 8,988,792 B2 * | 3/2015 | Fujimoto ............... G02B 13/02 359/754 |

FOREIGN PATENT DOCUMENTS

| JP | 2008261969 A | 10/2008 |
| JP | 2009139543 A | 6/2009 |
| JP | 2012145789 A | 8/2012 |
| JP | 2013250293 A | 12/2013 |

* cited by examiner

Primary Examiner — James Jones
(74) Attorney, Agent, or Firm — Holtz, Holtz & Volek PC

(57) ABSTRACT

An image forming lens system includes a first lens unit having a positive refractive power, a second lens unit having a negative refractive power, and a third lens unit. The first lens unit includes in order from the object side, a front-side lens unit having a positive refractive power and a rear-side lens unit. The second lens unit moves at a time of focusing. The third lens unit has a positive lens element. The rear-side lens unit includes a negative lens element and a positive lens element. The front-side lens unit has an aspherical surface having a positive refractive power on an axis, or the rear-side lens unit has an aspherical surface having a negative refractive power on an axis. The lens element closest to the object side in the first lens unit is fixed in position. Following Conditional Expression (9) is satisfied:

$$0.06 \leq |fG2/f| \leq 0.195 \qquad (9).$$

50 Claims, 22 Drawing Sheets

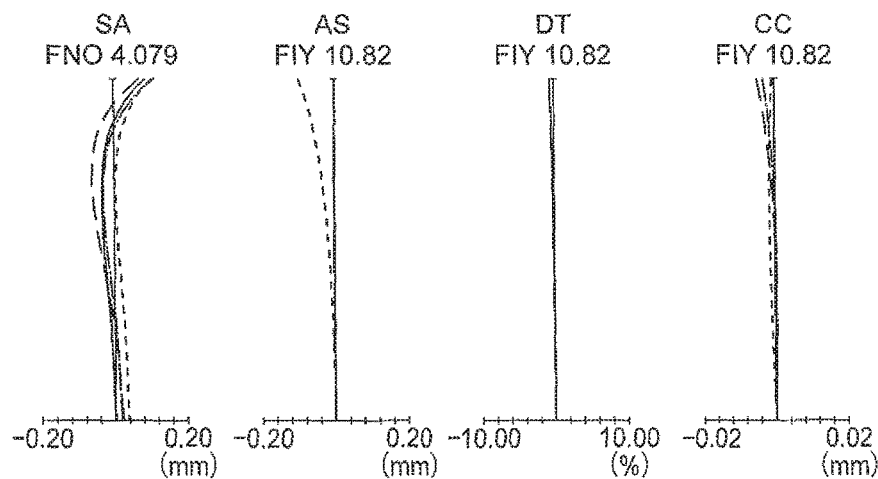
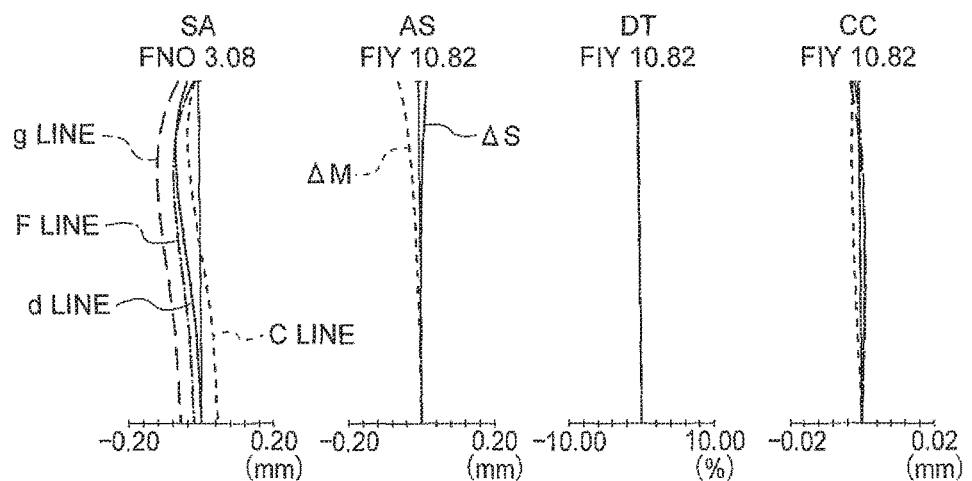

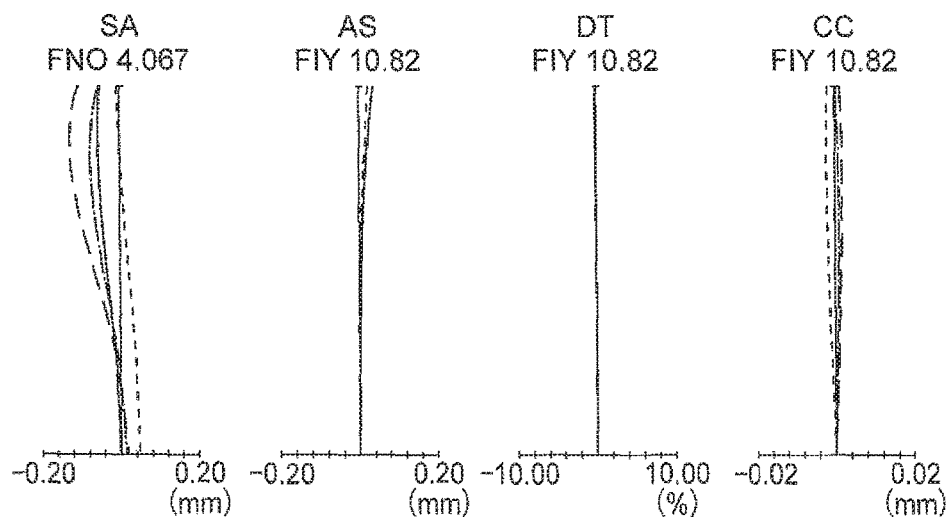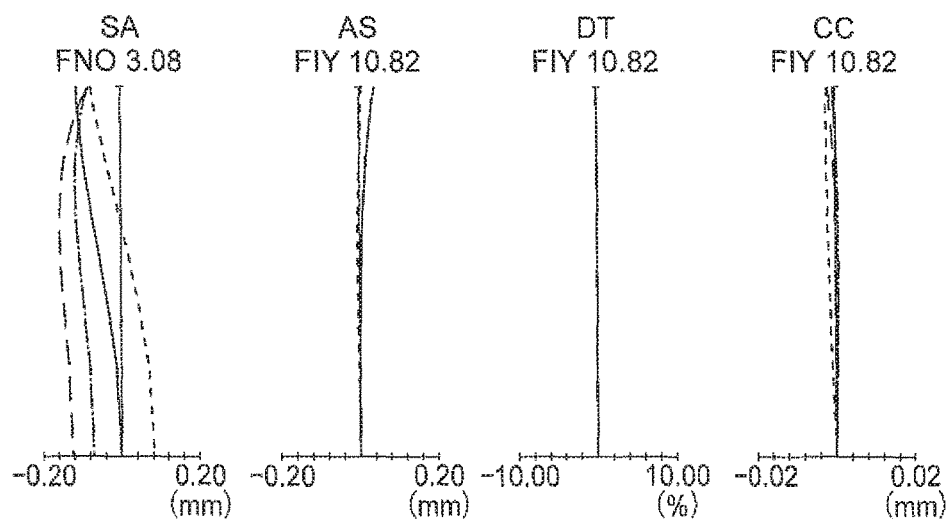

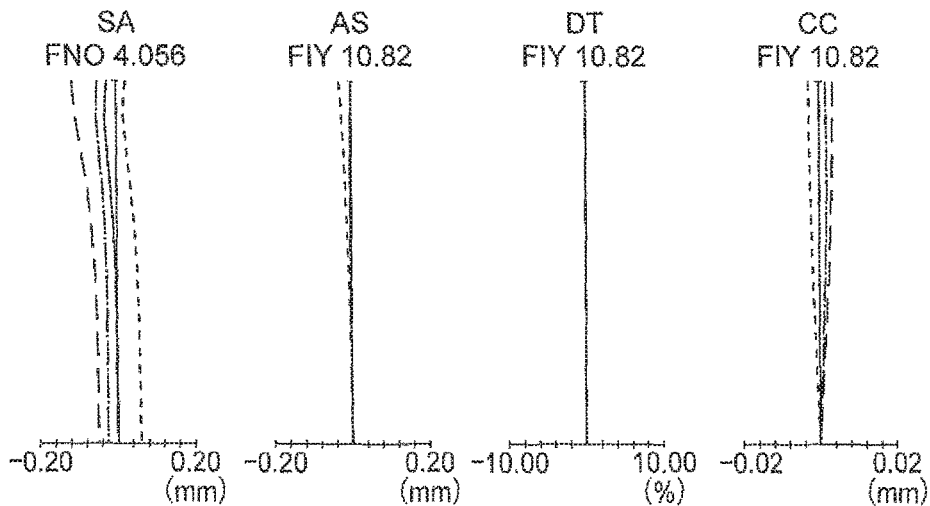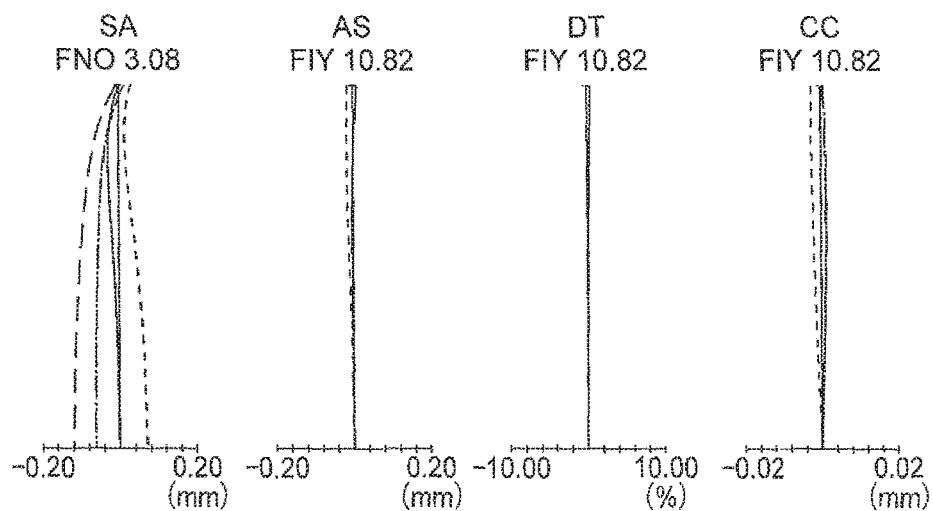

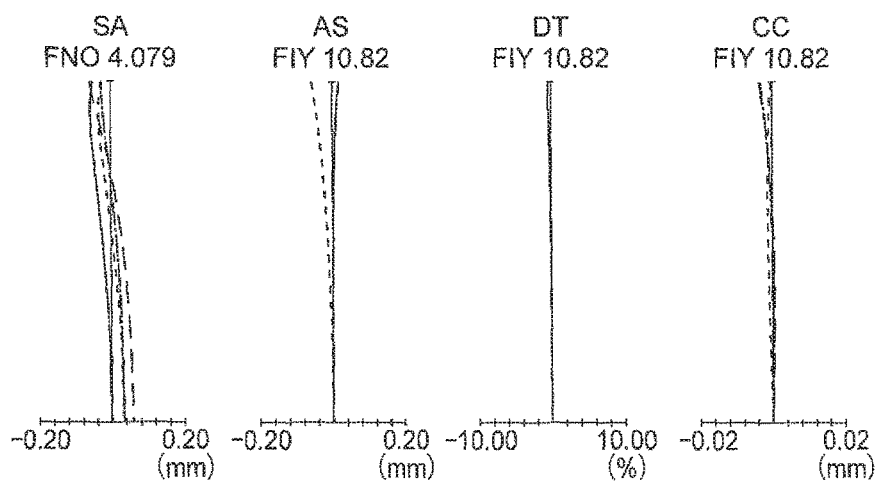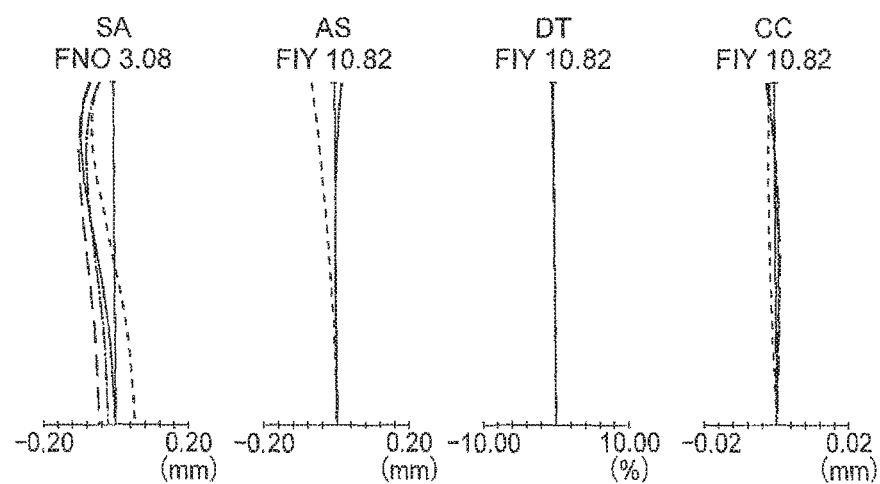

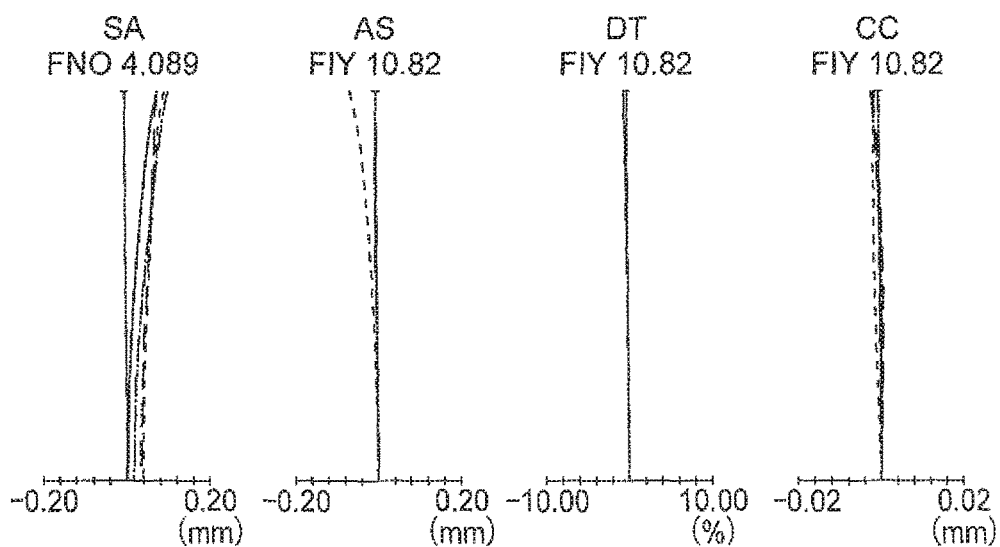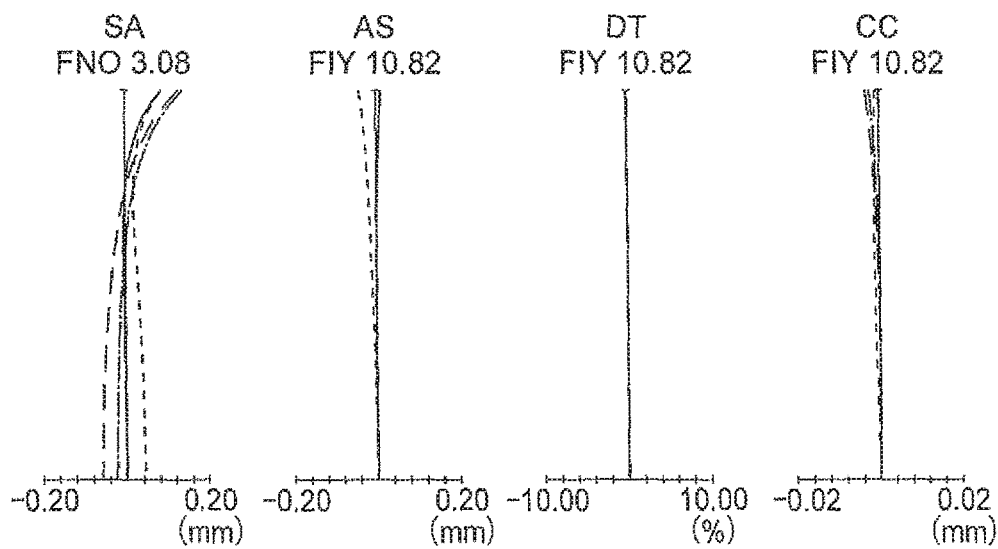

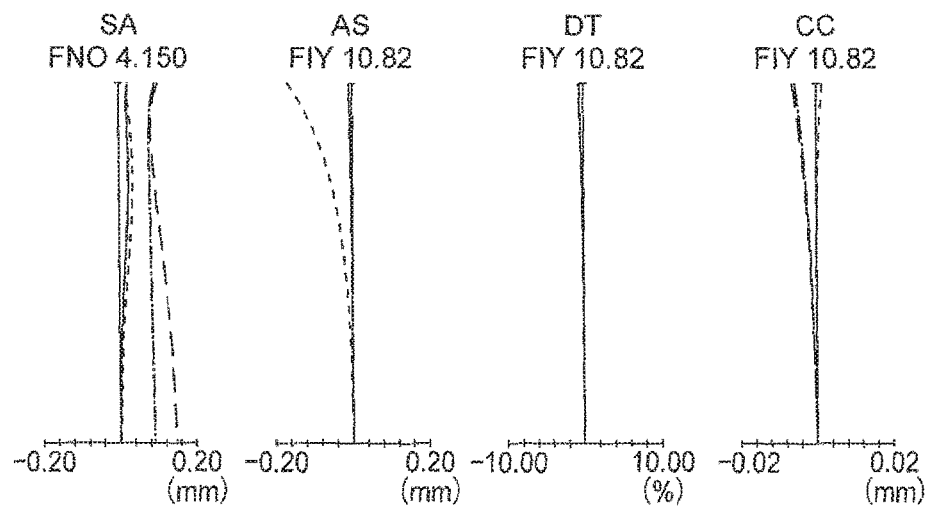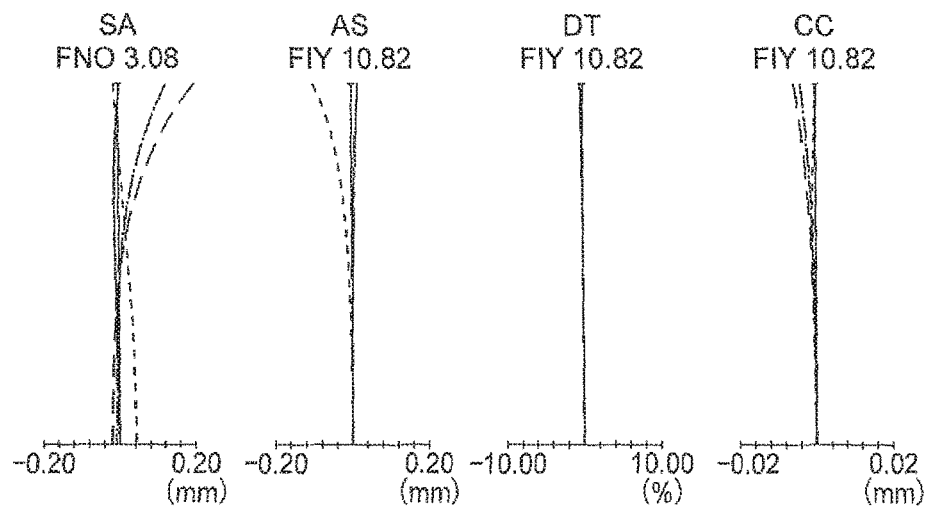

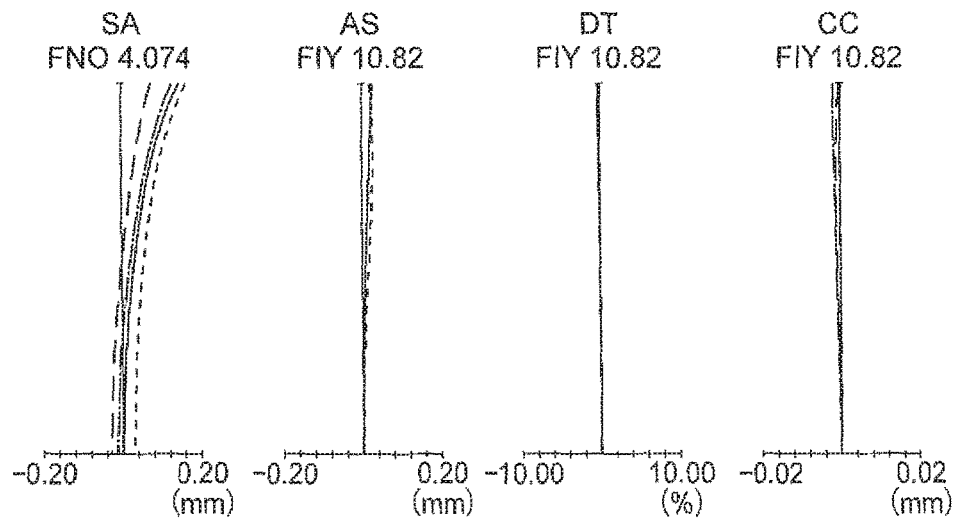
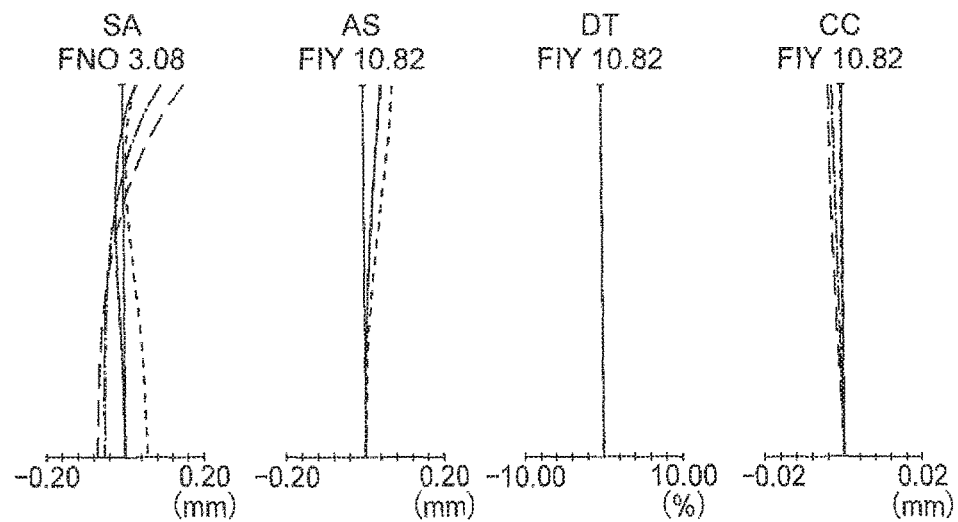

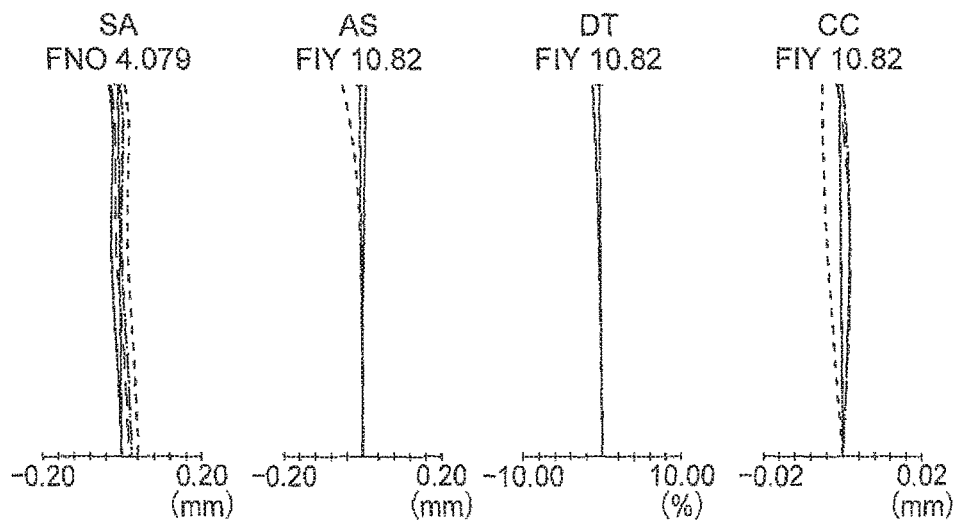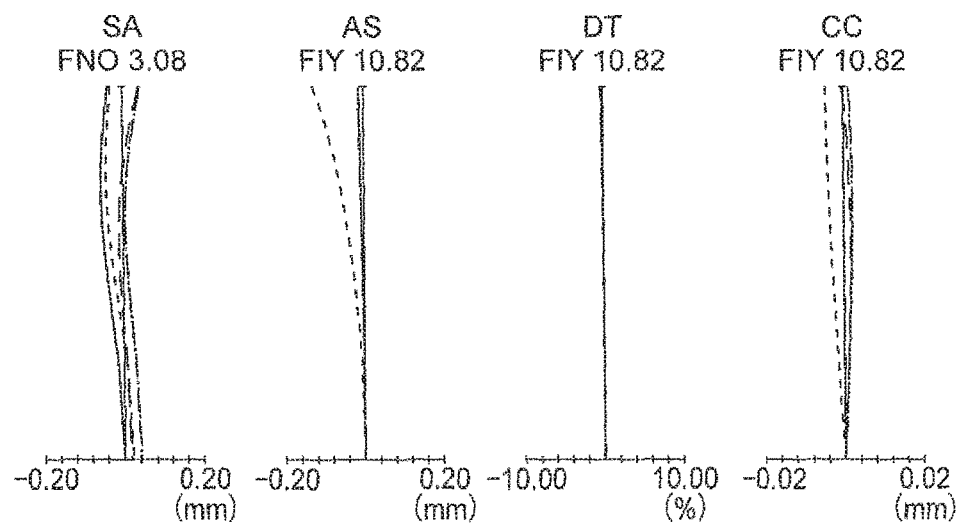

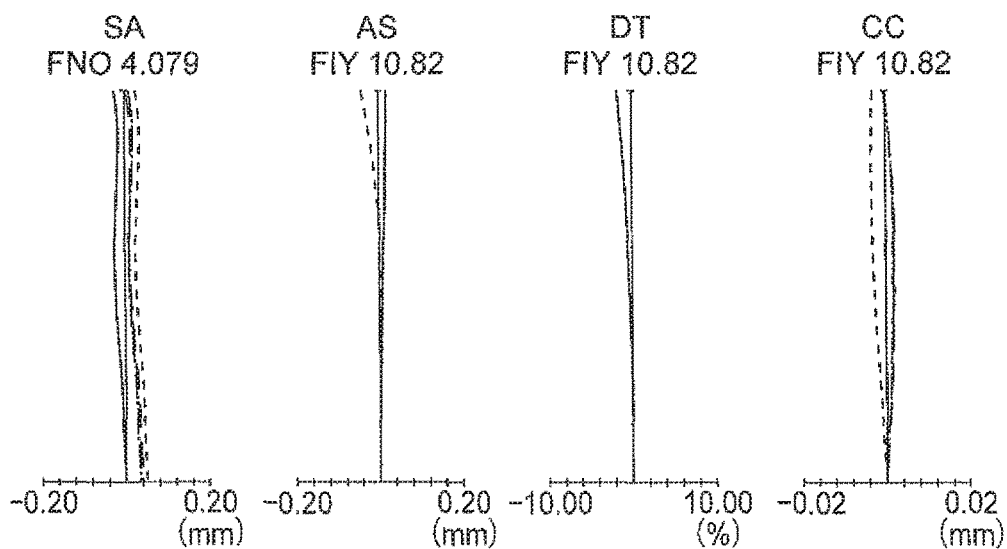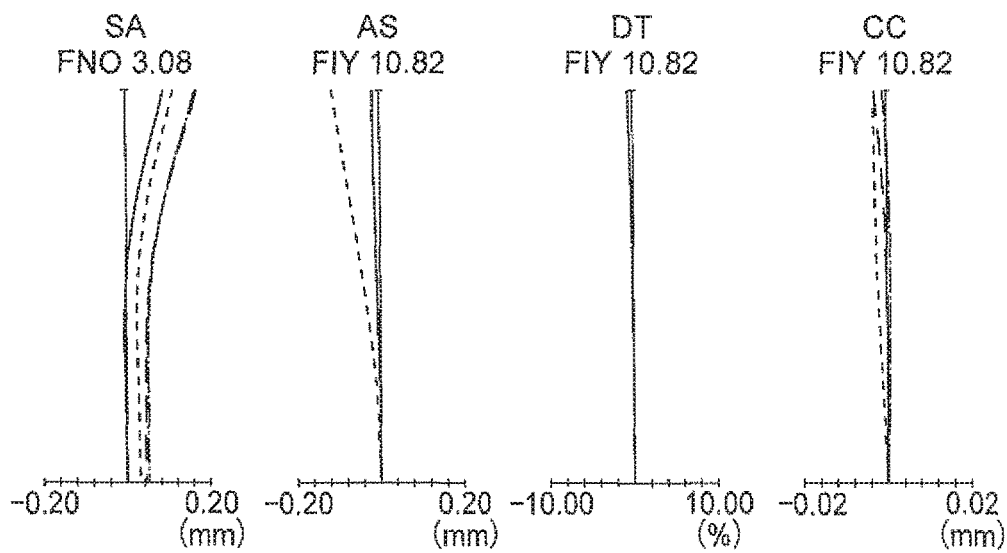

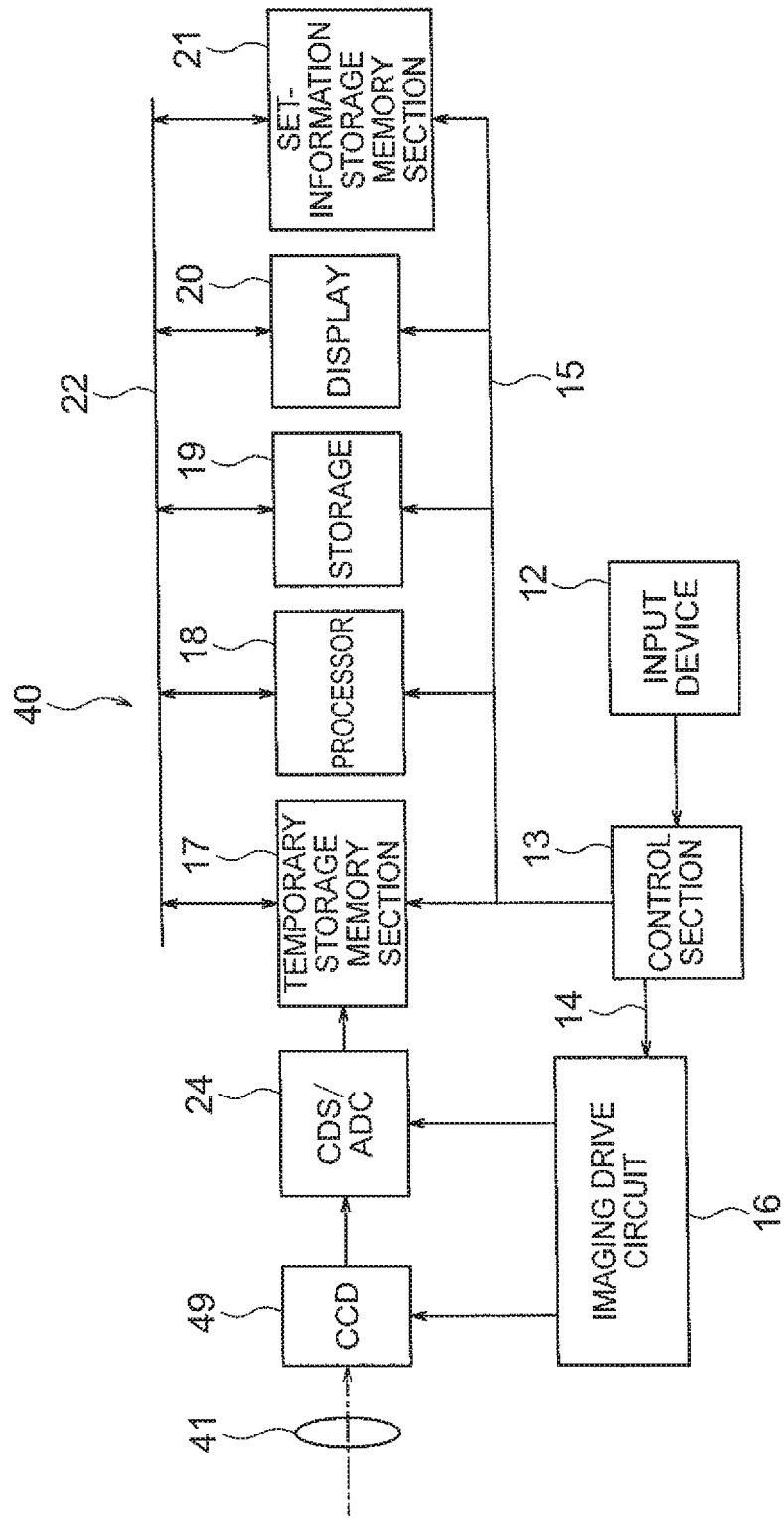

IMAGE FORMING LENS SYSTEM AND IMAGE PICKUP APPARATUS INCLUDING THE SAME

CROSS-REFERENCE TO RELATED APPLICATION

The present application is based upon and claims the benefit of priority from the prior Japanese Patent Application No. 2016-243855 filed on Dec. 15, 2016; the entire contents of which are incorporated herein by reference.

BACKGROUND OF THE INVENTION

Field of the Invention

The present invention relates to an image forming lens system and an image pickup apparatus including the same.

Description of the Related Art

Photography using a telephoto lens or a super-telephoto lens (hereinafter referred to as "telephoto lens") has the effect of making a distant subject or a small subject appear in front of the photographer. For this reason, telephoto lenses are widely used in various scenes such as taking photographs of sports scenes, taking photographs of wild animals such as wild birds, and astrophotography.

Examples of telephoto lenses for use in taking photographs of such scenes are disclosed in Japanese Patent Application Laid-open Nos. 2009-139543 (first example), 2008-261969 (third example), 2013-250293 (third example), and 2012-145789 (first example).

SUMMARY OF THE INVENTION

An image forming lens system of the present invention comprises:
in order from an object side to an image side,
a first lens unit having a positive refractive power;
a second lens unit having a negative refractive power; and
a third lens unit,
wherein
the first lens unit includes in order from the object side, a front-side lens unit having a positive refractive power and a rear-side lens unit with an air space interposed therebetween,
the second lens unit moves by changing respective air spaces on the object side and the image side at a time of focusing,
the third lens unit includes a positive lens element,
the rear-side lens unit includes a negative lens element and a positive lens element,
the front-side lens unit has an aspherical surface having a positive refractive power on an axis and in which an absolute value of a radius of curvature in any effective region off the axis is larger than an absolute value of a radius of curvature on the axis on a plane including an optical axis, or
the rear-side lens unit has an aspherical surface having a negative refractive power on an axis and in which an absolute value of a radius of curvature in any effective region off the axis is larger than an absolute value of a radius of curvature on the axis on a plane including an optical axis,
a lens element closest to the object side in the first lens unit is fixed in position, and
following Conditional Expression (9) is satisfied:

$$0.06 \le |fG2/f| \le 0.195 \tag{9}$$

where
fG2 is a focal length of the second lens unit,
f is a longest focal length of the entire image forming lens system at a time of focusing to a furthest distance, and
a lens element is a lens having two refractive surfaces which are an object-side surface and an image-side surface, and having no other refractive surface between the two refractive surfaces.

Furthermore, another image forming lens system of the present invention comprises:
in order from an object side to an image side,
a first lens unit having a positive refractive power;
a second lens unit having a negative refractive power; and
a third lens unit,
wherein
the first lens unit includes in order from the object side, a front-side lens unit having a positive refractive power and a rear-side lens unit with an air space interposed therebetween,
the second lens unit moves by changing respective air spaces on the object side and the image side at a time of focusing,
the third lens unit includes a positive lens element,
the rear-side lens unit includes a negative lens element and a positive lens element,
the front-side lens unit has an aspherical surface having a positive refractive power on an axis and in which an absolute value of a radius of curvature in any effective region off the axis is larger than an absolute value of a radius of curvature on the axis on a plane including an optical axis, or
the rear-side lens unit has an aspherical surface having a negative refractive power on an axis and in which an absolute value of a radius of curvature in any effective region off the axis is larger than an absolute value of a radius of curvature on the axis on a plane including an optical axis,
a lens element closest to the object side in the first lens unit is fixed in position,
an aperture stop that restricts on-axis luminous flux is disposed between the first lens unit and the second lens unit, and
following Conditional Expression (9-1) is satisfied:

$$0.04 \le |fG2/f| \le 0.41 \tag{9-1}$$

where
fG2 is a focal length of the second lens unit,
f is a longest focal length of the entire image forming lens system at a time of focusing to a furthest distance, and
a lens element is a lens having two refractive surfaces which are an object-side surface and an image-side surface, and having no other refractive surface between the two refractive surfaces.

Furthermore, another image forming lens system of the present invention comprises:
in order from an object side to an image side,
a first lens unit having a positive refractive power;
a second lens unit having a negative refractive power; and
a third lens unit,
wherein
the first lens unit includes in order from the object side, a front-side lens unit having a positive refractive power and a rear-side lens unit with an air space interposed therebetween,
the second lens unit moves by changing respective air spaces on the object side and the image side at a time of focusing,
the third lens unit has a positive lens element,
each lens element in the front-side lens unit is a lens element that satisfies following Conditional Expression (a), the rear-side lens unit includes a negative lens element and a positive lens element, the front-side lens unit has an aspherical surface having a positive refractive power on an axis and in which an absolute value of a radius of curvature in any effective region off the axis is larger than an absolute value of a radius of curvature on the axis on a plane including an optical axis, or the rear-side lens unit has an aspherical surface having a negative refractive power on an axis and in which an absolute value of a radius of curvature in any effective region off the axis is larger than an absolute value of a radius of curvature on the axis on a plane including an optical axis, and following Conditional Expression (1) is satisfied:

$$-0.7 \leq f/f\text{Lens} \tag{a}$$

$$0.015 \leq \Delta GFGR/f \leq 0.25 \tag{1}$$

where f is a longest focal length of the entire image forming lens system at a time of focusing to a furthest distance, fLens is a focal length of each lens element in the front-side lens unit, ΔGFGR is an on-axis air space from an image-side surface in the front-side lens unit to an object-side surface in the rear-side lens unit, and a lens element is a lens having two refractive surfaces which are an object-side surface and an image-side surface, and having no other refractive surface between the two refractive surfaces.

Furthermore, another image forming lens system of the present invention comprises:

in order from an object side to an image side,
a first lens unit having a positive refractive power;
a second lens unit having a negative refractive power; and
a third lens unit,
wherein
the first lens unit includes in order from the object side, a front-side lens unit having a positive refractive power and a rear-side lens unit with an air space interposed therebetween, the second lens unit moves by changing respective air spaces on the object side and the image side at a time of focusing, the third lens unit includes a positive lens element, each lens element in the front-side lens unit does not include a predetermined negative lens element that satisfies following Conditional Expression (b), the rear-side lens unit includes a negative lens element and a positive lens element, the front-side lens unit has an aspherical surface having a positive refractive power on an axis and in which an absolute value of a radius of curvature in any effective region off the axis is larger than an absolute value of a radius of curvature on the axis on a plane including an optical axis, or the rear-side lens unit has an aspherical surface having a negative refractive power on an axis and in which an absolute value of a radius of curvature in any effective region off the axis is larger than an absolute value of a radius of curvature on the axis on a plane including an optical axis, and following Conditional Expression (1) is satisfied:

$$0.02 \leq DNx/\varphi enp \tag{b}$$

$$0.015 \leq \Delta GFGR/f \leq 0.25 \tag{1}$$

where

DNx is a thickness on an optical axis of the predetermined negative lens element, φenp is a maximum diameter of an entrance pupil of the image forming lens system in a state of achieving a longest focal length at a time of focusing to a furthest distance, f is a longest focal length of the entire image forming lens system at a time of focusing to a furthest distance, ΔGFGR is an on-axis air space from an image-side surface in the front-side lens unit to an object-side surface in the rear-side lens unit, and a lens element is a lens having two refractive surfaces which are an object-side surface and an image-side surface, and having no other refractive surface between the two refractive surfaces.

Furthermore, another image forming lens system of the present invention comprises:

in order from an object side to an image side,
a first lens unit having a positive refractive power;
a second lens unit having a negative refractive power; and
a third lens unit,
wherein
the first lens unit includes in order from the object side, a front-side lens unit having a positive refractive power and a rear-side lens unit with an air space interposed therebetween, the second lens unit moves by changing respective air spaces on the object side and the image side at a time of focusing, the third lens unit includes a positive lens element, the rear-side lens unit includes a negative lens element and a positive lens element, each lens element in the front-side lens unit is a lens element that satisfies following Conditional Expression (a), or each lens element in the front-side lens unit does not include a predetermined negative lens element that satisfies following Conditional Expression (b), and following Conditional Expressions (1), (9-2), and (3") are satisfied:

$$-0.7 \leq f/f\text{Lens} \tag{a}$$

$$0.02 \leq DNx/\varphi enp \tag{b}$$

$$0.015 \leq \Delta GFGR/f \leq 0.25 \tag{1}$$

$$0.06 \leq |fG2/f| \leq 0.22 \tag{9-2}$$

$$77 \leq vdGFave \tag{3"}$$

where f is a longest focal length of the entire image forming lens system at a time of focusing to a furthest distance, fLens is a focal length of each lens element in the front-side lens unit, DNx is a thickness on an optical axis of the predetermined negative lens element, φenp is a maximum diameter of an entrance pupil of the image forming lens system in a state of achieving a longest focal length at a time of focusing to a furthest distance, ΔGFGR is an on-axis air space from an image-side surface in the front-side lens unit to an object-side surface in the rear-side lens unit, fG2 is a focal length of the second lens unit, vdGFave is an average Abbe number of positive lens elements in the front-side lens unit, and a lens element is a lens having two refractive surfaces which are an object-side surface and an image-side surface, and having no other refractive surface between the two refractive surfaces.

Furthermore, an image pickup apparatus of the present invention comprises:

an optical system; and an image pickup element having an image plane and converting an image formed on the image plane by the optical system to an electrical signal, wherein the optical system is any one of the image forming lens systems described above.

BRIEF DESCRIPTION OF THE DRAWINGS

FIG. 10A, FIG. 10B, FIG. 10C, FIG. 10D, FIG. 10E, FIG. 10F, FIG. 10G, and FIG. 10H are aberration diagrams of the image forming lens system of Example 1;

FIG. 11A, FIG. 11B, FIG. 11C, FIG. 11D, FIG. 11E, FIG. 11F, FIG. 11G, and FIG. 11H are aberration diagrams of the image forming lens system of Example 2;

FIG. 12A, FIG. 12B, FIG. 12C, FIG. 12D, FIG. 12E, FIG. 12F, FIG. 12G, and FIG. 12H are aberration diagrams of the image forming lens system of Example 3;

FIG. 13A, FIG. 13B, FIG. 13C, FIG. 13D, FIG. 13E, FIG. 13F, FIG. 13G, and FIG. 13H are aberration diagrams of the image forming lens system of Example 4;

FIG. 14A, FIG. 14B, FIG. 14C, FIG. 14D, FIG. 14E, FIG. 14F, FIG. 14G, and FIG. 14H are aberration diagrams of the image forming lens system of Example 5;

FIG. 15A, FIG. 15B, FIG. 15C, FIG. 15D, FIG. 15E, FIG. 15F, FIG. 15G, and FIG. 15H are aberration diagrams of the image forming lens system of Example 6;

FIG. 16A, FIG. 16B, FIG. 16C, FIG. 16D, FIG. 16E, FIG. 16F, FIG. 16G, and FIG. 16H are aberration diagrams of the image forming lens system of Example 7;

FIG. 17A, FIG. 17B, FIG. 17C, FIG. 17D, FIG. 17E, FIG. 17F, FIG. 17G, and FIG. 17H are aberration diagrams of the image forming lens system of Example 8;

FIG. 18A, FIG. 18B, FIG. 18C, FIG. 18D, FIG. 18E, FIG. 18F, FIG. 18G, and FIG. 18H are aberration diagrams of the image forming lens system of Example 9;

FIG. 22 is a configuration block diagram of an internal circuit of the main part of the image pickup apparatus.

DETAILED DESCRIPTION OF THE INVENTION

Figure 1A:
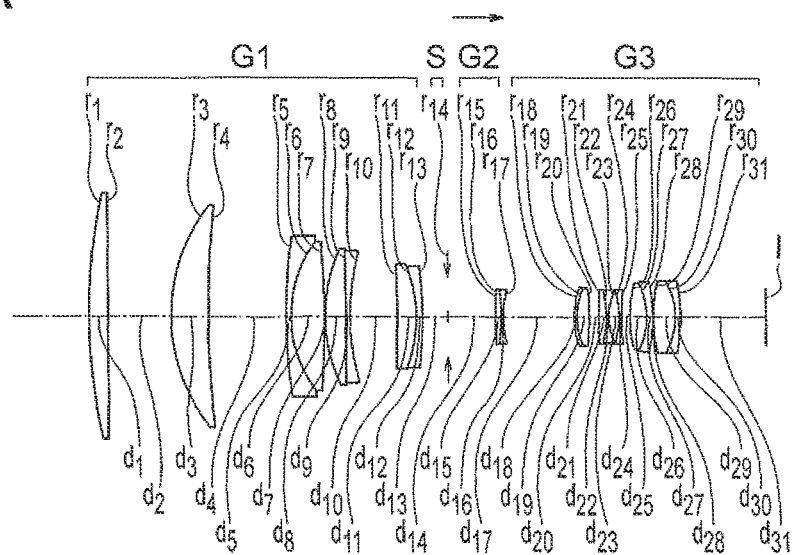
FIG. 1A and FIG. 1B are lens cross-sectional diagrams of an image forming lens system of Example 1.
Figure 1B:
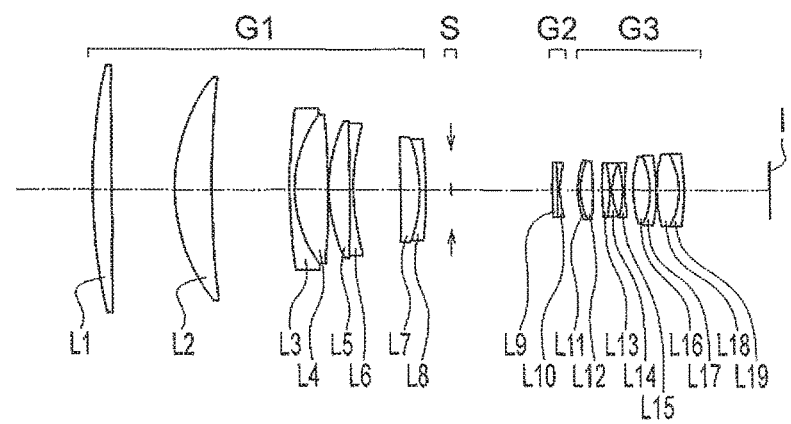
Figure 2A:
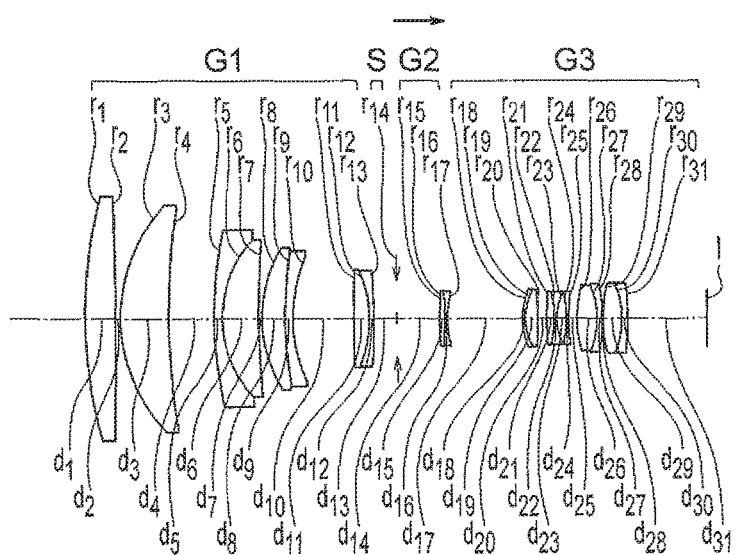
FIG. 2A and FIG. 2B are lens cross-sectional diagrams of an image forming lens system of Example 2.
Figure 2B:
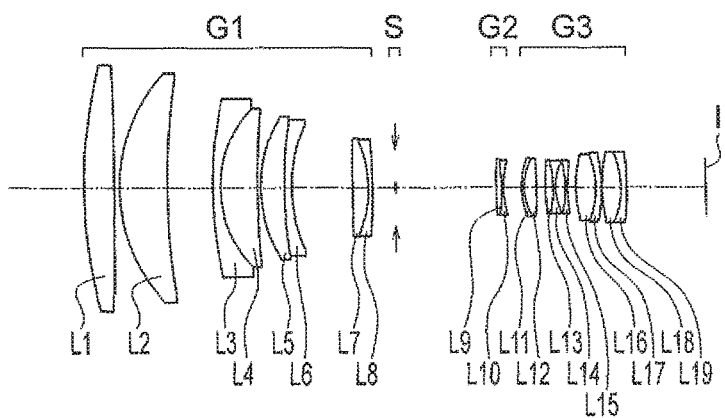
Figure 3A:
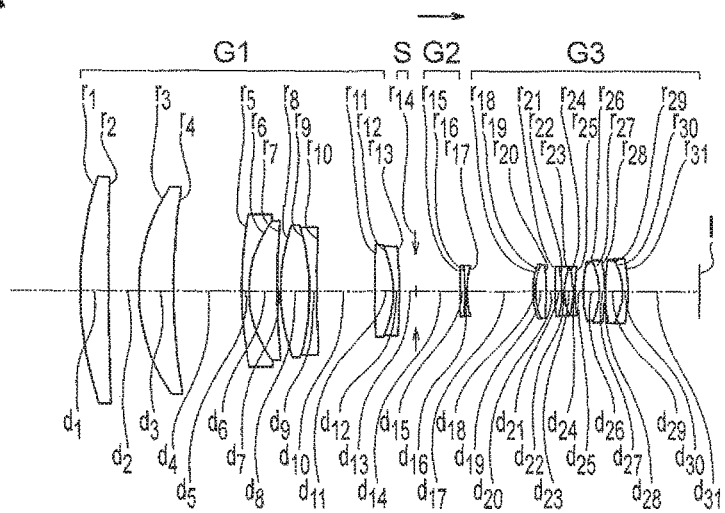
FIG. 3A and FIG. 3B are lens cross-sectional diagrams of an image forming lens system of Example 3.
Figure 3B:
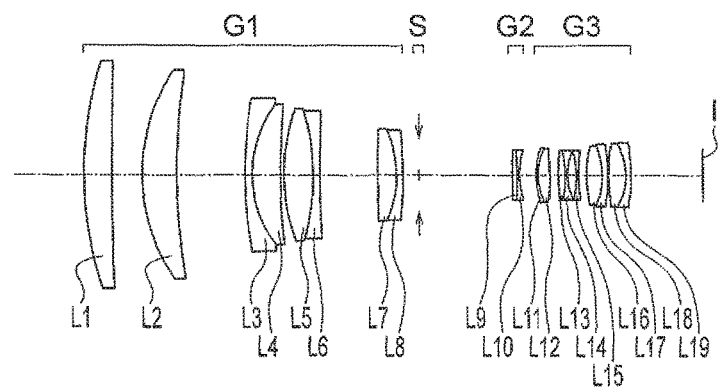
Figure 4A:
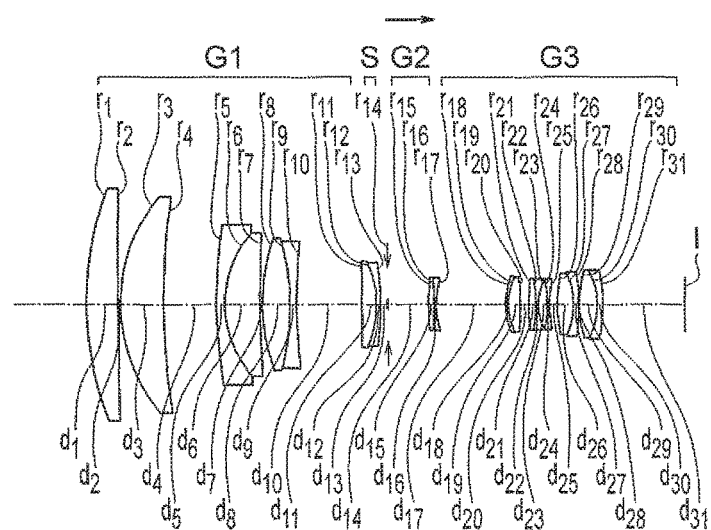
FIG. 4A and FIG. 4B are lens cross-sectional diagrams of an image forming lens system of Example 4.
Figure 4B:
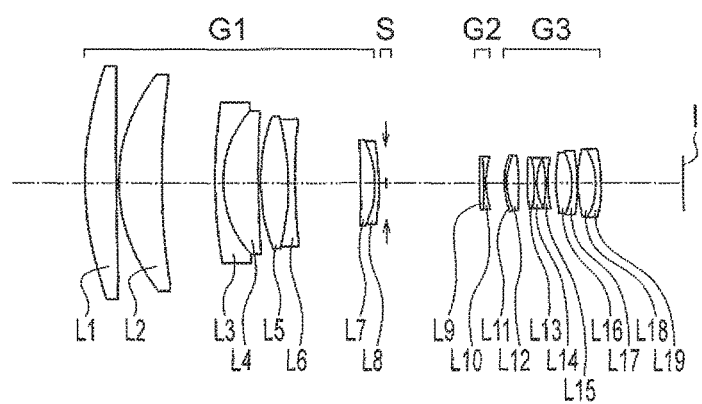
Figure 5A:
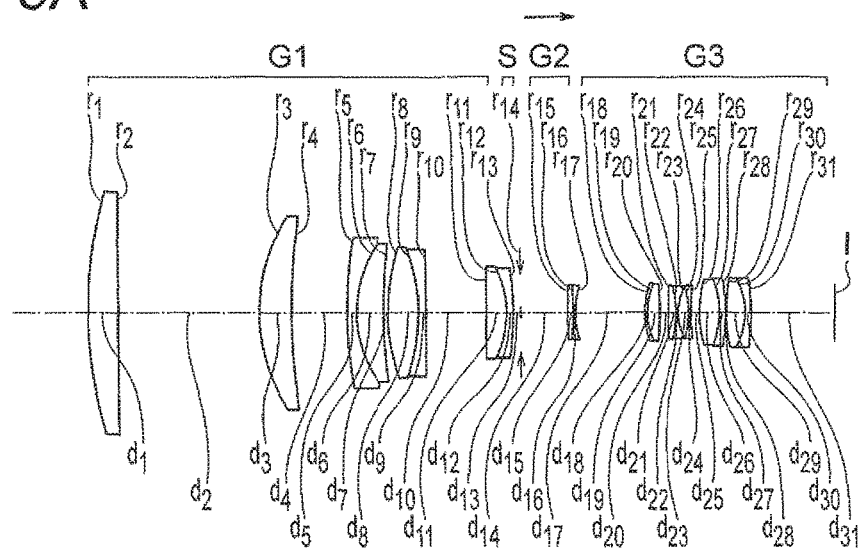
FIG. 5A and FIG. 5B are lens cross-sectional diagrams of an image forming lens system of Example 5.
Figure 5B:
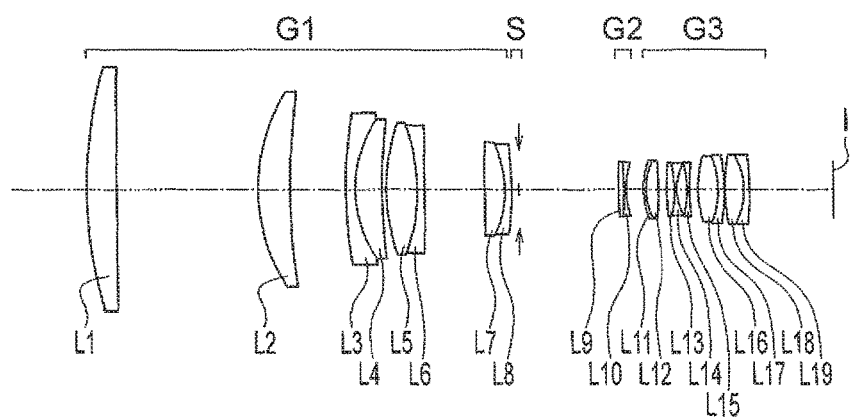
Figure 6A:
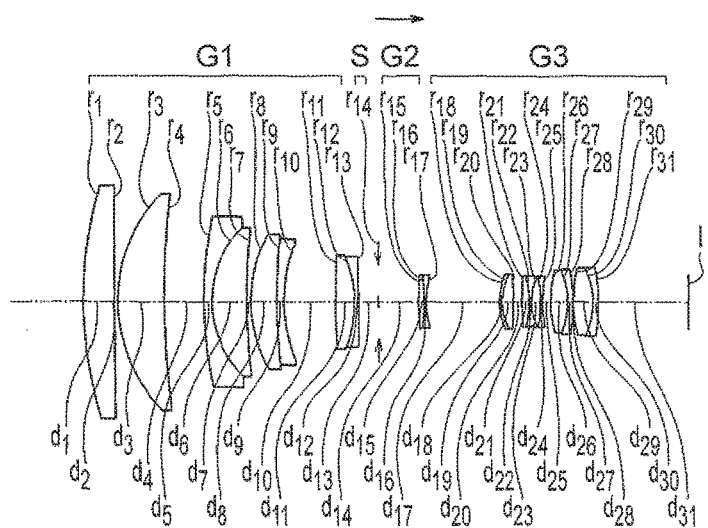
FIG. 6A and FIG. 6B are lens cross-sectional diagrams of an image forming lens system of Example 6.
Figure 6B:
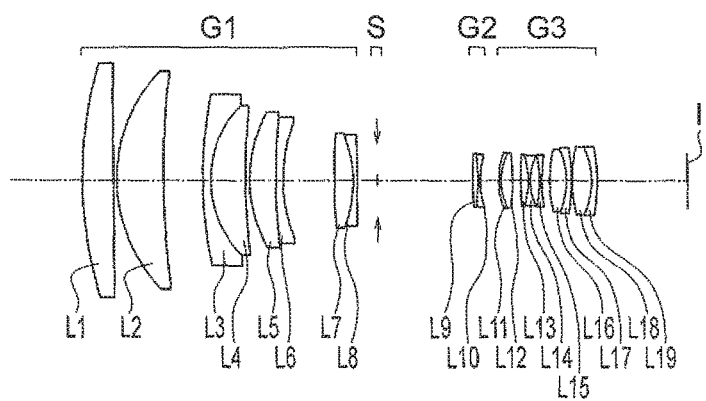
Figure 7A:
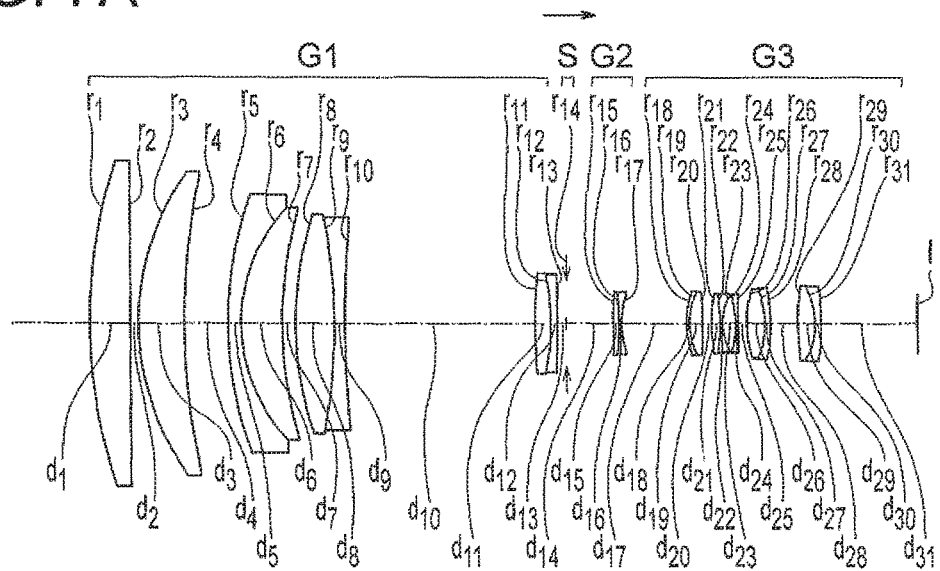
FIG. 7A and FIG. 7B are lens cross-sectional diagrams of an image forming lens system of Example 7.
Figure 7B:
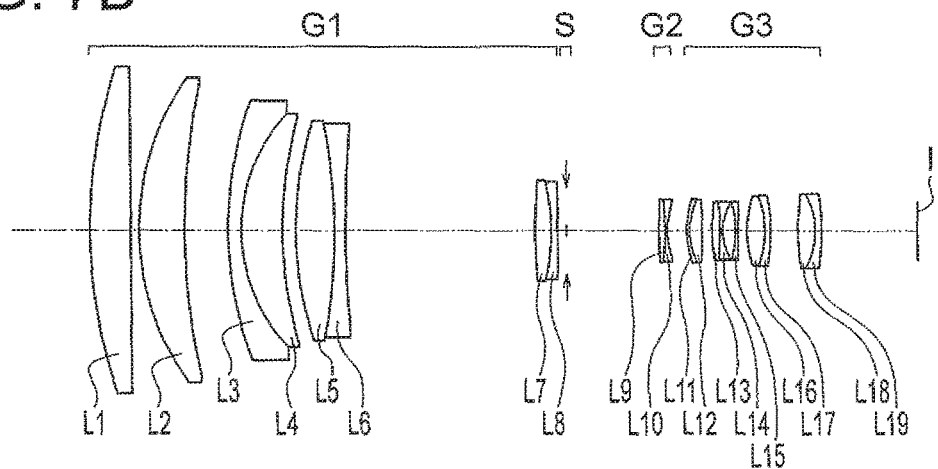
Figure 8A:
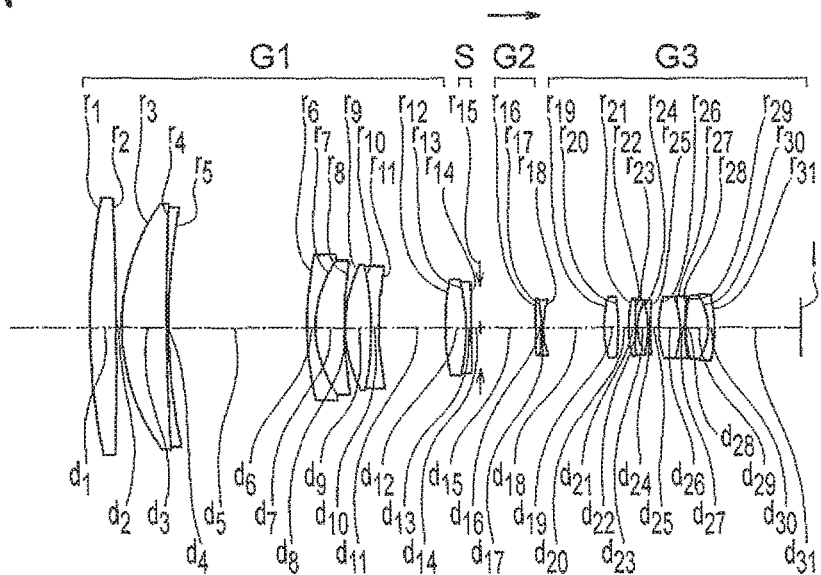
FIG. 8A and FIG. 8B are lens cross-sectional diagrams of an image forming lens system of Example 8.
Figure 8B:
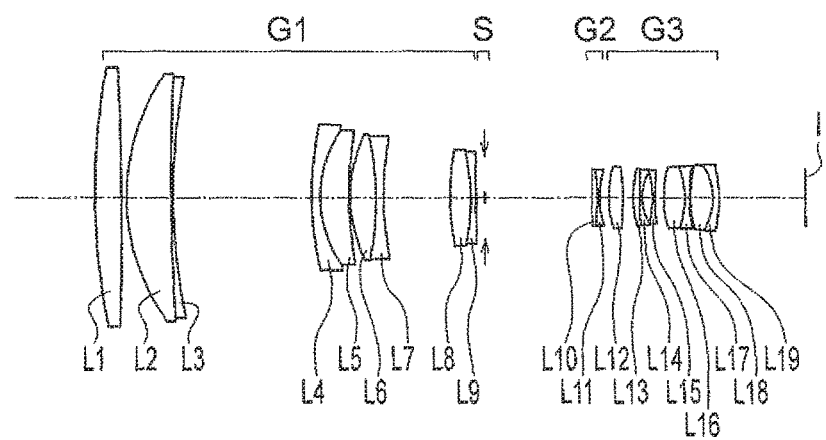
Figure 9A:
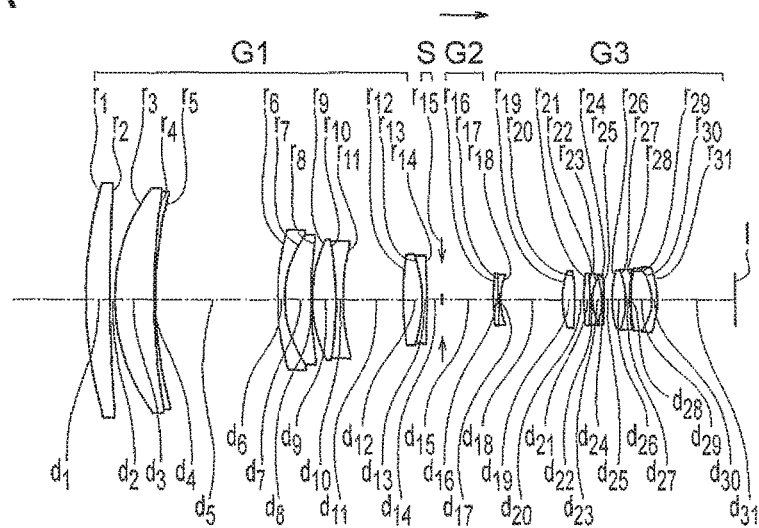
FIG. 9A and FIG. 9B are lens cross-sectional diagrams of an image forming lens system of Example 9.
Figure 9B:
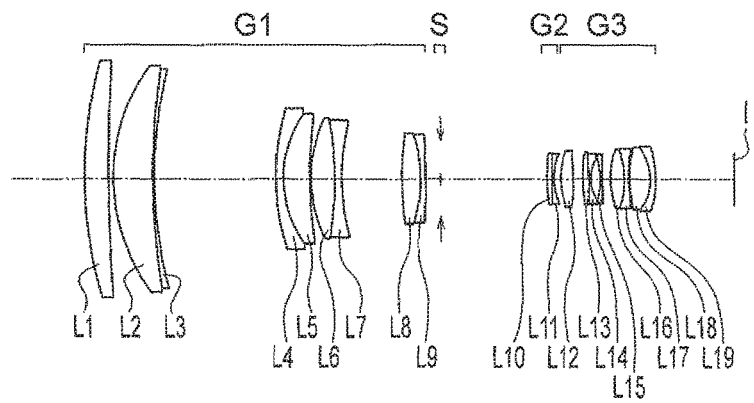

Prior to a description of examples, the operation effects of embodiments according to an aspect of the present invention will be described. When the operation effects of the present embodiment are described, specific examples will be illustrated. However, as is the case with the examples described later, the illustrated aspects are only a few of the aspects included in the present invention, and the aspects include a number of variations. Therefore, the present invention is not limited to the illustrated aspects.

An image forming lens system of the present embodiment has a first common configuration or a second common configuration.

In the first common configuration, the optical system includes, in order from an object side to an image side, a first lens unit having a positive refractive power, a second lens unit having a negative refractive power, and a third lens unit. The first lens unit includes in order from the object side, a front-side lens unit having a positive refractive power and a rear-side lens unit with an air space interposed therebetween. The second lens unit moves by changing respective air spaces on the object side and the image side at a time of focusing. The third lens unit includes a positive lens element. The rear-side lens unit includes a negative lens element and a positive lens element. The front-side lens unit has an aspherical surface having a positive refractive power on the axis and in which an absolute value of a radius of curvature in any effective region off the axis is larger than an absolute value of a radius of curvature on the axis on a plane including an optical axis, or the rear-side lens unit has an aspherical surface having a negative refractive power on an axis and in which an absolute value of a radius of curvature in any effective region off the axis is larger than an absolute value of a radius of curvature on the axis on a plane including an optical axis. A lens element closest to the object side in the first lens unit is fixed in position.

In order to reduce the overall length of the optical system and to ensure favorable imaging performance from the center to the periphery of an image, it is important to ensure optical symmetry in the entire optical system. In the first common configuration, the optical system is constructed with a first lens unit having a positive refractive power, a second lens unit having a negative refractive power, and a third lens unit having a positive lens element.

In this case, with the first lens unit, the second lens unit, and the positive lens element in the third lens unit, the refractive powers are disposed in the order of: positive refractive power, negative refractive power, and positive refractive power. That is, refractive powers are in symmetric arrangement. In this way, by adopting the arrangement as described above, in the first common configuration, since the optical symmetry can be ensured, it becomes easy to correct coma, distortion, and chromatic aberration of magnification favorably.

In the first lens unit, the front-side lens unit is disposed closest to the object side, and the rear-side lens unit is disposed on the image side of the front-side lens unit with an air space that is wide to some degree. The front-side lens unit has a positive refractive power. Hence, for example, by providing the rear-side lens unit with negative refractive power, it is possible to perform correction of spherical aberration and correction of chromatic aberration.

Furthermore, telephoto action is produced by a combination of positive refractive power and negative refractive power. In the first lens unit, it is possible to enhance telephoto action by the positive refractive power of the front-side lens unit and the negative refractive power of the rear-side lens unit. As a result, the total length of the optical system can be reduced.

The second lens unit moves by changing respective air spaces on the object side and the image side at a time of focusing.

The second lens unit is located midway between the first lens unit and the third lens unit and has a negative refractive power. In the first common configuration, the second lens unit is set as a focus lens unit, and focusing is performed by the second lens unit. By doing so, it becomes easy to reduce the weight of the focus lens unit and to ensure favorable imaging performance on the periphery of the image at a time of focusing.

The front-side lens unit or the rear-side lens unit has an aspherical surface.

When an aspherical surface is made to be disposed in the front-side lens unit, the aspherical surface has a positive refractive power on the axis. Then, on a plane including the optical axis, the absolute value of the radius of curvature in any effective region off the axis is made larger than the absolute value of the radius of curvature on the axis.

When an aspherical surface is made to be disposed on the rear-side lens unit, the aspherical surface has a negative refractive power on the axis. Then, on a plane including the optical axis, the absolute value of the radius of curvature in any effective region off the axis is made larger than the absolute value of the radius of curvature on the axis.

When the refractive power of the front-side lens unit is made large, since telephoto action is enhanced, it is possible to reduce the total length of the optical system. However, when the refractive power of the front-side lens unit is made large, spherical aberration that occurs in the front-side lens unit increases toward under-correction side.

In this case, for example, if the front-side lens unit does not include a negative lens element, a negative lens element is made to be disposed in the front-side lens unit. Furthermore, if the front-side lens unit includes a negative lens element, the refractive power of the negative lens element is made large.

By doing so, it is possible to make large the effect of negative refractive power in the front-side lens unit. As a result, it is possible to direct large spherical aberration that occurs on the under-correction side toward over-correction side. It is possible to correct the spherical aberration in this manner.

However, addition of a negative lens element or increase of the refractive power of the negative lens element leads to increase of the lens weight in the front-side lens unit located closest to the object side. Furthermore, a negative lens element has a large correction action for spherical aberration. Therefore, disposing a negative lens element with a large correction action in the front-side lens unit leads to increase of deterioration of the imaging performance. This deterioration of the imaging performance is mainly caused by an optical axis shift mainly from the positive lens element disposed in the front-side lens unit to be corrected.

In order to suppress deterioration of the imaging performance, it is preferable to dispose an aspherical surface in the front-side lens unit or the rear-side lens unit. Aspherical surfaces may be disposed in both the front-side lens unit and the rear-side lens unit.

When an aspherical surface is made to be disposed in the front-side lens unit, it is desirable that the aspherical surface is shaped such that positive refractive power is weaker at the peripheral portion than at the central portion.

By disposing an aspherical surface having such a shape in the front-side lens unit, it is possible to prevent spherical aberration from being excessively under-corrected side while increasing the refractive power of the front-side lens unit and reducing the total length of the optical system. As a result, favorable imaging performance can be obtained.

By disposing an aspherical surface in the front-side lens unit, it is possible to reduce correction action on spherical aberration between the front-side lens unit and the rear-side lens unit. Thus, it is possible to reduce an amount of occurrence of coma due to a decentration error between the front-side lens unit and the rear-side lens unit. Hence, it is possible to improve productivity.

Alternatively, it becomes unnecessary to dispose a negative lens element in the front-side lens unit. Therefore, it is possible to significantly reduce the weight of the optical system.

When the front-side lens unit includes a negative lens element, it is possible to ease the effect of the negative lens element. Hence, it is possible to prevent increase of the lens diameter of the negative lens element.

When an aspherical surface is made to be disposed in the rear-side lens unit, it is desirable that the aspherical surface is shaped such that negative refractive power is weaker at the peripheral portion than at the central portion.

In the rear-side lens unit, a lens element having a negative refractive power is disposed. By making the negative refractive power of this lens element large, it is possible to enhance telephoto action. As a result, the total length of the optical system can be reduced. However, if the negative refractive power of the lens element is made large, spherical aberration that occurs in the rear-side lens unit increases toward over-correction side.

Then, an aspherical surface having the aforementioned shape is made to be disposed in the rear-side lens unit. By doing so, it is possible to prevent spherical aberration from being excessively over-corrected even when the refractive power of the lens element having a negative refractive power in the rear-side lens unit is made large. As a result, favorable imaging performance can be obtained.

By disposing an aspherical surface in the rear-side lens unit, it is possible to reduce correction action on spherical aberration between the front-side lens unit and the rear-side lens unit. Thus, it is possible to reduce an amount of occurrence of coma due to a decentration error between the front-side lens unit and the rear-side lens unit. Hence, it is possible to improve productivity.

Alternatively, it becomes unnecessary to dispose a negative lens element in the front-side lens unit. Therefore, it is possible to significantly reduce the weight of the optical system.

By disposing an aspherical surface in the rear-side lens unit, it is possible to increase the permissible amount of spherical aberration that occurs in the front-side lens unit. When the front-side lens unit includes a negative lens element, it is possible to ease the effect of the negative lens element. Hence, it is possible to prevent increase of the lens diameter of the negative lens element.

Furthermore, the lens element closest to the object side in the first lens unit is fixed in position. By fixing the total length of the optical system in all states in this manner, it is possible to fix the front-side lens unit. The weight of the front-side lens unit tends to be large. The front-side lens can be fixed whereby the weight of the front-side lens unit can be reduced and, in addition, it is possible to reduce centroid change in the entire system due to the focusing operation. Therefore, more stable shooting becomes possible in all states.

An image forming lens system of a first embodiment has the first common configuration, and following Conditional Expression (9) is satisfied:

$$0.06 \leq |fG2/f| \leq 0.195 \tag{9}$$

where fG2 is a focal length of the second lens unit, f is a longest focal length of the entire image forming lens system at a time of focusing to a furthest distance, and a lens element is a lens having two refractive surfaces which are an object-side surface and an image-side surface, and having no other refractive surface between the two refractive surfaces.

In the second lens unit, light rays are refracted in a direction away from the optical axis. In a case of falling below a lower limit value of Conditional Expression (9), light rays are refracted in a direction further away from the optical axis. As a result, the lens diameter of the third lens unit is increased. Therefore, it becomes difficult to reduce the size of the optical system.

The second lens unit functions as a focus lens unit. In a case of exceeding an upper limit value of Conditional Expression (9), the refractive power of the second lens unit becomes too small. In this case, since the amount of movement of the imaging position relative to the amount of movement of the second lens unit (focus lens unit) (hereinafter referred to as "focus sensitivity") is too small, the amount of movement of the second lens unit at the time of focusing is increased. Therefore, it becomes difficult to reduce the overall length of the optical system. Moreover, telephoto action obtained with the first lens unit and the second lens unit is reduced. Therefore, it becomes difficult to reduce the overall length of the optical system.

It is preferable that following Conditional Expression (9'), (9"), or (9''') be satisfied instead of Conditional Expression (9):

$$0.07 \leq |fG2/f| \leq 0.18 \tag{9'}$$

$$0.075 \leq |fG2/f| \leq 0.17 \tag{9''}$$

$$0.08 \leq |fG2/f| \leq 0.15 \tag{9'''}$$

An image forming lens system of a second embodiment has the first common configuration, and an aperture stop that restricts on-axis luminous flux is disposed between the first lens unit and the second lens unit, and following Conditional Expression (9-1) is satisfied:

$$0.04 \leq |fG2/f| \leq 0.41 \tag{9-1}$$

where fG2 is the focal length of the second lens unit, f is the longest focal length of the entire image forming lens system at a time of focusing to a furthest distance, and the lens element is a lens having two refractive surfaces which are an object-side surface and an image-side surface, and having no other refractive surface between the two refractive surfaces.

In the image forming lens system of the second embodiment, the aperture stop that restricts on-axis luminous flux is disposed between the first lens unit and the second lens unit.

Since the first lens unit has a positive refractive power, a strong convergence action occurs in the first lens unit. Then, the aperture stop is disposed on the object side of the first lens unit, and the second lens unit is disposed on the image side of the aperture stop. By doing so, it is possible to reduce the diameter of the second lens unit. Furthermore, since the second lens unit is a focus lens unit, it is possible to form a very compact focus lens unit.

The technical meaning of Conditional Expression (9-1) is the same as the technical meaning of Conditional Expression (9).

It is preferable that following Conditional Expression (9-1'), (9-1"), (9-1'''), or (9-1'''') be satisfied instead of Conditional Expression (9-1):

$$0.05 \leq |fG2/f| \leq 0.35 \tag{9-1'}$$

$$0.06 \leq |fG2/f| \leq 0.3 \tag{9-1''}$$

$$0.07 \leq |fG2/f| \leq 0.2 \tag{9-1'''}$$

$$0.08 \leq |fG2/f| \leq 0.15 \tag{9-1''''}$$

In the second common configuration, the optical system includes, in order from the object side to the image side, a first lens unit having a positive refractive power, a second lens unit having a negative refractive power, and a third lens unit. The first lens unit includes in order from the object side, a front-side lens unit having a positive refractive power and a rear-side lens unit with an air space interposed therebetween. The second lens unit moves by changing respective air spaces on the object side and the image side at a time of focusing. The third lens unit includes a positive lens element. The rear-side lens unit includes a negative lens element and a positive lens element. Following Conditional Expression (1) is satisfied:

$$0.015 \leq \Delta GFGR/f \leq 0.25 \tag{1}$$

where f is a longest focal length of the entire image forming lens system at a time of focusing to a furthest distance, $\Delta GFGR$ is an on-axis air space from an image-side surface in the front-side lens unit to an object-side surface in the rear-side lens unit, and a lens element is a lens having two refractive surfaces which are an object-side surface and an image-side surface, and having no other refractive surface between the two refractive surfaces.

In the second common configuration, similar to the first common configuration, the optical system includes, in order from the object side to the image side, a first lens unit having a positive refractive power, a second lens unit having a negative refractive power, and a third lens unit, and the third lens unit has a positive lens element. Hence, the function effect described in the first common configuration is achieved.

In the second common configuration, similar to the first common configuration, the first lens unit includes in order from the object side, the front-side lens unit having a positive refractive power and the rear-side lens unit with the air space interposed therebetween, and the rear-side lens unit includes the negative lens element and the positive lens element. Hence, the function effect described in the first common configuration is achieved.

In the second common configuration, similar to the first common configuration, the second lens unit moves by changing respective air spaces on the object side and the image side at a time of focusing. Hence, the function effect described in the first common configuration is achieved.

By satisfying Conditional Expression (1), it is possible to ensure a sufficient space between the front-side lens unit and the rear-side lens unit. In this case, since the front-side lens unit and the rear-side lens unit can be separated from each other, it is possible to enhance telephoto action in the first lens unit. As a result, it is possible to reduce the overall length of the optical system. It is further possible to reduce the weight of the lenses positioned closer to the image side than the front-side lens unit.

In a case of falling below a lower limit value of Conditional Expression (1), since the telephoto action in the first lens unit is weakened, it becomes difficult to reduce the overall length of the optical system. To reduce the overall length of the optical system, the telephoto action may be enhanced with the first lens unit and the second lens unit. However, if doing so, since the optical symmetry is deteriorated, it difficult to ensure favorable imaging performance. In addition, since the weight of the negative lens in the rear-side lens unit is increased, it becomes difficult to make the optical system light weight.

In a case of exceeding an upper limit value of Conditional Expression (1), since the overall length of the first lens unit is increased, it becomes difficult to reduce the overall length of the optical system.

It is preferable that following Conditional Expression (1'), (1''), or (1''') be satisfied instead of Conditional Expression (1):

$$0.02 \leq \Delta GFGR/f \leq 0.2 \quad (1')$$

$$0.03 \leq \Delta GFGR/f \leq 0.17 \quad (1'')$$

$$0.04 \leq \Delta GFGR/f \leq 0.15 \quad (1''').$$

An image forming lens system of a third embodiment includes the second common configuration, and each lens element in the front-side lens unit is a lens element that satisfies following Conditional Expression (a). The front-side lens unit has an aspherical surface having a positive refractive power on the axis and in which the absolute value of the radius of curvature in any effective region off the axis is larger than the absolute value of the radius of curvature on the axis on a plane including the optical axis, or the rear-side lens unit has an aspherical surface having a negative refractive power on the axis and in which the absolute value of the radius of curvature in any effective region off the axis is larger than the absolute value of the radius of curvature on the axis on a plane including the optical axis.

$$-0.7 \leq f/fLens \quad (a)$$

where f is the longest focal length of the entire image forming lens system at a time of focusing to a furthest distance, fLens is a focal length of each lens element in the front-side lens unit, and the lens element is a lens having two refractive surfaces which are an object-side surface and an image-side surface, and having no other refractive surface between the two refractive surfaces.

In the front-side lens unit, it is possible to dispose a negative lens element. In this case, it is preferable that the negative lens element disposed in the front-side lens unit be a lens element that satisfies Conditional Expression (a).

The volume of the front-side lens unit is largest in the optical system. Hence, in order to reduce the weight of the optical system, it is preferable that a lens element having a large weight be not disposed in the front-side lens unit.

In the image forming lens system of the third embodiment, it is possible to dispose a negative lens element in the front-side lens unit. A negative lens element has a larger weight as the refractive power increases. Hence, when a negative lens element is disposed in the front-side lens unit, it is preferable that a negative lens element that satisfies Conditional Expression (a) be disposed.

In the negative lens element that satisfies Conditional Expression (a), since the negative refractive power is small, the weight of the lens element is not likely to increase. Hence, it is possible to adopt a configuration in which a negative lens element having a large weight, that is, a negative lens element having large refractive power is not disposed in the front-side lens unit with the largest volume. As a result, it is possible to significantly reduce the weight of the optical system.

A negative lens element that exceeds the lower limit value of Conditional Expression (a) is a lens element having small refractive power. Therefore, even when a negative lens element is disposed in the front-side lens unit, the volume of the lens is not increased as long as the lens element that exceeds the lower limit value of Conditional Expression (a).

Furthermore, since the refractive power is small, even when such a lens element is disposed in the front-side lens unit, it is possible to ensure positive refractive power necessary for the front-side lens unit, with no problem. Hence, it is acceptable that a lens element that exceeds the lower limit value of Conditional Expression (a) is disposed in the front-side lens unit.

Examples of the lens element that exceeds the lower limit value of Conditional Expression (a) include cover glass having a small refractive power, a lens with a thin resin layer having aspheric effects on the lens surface (HBL: hybrid lens), and an optical element having a diffraction-effect surface (DOE: diffractive optical element).

Although the negative lens element that satisfies Conditional Expression (a) may not necessarily be a separator between the front-side lens unit and the rear-side lens unit, additionally, a configuration may be made such that all the lenses closer to the object side than the negative lens closest to the object side of the negative lenses that satisfy Conditional Expression (a) are included in the front-side lens unit.

It is preferable that following Conditional Expression (a'), (a''), or (a''') be satisfied instead of Conditional Expression (a):

$$-0.6 \leq f/fLens \quad (a'')$$

$$-0.5 \leq f/fLens \quad (a')$$

$$-0.4 \leq f/fLens \quad (a''').$$

In the image forming lens system of the third embodiment, the front-side lens unit or the rear-side lens unit has an aspherical surface.

When an aspherical surface is made to be disposed in the front-side lens unit, the aspherical surface has a positive refractive power on the axis. Then, on a plane including the optical axis, the absolute value of the radius of curvature in any effective region off the axis is made larger than the absolute value of the radius of curvature on the axis.

When an aspherical surface is made to be disposed on the rear-side lens unit, the aspherical surface has a negative refractive power on the axis. Then, on a plane including the optical axis, the absolute value of the radius of curvature in any effective region off the axis is made larger than the absolute value of the radius of curvature on the axis.

When the refractive power of the first lens unit is made large, since telephoto action is enhanced, it is possible to reduce the total length of the optical system. However, when the refractive power of the first lens unit is made large, spherical aberration that occurs in the first lens unit increases toward under-correction side.

In this case, for example, if the first lens unit does not include a negative lens element, a negative lens element is made to be disposed in the first lens unit. Furthermore, if the first lens unit includes a negative lens element, the refractive power of the negative lens element is made large.

By doing so, it is possible to make large the effect of negative refractive power in the first lens unit. As a result, it is possible to direct large spherical aberration that occurs on the under-correction side toward over-correction side. It is possible to correct the spherical aberration in this manner.

However, addition of a negative lens element or increase of the refractive power of the negative lens element leads to increase of the lens weight in the first lens unit located closest to the object side. Furthermore, a negative lens element has a large correction action for spherical aberration. Therefore, disposing a negative lens element with a large correction action in the first lens unit leads to increase of deterioration of the imaging performance. This deterioration of the imaging performance is mainly caused by an optical axis shift mainly from the positive lens element disposed in the front-side lens unit to be corrected.

In order to suppress deterioration of the imaging performance, it is preferable to dispose an aspherical surface in the front-side lens unit or the rear-side lens unit. Aspherical surfaces may be disposed in both the front-side lens unit and the rear-side lens unit.

It is desirable that the aspherical surface disposed in the front-side lens unit or the rear-side lens unit is an aspherical surface that corrects spherical aberration in the under-correction direction. By doing so, even in a configuration in which a negative lens element is disposed in the first lens unit or a configuration in which the refractive power of the negative lens element in the first lens unit is made large, it is possible to achieve reduction of the total length of the optical system and favorable correction of spherical aberration. As a result, it is possible to reduce deterioration of the imaging performance due to weight reduction of the lenses and displacement of the lens optical axis.

Furthermore, it is possible to obtain telephoto action with the positive refractive power of the front-side lens unit and the negative refractive power of the negative lens element in the rear-side lens unit. Since the positive refractive power of the front-side lens unit can be further increased by introduction of an aspherical surface, it is possible to increase telephoto action. Hence, it becomes possible to further reduce the total length of the optical system.

An image forming lens system of a fourth embodiment includes the second common configuration, and each lens element in the front-side lens unit does not include a predetermined negative lens element that satisfies following Conditional Expression (b). The front-side lens unit has an aspherical surface having a positive refractive power on the axis and in which an absolute value of a radius of curvature in any effective region off the axis is larger than an absolute value of a radius of curvature on the axis on a plane including an optical axis, or the rear-side lens unit has an aspherical surface having a negative refractive power on an axis and in which an absolute value of a radius of curvature in any effective region off the axis is larger than an absolute value of a radius of curvature on the axis on a plane including an optical axis.

$$0.02 \leq DNx/\varphi enp \quad \text{(b)}$$

where
DNx is a thickness on an optical axis of the predetermined negative lens element, $\varphi enp$ is a maximum diameter of an entrance pupil of the image forming lens system in a state of achieving a longest focal length at a time of focusing to a furthest distance, and the lens element is a lens having two refractive surfaces which are an object-side surface and an image-side surface, and having no other refractive surface between the two refractive surfaces.

As described above, the volume of the front-side lens unit is largest in the optical system. Hence, in order to reduce the weight of the optical system, it is preferable that a lens element with a large weight be not disposed in the front-side lens unit.

The lens element that satisfies Conditional Expression (b) is a lens element with a large thickness. If a lens element with a large thickness is disposed in the front-side lens unit, the size of the front-side lens unit is increased. Thus, it is preferable that the front-side lens unit do not include a negative lens element that satisfies Conditional Expression (b).

The lens element that does not reach the lower limit value of Conditional Expression (b) is a lens element with a small thickness. Therefore, even when a negative lens element is disposed in the front-side lens unit, the volume of the front-side lens unit is not increased as long as the lens element that dose not reach the lower limit value of Conditional Expression (b). Hence, it is acceptable that a lens element that does not reach the lower limit value of Conditional Expression (b) is disposed in the front-side lens unit.

It is preferable that following Conditional Expression (b'), (b''), or (b''') be satisfied instead of Conditional Expression (b):

$$0.017 \leq DNx/\varphi enp \quad \text{(b')}$$

$$0.016 \leq DNx/\varphi enp \quad \text{(b'')}$$

$$0.015 \leq DNx/\varphi enp \quad \text{(b''')}.$$

In the image forming lens system of the fourth embodiment, the front-side lens unit or the rear-side lens unit has an aspherical surface.

When an aspherical surface is made to be disposed in the front-side lens unit, the aspherical surface has a positive refractive power on the axis. Then, on a plane including the optical axis, the absolute value of the radius of curvature in any effective region off the axis is made larger than the absolute value of the radius of curvature on the axis.

When an aspherical surface is made to be disposed on the rear-side lens unit, the aspherical surface has a negative refractive power on the axis. Then, on a plane including the optical axis, the absolute value of the radius of curvature in any effective region off the axis is made larger than the absolute value of the radius of curvature on the axis.

The function effect of the aspherical surface in the image forming lens system of the fourth embodiment is the same as the function effect of the aspherical surface in the image forming lens system of the third embodiment.

An image forming lens system of a fifth embodiment includes the second common configuration, and each lens element in the front-side lens unit is a lens element that satisfies Conditional Expression (a), or each lens element in the front-side lens unit does not include a predetermined negative lens element that satisfies following Conditional Expression (b), and following Conditional Expressions (9-2) and (3") are satisfied:

$$-0.7 \leq f/f \text{Lens} \quad \text{(a)}$$

$$0.02 \leq DNx/\varphi enp \quad \text{(b)}$$

$$0.06 \leq |fG2/f| \leq 0.22 \quad (9\text{-}2)$$

$$77 \leq vdGFave \quad (3'')$$

where f is the longest focal length of the entire image forming lens system at a time of focusing to a furthest distance, fLens is the focal length of each lens element in the front-side lens unit, DNx is the thickness on an optical axis of the predetermined negative lens element, φenp is the maximum diameter of an entrance pupil of the image forming lens system in a state of achieving a longest focal length at a time of focusing to a furthest distance, fG2 is the focal length of the second lens unit, vdGFave is an average Abbe number of positive lens elements in the front-side lens unit, and the lens element is a lens having two refractive surfaces which are an object-side surface and an image-side surface, and having no other refractive surface between the two refractive surfaces.

The technical meaning of Conditional Expression (a) and the technical meaning of Conditional Expression (b) are as described above.

The technical meaning of Conditional Expression (9-2) is the same as the technical meaning of Conditional Expression (9).

It is preferable that following Conditional Expression (9-2'), (9-2''), (9-2'''), or (9-2'''') be satisfied instead of Conditional Expression (9-2):

$$0.07 \leq |fG2/f| \leq 0.2 \quad (9\text{-}2')$$

$$0.07 \leq |fG2/f| \leq 0.195 \quad (9\text{-}2'')$$

$$0.075 \leq |fG2/f| \leq 0.17 \quad (9\text{-}2''')$$

$$0.08 \leq |fG2/f| \leq 0.15 \quad (9\text{-}2'''').$$

The value of the average Abbe number in Conditional Expression (3") can be obtained by averaging the Abbe numbers of the positive lens elements included in the front-side lens unit.

In an image forming lens system, especially in a telephoto lens, size reduction of the optical system is required in addition to ensuring favorable imaging performance. In order to obtain favorable imaging performance in a telephoto lens, it is mainly necessary to suppress occurrence of longitudinal chromatic aberration. On the other hand, in order to achieve size reduction of the optical system, it is necessary to increase the positive refractive power of a lens unit positioned closer to the object side. However, in doing so, longitudinal chromatic aberration is more likely to occur.

In a case of falling below a lower limit value of Conditional Expression (3"), since the amount of occurrence of longitudinal chromatic aberration is increased, it becomes difficult to reduce the overall length of the optical system.

It is preferable that following Conditional Expression (3''') or (3'''') be satisfied instead of Conditional Expression (3''):

$$82 \leq vdGFave \quad (3''')$$

$$85 \leq vdGFave \quad (3'''').$$

In the image forming lens system of the fourth embodiment, it is preferable that the predetermined negative lens element be disposed in any lens unit closer to the image side than the front-side lens unit.

The negative lens element that satisfies Conditional Expression (b) has a large thickness and tends to increase in weight. Meanwhile, the processing is easy. By disposing a predetermined negative lens element closer to the image side than the front-side lens unit, it becomes possible to reduce the processing costs while achieving weight reduction, compared with when it is disposed in the front-side lens unit with a larger diameter.

In the image forming lens system of the first embodiment to the image forming lens system of the fifth embodiment (hereinafter referred to as "the image forming lens system of the present embodiment"), it is preferable that the rear-side lens unit include a first rear-side lens unit and a second rear-side lens unit with an air space interposed therebetween, the first rear-side lens unit includes a negative lens element and a positive lens element, and the second rear-side lens unit includes a positive lens element.

The front-side lens unit is located closest to the object side in the first lens unit. The front-side lens unit is made to be composed of a plurality of lens elements having a positive refractive power alone, and the first rear-side lens unit is made to be disposed on the image side with an air space interposed. Then, a negative lens element and a positive lens element are made to be disposed in the first rear-side lens unit.

By doing so, the first lens unit has a telephoto-type optical system. As a result, it is possible to reduce the total length of the optical system.

Furthermore, a negative lens element with a larger volume is not disposed in the front-side lens unit, whereby it is possible to significantly reduce the weight of the optical system.

The second rear-side lens unit is disposed on the image side of the first rear-side lens unit with an air space interposed. A positive lens element is made to be disposed in the second rear-side lens unit. In this case, the arrangement of refractive power in the first lens unit becomes positive refractive power, negative refractive power, and positive refractive power. That is, refractive power is symmetrically arranged. In this manner, since optical symmetry is ensured in the first lens unit, it is possible to enhance the correction effect for spherical aberration, astigmatism, longitudinal chromatic aberration, and chromatic aberration of magnification.

Since it is possible to enhance the correction effect in the first lens unit, it becomes possible to reduce occurrence of aberration in the optical system located closer to the image side than the first lens unit. Hence, even when the total length of the optical system is reduced, it is easier to reduce the weight of the lens system located closer to the image side than the first lens unit and to ensure the performance at a time of focusing.

In the image forming lens system of the present embodiment, it is preferable that the first rear-side lens unit have a negative refractive power.

By doing so, it is possible to further enhance telephoto action. As a result, it becomes easy to reduce the total length of the optical system. Furthermore, the optical symmetry (the arrangement of positive refractive power, negative refractive power, and positive refractive power) in the first lens unit can be obtained more easily. Therefore, it is possible to further enhance the correction effect for spherical aberration, astigmatism, longitudinal chromatic aberration, and chromatic aberration of magnification in the first lens unit.

In the image forming lens system of the present embodiment, it is preferable that the second rear-side lens unit have a positive refractive power.

By doing so, the optical symmetry (the arrangement of positive refractive power, negative refractive power, and positive refractive power) can be obtained more easily in the first lens unit. Therefore, it is possible to further enhance the correction effect for spherical aberration, astigmatism, longitudinal chromatic aberration, and chromatic aberration of magnification in the first lens unit.

In the image forming lens system of the first embodiment and the image forming lens system of the second embodiment, it is preferable that following Conditional Expression (1) be satisfied:

$$0.015 \leq \Delta GFGR/f \leq 0.25 \tag{1}$$

where f is the longest focal length of the entire image forming lens system at a time of focusing to a furthest distance, and ΔGFGR is the on-axis air space from an image-side surface in the front-side lens unit to an object-side surface in the rear-side lens unit.

The technical meaning of Conditional Expression (1) is as described above.

In the image forming lens system of the present embodiment, it is preferable that following Conditional Expression (2) be satisfied:

$$0.10 \leq DGFoGRo/f \leq 0.5 \tag{2}$$

where

DGFoGRo is a distance from a surface closest to the object side in the front-side lens unit to a surface closest to the object side in the rear-side lens unit, and f is the longest focal length of the entire image forming lens system at a time of focusing to a furthest distance.

By satisfying Conditional Expression (2), it is possible to ensure a sufficient space between the front-side lens unit and the rear-side lens unit. In this case, since the front-side lens unit and the rear-side lens unit can be separated from each other, it is possible to enhance telephoto action in the first lens unit. As a result, it is possible to reduce the overall length of the optical system. It is further possible to reduce the weight of the lenses positioned closer to the image side than the front-side lens unit.

In a case of falling below a lower limit value of Conditional Expression (2), since the telephoto action in the first lens unit is weakened, it becomes difficult to reduce the overall length of the optical system. To reduce the overall length of the optical system, the telephoto action may be enhanced with the first lens unit and the second lens unit. However, if doing so, since the optical symmetry is deteriorated, it difficult to ensure favorable imaging performance. In addition, since the weight of the negative lens in the rear-side lens unit is increased, it becomes difficult to make the optical system light weight.

In a case of exceeding an upper limit value of Conditional Expression (2), since the overall length of the first lens unit is increased, it becomes difficult to reduce the overall length of the optical system.

It is preferable that following Conditional Expression (2') or (2") be satisfied instead of Conditional Expression (2):

$$0.12 \leq DGFoGRo/f \leq 0.45 \tag{2'}$$

$$0.13 \leq DGFoGRo/f \leq 0.4 \tag{2"}$$

In the image forming lens system of the first embodiment to the image forming lens system of the fourth embodiment, it is preferable that following Conditional Expression (3) be satisfied:

$$72 \leq vdGFave \tag{3}$$

where vdGFave is the average Abbe number of positive lens elements in the front-side lens unit, and the lens element is a lens having two refractive surfaces which are an object-side surface and an image-side surface, and having no other refractive surface between the two refractive surfaces.

The technical meaning of Conditional Expression (3) is the same as the technical meaning of Conditional Expression (3").

It is preferable that following Conditional Expression (3'), (3"), (3'''), or (3'''') be satisfied instead of Conditional Expression (3):

$$75 \leq vdGFave \tag{3'}$$

$$77 \leq vdGFave \tag{3"}$$

$$82 \leq vdGFave \tag{3'''}$$

$$85 \leq vdGFave \tag{3''''}$$

In the image forming lens system of the present embodiment, it is preferable that following Conditional Expression (4) be satisfied:

$$60 \leq vdGFmax \tag{4}$$

where vdGFmax is a largest Abbe number of Abbe numbers of positive lens elements in the front-side lens unit.

The technical meaning of Conditional Expression (4) is the same as the technical meaning of Conditional Expression (3").

It is preferable that following Conditional Expression (4'), (4"), (4'''), or (4'''') be satisfied instead of Conditional Expression (4):

$$70 \leq vdGFmax \tag{4'}$$

$$80 \leq vdGFmax \tag{4"}$$

$$90 \leq vdGFmax \tag{4'''}$$

$$93 \leq vdGFmax \tag{4''''}$$

In the image forming lens system of the present embodiment, it is preferable that following Conditional Expression (5) be satisfied:

$$0.015 \leq DGR1GR2/f \leq 0.3 \tag{5}$$

where,

DGR1GR2 is an axial air space between the first rear-side lens unit and the second rear-side lens unit; and f is the longest focal length of the entire image forming lens system at a time of focusing to a furthest distance.

In a case of falling below a lower limit value of Conditional Expression (5), the difference is reduced between the light ray height in the first rear-side lens unit and the light ray height in the second rear-side lens unit. Therefore, it becomes impossible to enhance the correction effect for aberrations such as spherical aberration, astigmatism, longitudinal chromatic aberration, and chromatic aberration of magnification. In a case of exceeding an upper limit value of Conditional Expression (5), it becomes difficult to reduce the overall length of the optical system.

It is preferable that following Conditional Expression (5'), (5"), or (5''') be satisfied instead of Conditional Expression (5):

$$0.02 \leq DGR1GR2/f \leq 0.25 \tag{5'}$$

$$0.025 \leq DGR1GR2/f \leq 0.23 \tag{5"}$$

$$0.03 \leq DGR1GR2/f \leq 0.2 \tag{5'''}$$

In the image forming lens system of the present embodiment, it is preferable that the front-side lens unit have a plurality of positive lens elements.

By doing so, it is possible to distribute positive refractive power among a plurality of lenses even when the refractive power of the front-side lens unit is increased. Therefore, it is possible to suppress occurrence of spherical aberration. Moreover, since it is possible to enhance telephoto action in the first lens unit, it is easy to reduce the overall length of the optical system.

In the image forming lens system lens of the present embodiment, it is preferable that following Conditional Expression (6) be satisfied:

$$0.2 \leq fGF/f \leq 0.8 \quad (6)$$

where, fGF is a focal length of the front-side lens unit; and f is the longest focal length of the entire image forming lens system at a time of focusing to a furthest distance.

In a case of falling below a lower limit value of Conditional Expression (6), the amount of occurrence of axial chromatic aberration and the amount of occurrence of spherical aberration in the front-side lens unit is increased. Therefore, favorable imaging performance cannot be obtained. In a case of exceeding an upper limit value of Conditional Expression (6), it becomes difficult to reduce the size of the optical system.

It is preferable that following Conditional Expression (6') or (6") be satisfied instead of Conditional Expression (6):

$$0.25 \leq fGF/f \leq 0.6 \quad (6')$$

$$0.28 \leq fGF/f \leq 0.47 \quad (6'').$$

In the image forming lens system of the present embodiment, it is preferable that a first lens element is disposed closest to the object and following Conditional Expression (7) be satisfied:

$$1.6 \leq fL1/fGF \leq 5.0 \quad (7)$$

where, fL1 is a focal length of the first lens element; and fGF is the focal length of the front-side lens unit.

In a case of falling below a lower limit value of Conditional Expression (7), the positive refractive power of the first lens element becomes too large. In this case, the amount of occurrence of spherical aberration in the front-side lens unit is increased. Therefore, it becomes difficult to reduce the size of the optical system.

In a case of exceeding an upper limit value of Conditional Expression (7), the positive refractive power of the first lens element becomes too small. In this case, the positive refractive power of the front-side lens unit becomes also small. If an adequate positive refractive power is to be ensured in the front-side lens unit, the load of refractive power in the lenses positioned closer to the image side than the first lens element is increased. As a result, the amount of occurrence of spherical aberration in the front-side lens unit is increased. Therefore, it becomes difficult to reduce the size of the optical system.

It is preferable that following Conditional Expression (7'), (7"), or (7'") be satisfied instead of Conditional Expression (7):

$$1.8 \leq fL1/fGF \leq 4.5 \quad (7')$$

$$1.9 \leq fL1/fGF \leq 4.0 \quad (7'')$$

$$2.0 \leq fL1/fGF \leq 3.5 \quad (7''').$$

In the image forming lens system of the present embodiment, it is preferable that following Conditional Expression (8) be satisfied:

$$-3.0 \leq fGF/fGR1 \leq 0.1 \quad (8)$$

where, fGF is the focal length of the front-side lens unit; and fGR1 is a focal length of the first rear-side lens unit.

In a case of falling below a lower limit value of Conditional Expression (8), spherical aberration is overcorrected. Therefore, favorable imaging performance cannot be obtained. In a case of exceeding an upper limit value of Conditional Expression (8), the negative refractive power of the first rear-side lens unit becomes too small. Therefore, it becomes difficult to reduce the overall length of the optical system.

It is preferable that following Conditional Expression (8'), (8"), or (8'") be satisfied instead of Conditional Expression (8):

$$-2.5 \leq fGF/fGR1 \leq 0.0 \quad (8')$$

$$-2.0 \leq fGF/fGR1 \leq 0.2 \quad (8'')$$

$$-1.8 \leq fGF/fGR1 \leq -0.3 \quad (8''').$$

In the image forming lens system of the third embodiment and the image forming lens system of the fourth embodiment, it is preferable that following Conditional Expression (9-3) be satisfied:

$$0.06 \leq |fG2/f| \leq 0.25 \quad (9\text{-}3)$$

where, fG2 is a focal length of the second lens unit; and f is the longest focal length of the entire image forming lens system at a time of focusing to a furthest distance.

The technical meaning of Conditional Expression (9-3) is the same as the technical meaning of Conditional Expression (9).

It is preferable that following Conditional Expression (9-3'), (9-3"), or (9-3'") be satisfied instead of Conditional Expression (9-3):

$$0.07 \leq |fG2/f| \leq 0.2 \quad (9\text{-}3')$$

$$0.08 \leq |fG2/f| \leq 0.17 \quad (9\text{-}3'')$$

$$0.08 \leq |fG2/f| \leq 0.15 \quad (9\text{-}3''').$$

In the image forming lens system of the present embodiment, it is preferable that following Conditional Expression (10) be satisfied:

$$3.0 \leq |MGG2B^2 \times (MGG2^2 - 1)| \leq 6.5 \quad (10),$$

where,

MGG2B is a lateral magnification of a first rear-side lens system;

MGG2 is a lateral magnification of the second lens unit;

the lateral magnification is a lateral magnification at the time of focusing on an infinite object; and the first rear-side lens system is a lens system constituted with all of the lenses positioned closer to the image side than the second lens unit.

In a case of falling below a lower limit value of Conditional Expression (10), the amount of movement of the second lens unit at the time of focusing is too large. Therefore, it becomes difficult to reduce the overall length of the optical system. In a case of exceeding an upper limit value of Conditional Expression (10), it becomes difficult to control the position of the second lens unit at the time of focusing. Therefore, accurate focusing cannot be achieved.

It is preferable that following Conditional Expression (10'), (10"), (10''') or (10'''') be satisfied instead of Conditional Expression (10):

$$3.2 \leq |MGG2B^2 \times (MGG2^2-1)| \leq 6.3 \tag{10'}$$

$$3.4 \leq |MGG2B^2 \times (MGG2^2-1)| \leq 6.1 \tag{10''}$$

$$3.6 \leq |MGG2B^2 \times (MGG2^2-1)| \leq 6.0 \tag{10'''}$$

$$4.0 \leq |MGG2B^2 \times (MGG2^2-1)| \leq 5.6 \tag{10''''}$$

In the image forming lens system of the present embodiment, it is preferable that the second lens unit include two or less lens elements.

As described above, in the image forming lens system of the present embodiment, the optical symmetry is ensured. Thus, coma, distortion, and chromatic aberration of magnification are corrected favorably. Therefore, even when the arrangement of the second lens unit is simplified, it is possible to ensure high imaging performance at the time of focusing.

Then, the second lens unit is constituted with two or less lenses. By doing so, it is possible to reduce the weight of the second lens unit, that is, the focus lens unit, while keeping high imaging performance even at the time of focusing.

In the image forming lens system of the present embodiment, it is preferable that the second lens unit include a negative lens element and a positive lens element.

To reduce the weight of the second lens unit, it is desirable that the second lens unit is configured two or less lens elements. The image forming lens system of the present embodiment has the first common configuration or the second common configuration. Hence, it is possible to reduce the diameter of the second lens unit.

Even when a positive lens element and a negative lens element are used as two lens elements, it is possible to reduce the weight of the second lens unit. In this case, since the second lens unit has a positive lens element and a negative lens element, it is possible to further reduce variation of chromatic aberration at a time of focusing.

In the image forming lens system of the present embodiment, it is preferable that the second lens unit consist of one negative lens element and one positive lens element.

By doing so, it is possible to reduce the amount of occurrence of longitudinal chromatic aberration and the amount of occurrence of chromatic aberration of magnification in the second lens unit. As a result, it is possible to ensure stable imaging performance at the time of focusing. Furthermore, the second lens unit includes two lens elements whereby it is possible to reduce the weight of the second lens unit while keeping high imaging performance.

In the image forming lens system of the present embodiment, it is preferable that the third lens unit have a camera shake-correction lens unit and the camera shake-correction lens unit move in a direction vertical to the optical axis.

By moving one or more lenses in a direction vertical to the optical axis, it is possible to correct a shift of the imaging position due to camera shake. Here, if the lens to be moved (hereinafter referred to as "camera shake-correction lens") is compact and lightweight, it is possible to quickly correct a shift of the imaging position.

In a telephoto-type optical system, the second lens unit and the third lens unit are units having a small diameter.

Then, by constituting the camera shake-correction lens unit with the lenses in the third lens unit, it is possible to reduce the diameter and weight of the camera shake-correction lens. Thus, it is possible to enhance the responsivity of the camera shake-correction lens unit. As a result, it is possible to correct a shift of the imaging position due to camera shake at high speed.

In the image forming lens system of the present embodiment, it is preferable that the third lens unit have a sub-lens unit on the object side and the sub-lens unit have a refractive power with a sign different from that of the camera shake-correction lens unit.

By doing so, it is possible to increase the amount of shift of the imaging position relative to the amount of shift of the camera shake-correction lens unit (hereinafter referred to as "camera shake-correction sensitivity"). That is, it is possible to reduce the amount of shift of the camera shake-correction lens unit. As a result, it is possible to correct a shift of the imaging position due to camera shake at high speed.

In the image forming lens system of the present embodiment, it is preferable that the third lens unit have a sub-lens unit on the image side and the sub-lens unit have a refractive power with a sign different from that of the camera shake-correction lens unit.

By doing so, it is possible to increase the camera shake-correction sensitivity. That is, it is possible to reduce the amount of shift of the camera shake-correction lens unit. As a result, it is possible to correct a shift of the imaging position due to camera shake at high speed.

In the image forming lens system of the present embodiment, it is preferable that the third lens unit have an object-side sub-lens unit and an image-side sub-lens unit on the object side and the image side, respectively, and the object-side sub-lens unit and the image-side sub-lens unit both have a refractive power with a sign different from that of the camera shake-correction lens unit.

By doing so, it is possible to increase the camera shake-correction sensitivity. That is, it is possible to reduce the amount of shift of the camera shake-correction lens unit. As a result, it is possible to correct a shift of the imaging position due to camera shake at high speed.

In the image forming lens system of the present embodiment, it is preferable that the camera shake-correction lens unit at least have a first correction lens element, a second correction lens element, and a third correction lens element, and the first correction lens element and the second correction lens element have a refractive power with the same sign as the camera shake-correction lens unit, and the third correction lens element have a refractive power with a sign different from that of the camera shake-correction lens unit.

The camera shake-correction lens unit moves in a direction vertical to the optical axis. This movement mainly causes variation of spherical aberration, astigmatism, and chromatic aberration of magnification. If the amount of this variation is large, the imaging performance is reduced.

Then, in the image forming lens system of the present embodiment, a refractive power with the same sign as the camera shake-correction lens unit is imparted to the first correction lens element and the second correction lens element. By doing so, the refractive power of the camera shake-correction lens unit is distributed between the first correction lens element and the second correction lens element. As a result, the refractive power of the first correction lens element and the refractive power of the second correction lens element are both reduced. Therefore, it is possible to reduce the amount of variation of spherical aberration and the amount of variation of astigmatism.

Furthermore, a refractive power with a sign different from that of the camera shake-correction lens unit is imparted to the third correction lens element. By doing so, it is possible to reduce the amount of variation of chromatic aberration of magnification.

In the image forming lens system of the present embodiment, it is preferable that the camera shake-correction lens unit have a negative refractive power.

The camera shake-correction lens unit moves in a direction vertical to the optical axis. Therefore, the camera shake-correction lens unit preferably has a small diameter. By setting the lens unit positioned where light rays converge more, as the camera shake-correction lens unit, it is possible to reduce the size of the camera shake-correction lens unit. Then, by setting the refractive power of the camera shake-correction lens unit to a negative refractive power, it is possible to further reduce the size of the camera shake-correction lens unit.

In the image forming lens system of the present embodiment, it is preferable that the third lens unit have an object-side sub-lens unit having a positive refractive power, a camera shake-correction lens unit having a negative refractive power, and an image-side sub-lens unit having a positive refractive power.

As described above, in image forming lens system of the present embodiment, the first lens unit has a positive refractive power and the second lens unit has a negative refractive power. Therefore, since telephoto action can be obtained, it is possible to reduce the overall length of the optical system.

Since the first lens unit has a positive refractive power, light rays converge on the side closer to the image side than the first lens unit. That is, the height of light rays is low at the position of the second lens unit. Therefore, the outer diameter of the second lens unit is reduced. Then, the second lens unit is set as the focus lens unit and focusing is performed in the second lens unit. By doing so, it is possible to reduce the outer diameter of the focus lens unit.

In the focus lens unit, when the refractive power is increased, the focus sensitivity becomes high. When the focus sensitivity is high, the amount of movement of the focus lens unit at the time of focusing is reduced. As described above, the second lens unit functions as the focus lens unit. Then, the refractive power of the second lens unit is increased. By doing so, it is possible to enhance the focus sensitivity. As a result, it is possible to reduce the amount of movement of the focus lens unit at the time of focusing.

A focus unit has a focus lens unit and a focus mechanism. Achieving a smaller diameter of the focus lens unit and reducing the amount of movement at the time of focusing can also reduce the size and weight of the entire focus unit.

Furthermore, light incident on the focus lens unit is converging light. Therefore, even when the refractive power of the focus lens unit is increased, it is possible to reduce divergence of light rays passing through the focus lens unit. As a result, it is possible to reduce the diameter of the entire lens system positioned closer to the image side than the second lens unit while enhancing focus sensitivity.

By arranging a positive lens unit on the image side of the second lens unit, it is possible to easily enhance the focus sensitivity.

The camera shake-correction lens unit moves in a direction vertical to the optical axis. It is preferable to minimize the range of movement of the camera shake-correction lens unit. Based on this, it is desirable that a lens unit positioned where the height of light rays is low be set as the camera shake-correction lens unit.

As described above, on the side closer to the image side than the first lens unit, the height of light rays is low. Thus, it is preferable that the camera shake-correction lens unit be provided in the second lens unit or the third lens unit. However, the second lens unit functions as a focus lens unit. Based on this, it is preferable that the camera shake-correction lens unit be disposed in the third lens unit.

Here, the third lens unit is constituted with an object-side sub-lens unit having a positive refractive power, a camera shake-correction lens unit having a negative refractive power, and an image-side sub-lens unit having a positive refractive power.

In such an arrangement, the lens units having a positive refractive power are disposed on both sides of the camera shake-correction lens unit. Therefore, it is possible to increase the camera shake-correction sensitivity. That is, it is possible to reduce the amount of shift of the camera shake-correction lens unit. As a result, it is possible to correct a shift of the imaging position due to camera shake at high speed.

As described above, on the side closer to the image side than the first lens unit, the height of light rays is low. Then, an arrangement may be such that the second lens unit has a camera shake-correcting function and the third lens unit has the focusing function. However, in such an arrangement, variation of comatic aberration due to camera shake correction is increased by movement of the lens unit at the time of focusing. Thus, such an arrangement is not preferable.

When the focus lens unit has a negative refractive power, it is possible to enhance focus sensitivity by disposing a positive lens unit on the image side of the focus lens unit. Furthermore, when the camera shake-correction lens unit has a negative refractive power, it is possible to enhance camera shake-correction sensitivity by disposing a positive lens unit on the object side of the camera shake-correction lens unit.

The object-side sub-lens unit is positioned between the second lens unit and the camera shake-correction lens unit. The second lens unit has a negative refractive power and functions as a focus lens unit. Then, when the refractive power of the object-side sub-lens unit is set as a positive refractive power, it follows that a positive lens unit is positioned on the image side of the focus lens unit, and therefore it is possible to enhance the focus sensitivity.

Furthermore, the object-side sub-lens unit is positioned on the object side of the camera shake-correction lens unit. It follows that a positive lens unit is positioned on the object side of the camera shake-correction lens unit, and therefore it is possible to enhance the camera shake-correction sensitivity. In this way, by setting the refractive power of the object-side sub-lens unit as a positive refractive power, it is possible to enhance focus sensitivity and camera shake-correction sensitivity at the same time.

It is preferable that the second lens unit and the third lens unit be disposed closer to the image side than the aperture stop. By doing so, it is possible to further reduce the diameters of the focus lens unit and the camera shake-correction lens unit.

At the time of focusing, a lens unit moves along the optical axis. When the lens unit moves, imaging performance tends to be degraded mainly due to variation of spherical aberration and variation of longitudinal chromatic aberration. In order to alleviate degradation of imaging performance, it is necessary to alleviate variation of spherical aberration and variation of longitudinal chromatic aberration. It is then desirable that the second lens unit at least have a positive lens and a negative lens. By doing so, it is possible to prevent degradation of imaging performance at the time of focusing.

Variation of spherical aberration and variation of longitudinal chromatic aberration in the second lens unit change through the object-side sub-lens unit. Therefore, it is desirable that the object-side sub-lens unit have a positive lens and a negative lens. By doing so, it is possible to reduce variation of spherical aberration and variation of longitudinal chromatic aberration.

At the time of camera shake correction, the lens unit moves in a direction vertical to the optical axis. When the lens unit moves, imaging performance tends to be degraded mainly due to variation of spherical aberration, variation of curvature of field, and variation of chromatic aberration of magnification. In order to alleviate degradation of imaging performance, it is necessary to alleviate variation of spherical aberration, variation of curvature of field, and variation of chromatic aberration of magnification. It is then desirable that the camera shake-correction lens unit at least have one positive lens and two negative lenses. By providing two negative lenses, it is possible to distribute the refractive power of the camera shake-correction lens unit between the two negative lenses. As a result, it is possible to prevent degradation of imaging performance at the time of camera shake correction.

It is desirable that the second lens unit include two lenses, that the object-side sub-lens unit include two or less lenses, and that the camera shake-correction lens unit include three lenses. By doing so, it is possible to construct an optical system having high focusing performance and high camera shake-correcting function with a smaller number of lenses.

In the image forming lens system of the present embodiment, it is preferable that following Conditional Expression (13) be satisfied:

$$1.0 < |MGISB \times (MGIS-1)| < 4.0 \quad (13)$$

where,

MGISB is a lateral magnification of a second rear-side lens system;

MGIS is a lateral magnification of the camera shake-correction lens unit;

the lateral magnification is the lateral magnification at the time of focusing on an infinite object; and the second rear-side lens system is a lens system constituted with all of the lenses positioned closer to the image side than the camera shake-correction lens unit.

In a case of falling below a lower limit value of Conditional Expression (13), a sufficient camera shake-correction effect cannot be obtained. In a case of exceeding an upper limit value of Conditional Expression (13), the refractive power of the camera shake-correction lens unit is increased. In this case, variation of spherical aberration, variation of curvature of field, and variation of chromatic aberration of magnification are increased. Therefore, it becomes difficult to correct spherical aberration, astigmatism, and chromatic aberration of magnification.

It is preferable that following Conditional Expression (13') or (13") be satisfied instead of Conditional Expression (13):

$$1.3 < |MGISB \times (MGIS-1)| < 3.0 \quad (13')$$

$$1.5 < |MGISB \times (MGIS-1)| < 2.7 \quad (13'')$$

In the image forming lens system of the present embodiment, it is preferable that the aperture stop be disposed on the object side of the second lens unit.

Since the first lens unit has a positive refractive power, a strong convergence action occurs in the first lens unit. Then, the aperture stop is disposed on the object side of the first lens unit, and the second lens unit is disposed on the image side of the aperture stop. By doing so, it is possible to reduce the diameter of the second lens unit. Furthermore, since the second lens unit is a focus lens unit, it is possible to form a very compact focus lens unit.

In the image forming lens system of the present embodiment, it is preferable that the aperture stop be disposed between the first lens unit and the second lens unit.

Since the first lens unit has a positive refractive power, a strong convergence action occurs in the first lens unit. Then, the aperture stop is disposed on the object side of the first lens unit, and the second lens unit is disposed on the image side of the aperture stop. By doing so, it is possible to reduce the diameter of the second lens unit. Furthermore, since the second lens unit is a focus lens unit, it is possible to form a very compact focus lens unit.

Furthermore, the first lens unit includes the front-side lens unit and the first rear-side lens unit from the object side. The front-side lens unit has a positive refractive power, and the first rear-side lens unit has a negative refractive power. Then, the second lens unit and the third lens unit are disposed on the image side of the first lens unit. The second lens unit has a negative refractive power, and the third lens unit has a positive refractive power.

When the aperture stop is made to be disposed between the first lens unit and the second lens unit, the arrangement of refractive power is symmetry between the object side and the image side of the aperture stop. Therefore, it is possible to favorably perform correction of off-axis aberration, mainly correction of chromatic aberration of magnification and distortion.

In the image forming lens system of the present embodiment, it is preferable that the aperture stop be disposed between the first rear-side lens unit and the second lens unit.

Furthermore, the first lens unit includes the front-side lens unit and the first rear-side lens unit from the object side. The front-side lens unit has a positive refractive power, and the first rear-side lens unit has a negative refractive power. Then, the second lens unit and the third lens unit are disposed on the image side of the first lens unit. The second lens unit has a negative refractive power, and the third lens unit has a positive refractive power.

When the aperture stop is made to be disposed between the first rear-side lens unit and the second lens unit, the arrangement of refractive power is symmetry between the object side and the image side of the aperture stop. Therefore, it is possible to favorably perform correction of off-axis aberration, mainly correction of chromatic aberration of magnification and distortion.

In the image forming lens system of the present embodiment, it is preferable that following Conditional Expression (14) be satisfied:

$$0.19 \leq DGF\text{airmax}/DGF \leq 1.0 \quad (14)$$

where,

DGFairmax is the largest axial air space, of axial air spaces in the front-side lens unit; and DGF is the axial thickness of the front-side lens unit.

In a case of falling below a lower limit value of Conditional Expression (14), since the weight of the positive lenses in the front-side lens unit is increased, it becomes difficult to make the optical system light weight. In a case of exceeding an upper limit value of Conditional Expression (14), it becomes difficult to reduce the overall length of the optical system.

It is preferable that following Conditional Expression (14') or (14") be satisfied instead of Conditional Expression (14):

$$0.2 \leq DGF\text{airmax}/DGF \leq 0.9 \quad (14')$$

$$0.25 \leq DGF\text{airmax}/DGF \leq 0.8 \quad (14'').$$

In the image forming lens system of the present embodiment, it is preferable that following Conditional Expression (1A) be satisfied:

$$0.01 \leq \Delta GFGR\text{max}/f \leq 0.2 \quad (1A)$$

where f is the longest focal length of the entire image forming lens system at a time of focusing to a furthest distance, and $\Delta GFGR\text{max}$ is a largest on-axis air space of on-axis air spaces from an image-side surface in the front-side lens unit to an object-side surface in the rear-side lens unit.

By satisfying Conditional Expression (1A), it is possible to ensure a sufficient space between the front-side lens unit and the rear-side lens unit. In this case, since the front-side lens unit and the rear-side lens unit can be separated from each other, it is possible to enhance telephoto action in the first lens unit. As a result, it is possible to reduce the overall length of the optical system. It is further possible to reduce the weight of the lenses positioned closer to the image side than the front-side lens unit.

In a case of falling below a lower limit value of Conditional Expression (1A), since the telephoto action in the first lens unit is weakened, it becomes difficult to reduce the overall length of the optical system. To reduce the overall length of the optical system, the telephoto action may be enhanced with the first lens unit and the second lens unit. However, if doing so, since the optical symmetry is deteriorated, it difficult to ensure favorable imaging performance. In addition, since the weight of the negative lens in the rear-side lens unit is increased, it becomes difficult to make the optical system light weight.

In a case of exceeding an upper limit value of Conditional Expression (1A), since the overall length of the first lens unit is increased, it becomes difficult to reduce the overall length of the optical system.

It is preferable that following Conditional Expression (1A'), (1A"), (1A'''), or (1A'''') be satisfied instead of Conditional Expression (1A):

$$0.015 \leq \Delta GFGR\text{max}/f \leq 0.18 \quad (1A')$$

$$0.02 \leq \Delta GFGR\text{max}/f \leq 0.17 \quad (1A'')$$

$$0.03 \leq \Delta GFGR\text{max}/f \leq 0.16 \quad (1A''')$$

$$0.05 \leq \Delta GFGR\text{max}/f \leq 0.15 \quad (1A'''').$$

In the image forming lens system of the present embodiment, it is preferable that following Conditional Expression (15) be satisfied:

$$0.05 \leq \Delta GFGR/fGF \leq 0.4 \quad (15)$$

where $\Delta GFGR$ is the on-axis air space from the image-side surface in the front-side lens unit to the object-side surface in the rear-side lens unit, and fGF is a focal length of the front-side lens unit.

In a case of falling below a lower limit value of Conditional Expression (15), the light flux-converging action in the front-side lens unit becomes weak. In this case, the outer diameter in the rear-side lens unit is increased. Therefore, it becomes difficult to reduce the size and weight of the first lens unit.

In a case of exceeding an upper limit value of Conditional Expression (15), the amount of occurrence of spherical aberration in the front-side lens unit is increased. Therefore, it becomes difficult to correct spherical aberration favorably with the lenses positioned closer to the image side than the front-side lens unit.

It is preferable that following Conditional Expression (15') or (15") be satisfied instead of Conditional Expression (15):

$$0.06 \leq \Delta GFGR/fGF \leq 0.35 \quad (15')$$

$$0.08 \leq \Delta GFGR/fGF \leq 0.33 \quad (15'').$$

In the image forming lens system of the present embodiment, it is preferable that following Conditional Expression (16) be satisfied:

$$50 \leq vdLp1 \quad (16)$$

where, $vdLp1$ is the Abbe number of a positive lens positioned closest to the object.

In a case of falling below a lower limit value of Conditional Expression (16), since longitudinal chromatic aberration in the first sub-lens unit is increased, favorable imaging performance is not achieved. Alternatively, when favorable imaging performance is to be achieved, it is difficult to reduce the overall length of the optical system.

It is preferable that any one of following Conditional Expressions (16'), (16"), (16'''), or (16'''') be satisfied instead of Conditional Expression (16):

$$55 \leq vdLp1 \quad (16')$$

$$62 \leq vdLp1 \quad (16'')$$

$$65 \leq vdLp1 \quad (16''')$$

$$75 \leq vdLp1 \quad (16'''').$$

In the image forming lens system of the present embodiment, it is preferable that the front-side lens unit include two positive lenses.

By doing so, it is becomes easy to reduce the amount of occurrence of spherical aberration in the front-side lens unit, to reduce the weight of the optical system, and to reduce the overall length of the optical system.

In the image forming lens system of the present embodiment, it is preferable that the first rear-side lens unit have at least two negative lenses.

In the front-side lens unit, a negative lens having a large refractive power is not disposed. Therefore, it is difficult to correct chromatic aberration favorably in the front-side lens unit. Accordingly, in the first rear-side lens unit, it is necessary to enhance the function of correcting spherical aberration and longitudinal chromatic aberration remaining in the front-side lens unit. Then, by using at least two negative lenses in the first rear-side lens unit, it is possible to correct both spherical aberration and longitudinal chromatic aberration favorably while reducing the overall length of the optical system.

In the image forming lens system of the present embodiment, it is preferable that following Conditional Expression (17) be satisfied:

$$1.5 \leq |fG1/fG2| \leq 6.5 \quad (17)$$

where, fG1 is a focal length of the first lens unit; and fG2 is the focal length of the second lens unit.

In a case of falling below a lower limit value of Conditional Expression (17), the amount of occurrence of spherical aberration in the first lens unit is increased. Therefore, favorable imaging performance cannot be obtained. In a case of exceeding an upper limit value of Conditional Expression (17), focus sensitivity is reduced. In this case, the amount of movement of the second lens unit at the time of focusing is increased. Therefore, the overall length of the optical system is increased.

It is preferable that following Conditional Expression (17'), (17''), or (17''') be satisfied instead of Conditional Expression (17):

$$2.0 \leq |fG1/fG2| \leq 6.0 \tag{17'}$$

$$2.2 \leq |fG1/fG2| \leq 5.0 \tag{17''}$$

$$2.5 \leq |fG1/fG2| \leq 4.0 \tag{17'''}$$

In the image forming lens system of the present embodiment, it is preferable that the third lens unit include a positive lens element and a negative lens element.

By doing so, it is possible to perform chromatic aberration correction in the third lens unit more favorably.

In the image forming lens system of the present embodiment, it is preferable that following Conditional Expression (18) be satisfied:

$$0.12 \leq \Sigma dGF/fGF \leq 0.7 \tag{18}$$

where $\Sigma dGF$ is a total thickness of the front-side lens unit, and fGF is the focal length of the front-side lens unit.

In a case of falling below a lower limit value of Conditional Expression (18), number of the lens elements with a large aperture increase. Therefore, it becomes difficult to reduce the weight of the optical system. In a case of exceeding an upper limit value of Conditional Expression (18), it is difficult to reduce the total length of the optical system.

It is preferable that following Conditional Expression (18'), (18''), or (18''') be satisfied instead of Conditional Expression (18):

$$0.15 \leq \Sigma dGF/fGF \leq 0.6 \tag{18'}$$

$$0.16 \leq \Sigma dGF/fGF \leq 0.55 \tag{18''}$$

$$0.18 \leq \Sigma dGF/fGF \leq 0.45 \tag{18'''}$$

In the image forming lens system of the present embodiment, it is preferable that following Conditional Expression (19) be satisfied:

$$15 \leq vdGFn\min \leq 57 \tag{19}$$

where vdGFnmin is a smallest Abbe number of Abbe numbers of negative lens elements in the front-side lens unit.

In a case of falling below a lower limit value of Conditional Expression (19), the occurrence of secondary spectrum increases. Therefore, favorable imaging performance is not obtained. In a case of exceeding an upper limit value of Conditional Expression (19), sufficient chromatic correction effect is not obtained in the front-side lens unit.

It is preferable that following Conditional Expression (19'), (19''), or (19''') be satisfied instead of Conditional Expression (19):

$$22 \leq vdGFn\min \leq 52 \tag{19'}$$

$$25 \leq vdGFn\min \leq 50 \tag{19''}$$

$$30 \leq vdGFn\min \leq 45 \tag{19'''}$$

In the image forming lens system of the present embodiment, it is preferable that a negative lens element in the front-side lens unit be a resin lens.

In general, transparent resin for optical applications has a specific gravity equal to or less than 1.3. By making the negative lens element in the front-side lens unit to be a resin lens, it is possible to reduce the weight of the optical system. Furthermore, by forming the negative lens element from thermosetting resin or UV-curable resin, it becomes possible to produce the optical system at lower costs.

In the image forming lens system of the present embodiment, it is preferable that following Conditional Expression (21) be satisfied:

$$2.2 \leq |fGFn/fGF| \leq 6.5 \tag{21}$$

where fGFn is a focal length of any given negative lens element in the front-side lens unit, and fGF is the focal length of the front-side lens unit.

In a case of falling below a lower limit value of Conditional Expression (21), the refractive power of the negative lens element becomes too large. In this case, the rim of the negative lens element becomes thick. Therefore, it becomes difficult to reduce the weight of the optical system. In a case of exceeding an upper limit value of Conditional Expression (21), the correction effect for longitudinal chromatic aberration is not obtained sufficiently. Therefore, favorable imaging performance is not obtained.

In the image forming lens system of the present embodiment, it is preferable that the distance between the front-side lens unit and the first rear-side lens unit and the distance between the first rear-side lens unit and the second rear-side lens unit be always constant.

It is possible to reduce centroid position change, and more stable shooting is possible.

In the image forming lens system of the present embodiment, it is preferable that the front-side lens unit include a lens element located closer to the object side than a predetermined negative lens element that satisfies following Conditional Expression (b-1):

$$0.025 \leq DNx/\varphi enp \tag{b-1}$$

DNx is the thickness on an optical axis of the predetermined negative lens element, and $\varphi enp$ is the maximum diameter of an entrance pupil of the image forming lens system in a state of achieving a longest focal length at a time of focusing to a furthest distance.

The technical meaning of Conditional Expression (b-1) is the same as the technical meaning of Conditional Expression (b).

In the image forming lens system of the present embodiment, it is preferable that the first rear-side lens unit have an aspherical surface having a negative refractive power on the axis and in which the absolute value of the radius of curvature in any effective region off the axis is larger than the absolute value of the radius of curvature on the axis on a plane including the optical axis.

The rear-side lens unit includes a first rear-side lens unit and a second rear-side lens unit. Negative refractive power is made to be imparted to the first rear-side lens unit, and an aspherical surface is made to be used for the first rear-side lens unit. By doing so, it is possible to increase negative refractive power in the first rear-side lens unit.

As a result, it is possible to reduce occurrence of spherical aberration in the first rear-side lens unit. In addition, since the telephoto action can be enhanced, it is possible to easily reduce the total length of the optical system.

In the image forming lens system of the present embodiment, it is preferable that the lens element closest to the object side in the first lens unit be fixed in position.

In this way, by fixing the total length of the optical system in all states, it is possible to fix the front-side lens unit. The weight of the front-side lens unit tends to be large. The front-side lens unit can be fixed whereby it is possible to reduce the weight of the front-side lens unit and to reduce centroid change in the entire system due to focusing operation. Therefore, more stable shooting is possible in all states.

In the image forming lens system of the present embodiment, it is preferable that the lens unit located closest to the image side be fixed in all states.

The lens unit located closest to the image side is a lens unit closest to the image pickup surface. Hence, by fixing the lens unit located closest to the image side in all states, it is possible to alleviate occurrence of dust due to driving of the lens unit and, in addition, it is possible to alleviate adherence of dust to the image pickup surface.

In the image forming lens system of the present embodiment, it is preferable that the aperture stop be fixed in position in all states.

By doing so, the position of the aperture stop becomes stable, and it is possible to reduce errors of the F-number. Furthermore, since variations in incident light flux diameter due to movement of the position of the aperture stop are reduced and incidence of unnecessary light flux can be reduced, it is possible to alleviate occurrence of flare.

In the image forming lens system of the present embodiment, it is preferable that the first lens unit be fixed in all states.

The weight of the first lens unit tends to be large. By fixing the first lens unit in all states, it is possible to reduce change in centroid position of the optical system. As a result, more stable shooting becomes possible in all states.

In the image forming lens system of the present embodiment, it is preferable that only the second lens unit move in the optical axis direction.

By doing so, it is possible to further reduce change in centroid of the optical system.

In the image forming lens system of the present embodiment, it is preferable that following Conditional Expression (22) be satisfied:

$$0.01 \leq |\Delta Zah1| \leq 20 \quad (22)$$

where $$\Delta Zah1 = 1000 \times N \times (\Delta Zasph1/h1),$$

h1 is a maximum height of on-axis subordinate light rays in the aspherical surface, $\Delta Zasph1$ is a difference between the aspherical surface and a reference spherical surface that is measured in a direction horizontal to an optical axis at the maximum height, where the reference spherical surface is set such that its radius is a paraxial radius of curvature of the aspherical surface and its surface top is a surface top of the aspherical surface, and N is a refractive index on d Line of a lens element having the aspherical surface.

The height of on-axis subordinate light rays passing through the aspherical surface changes with the diameter of the aperture stop. Hence, h1 is the height of on-axis subordinate light rays in the aspherical surface when the diameter of the aperture stop is largest. This height is the distance from the intersection point of the aspherical surface and the on-axis subordinate light rays to the optical axis.

In a case of falling below a lower limit value of Conditional Expression (22), the correction effect for spherical aberration is not obtained sufficiently. Therefore, it becomes difficult to reduce the total length of the optical system. In a case of exceeding an upper limit value of Conditional Expression (22), the burden of correcting spherical aberration concentrates on the aspherical surface. Therefore, reduction of the imaging performance due to decentration of the aspherical surface is increased. Hence, exceeding the upper limit value of Conditional Expression (22) is not preferable.

It is preferable that following Conditional Expression (22'), (22''), (22'''), (22''''), or (22''''') be satisfied instead of Conditional Expression (22):

$$0.03 \leq |\Delta Zah1| \leq 15 \quad (22')$$

$$0.1 \leq |\Delta Zah1| \leq 12 \quad (22'')$$

$$0.3 \leq |\Delta Zah1| \leq 10 \quad (22''')$$

$$0.5 \leq |\Delta Zah1| \leq 8 \quad (22'''')$$

$$1.0 \leq |\Delta Zah1| \leq 7 \quad (22''''').$$

In the image forming lens system of the present embodiment, it is preferable that following Conditional Expression (23) be satisfied:

$$5 \leq |\Delta Zah1|/|\Delta Zah2| \leq 40 \quad (23)$$

where $$\Delta Zah1 = 1000 \times N \times (\Delta Zasph1/h1),$$

$$\Delta Zah2 = 1000 \times N \times (\Delta Zasph2/h2),$$

h1 is the maximum height of on-axis subordinate light rays in the aspherical surface, h2 is a height half the maximum height, $\Delta Zasph1$ is the difference between the aspherical surface and a reference spherical surface that is measured in a direction horizontal to an optical axis at the maximum height, where the reference spherical surface is set such that its radius is a paraxial radius of curvature of the aspherical surface and its surface top is a surface top of the aspherical surface, $\Delta Zasph2$ is a difference between the aspherical surface and the reference spherical surface that is measured in a direction horizontal to an optical axis at a height half the maximum height, and N is the refractive index on d Line of a lens element having the aspherical surface.

In a case of falling below a lower limit value of Conditional Expression (23), the bending of spherical aberration at the middle portion of vignetting becomes large. In this case, reduction of resolution is incurred in a region in which spatial frequency is high.

Moreover, when image pickup is performed with a larger aperture stop, an image in which the difference between an in-focus portion and an out-focus portion is conspicuous is obtained. In a case of falling below the lower limit value of Conditional Expression (23), unevenness of light intensity in an out-focus portion becomes conspicuous. Therefore, an out-focus portion, that is, a blurred image becomes unclean. For example, unevenness of intensity in a blurred image becomes conspicuous to result in an unnatural blurred image, for example, double-line blur occurs or a certain outline portion is enhanced. Hence, falling below the lower limit value of Conditional Expression (23) is not preferable.

In a case of exceeding an upper limit value of Conditional Expression (23), the bending of the top portion of the curve exhibiting spherical aberration and separation of colors (separation according to wavelength of spherical aberration) tend to increase. That is, flare tends to be conspicuous. Hence, exceeding the upper limit value of Conditional Expression (23) is not preferable.

It is preferable that following Conditional Expression (23'), (23''), (23'''), (23''''), or (23''''') be satisfied instead of Conditional Expression (23):

$$5.5 \leq |\Delta Zah1|/|\Delta Zah2| \leq 35 \quad (23')$$

$$6 \leq |\Delta Zah1|/|\Delta Zah2| \leq 30 \quad (23'')$$

$$6 \leq |\Delta Zah1|/|\Delta Zah2| \leq 25 \quad (23''')$$

$$6 \leq |\Delta Zah1|/|\Delta Zah2| \leq 20 \quad (23'''')$$

$$7 \leq |\Delta Zah1|/|\Delta Zah2| \leq 15 \quad (23''''').$$

In the image forming lens system of the present embodiment, it is preferable that the front-side lens unit include a lens element located closer to the object side than the predetermined negative lens element that satisfies following Conditional Expression (b):

$$0.02 \leq DNx/\varphi enp \quad (b)$$

where

DNx is the thickness on an optical axis of the predetermined negative lens element, and φenp is the maximum diameter of an entrance pupil of the image forming lens system in a state of achieving a longest focal length at a time of focusing to a furthest distance.

The technical meaning of Conditional Expression (b) is as described above.

In the image forming lens system of the present embodiment, it is preferable that the front-side lens unit include a lens element located closer to the object side than a predetermined negative lens element that satisfies following Conditional Expression (a-1):

$$0.4 \leq |f/fLn| \quad (a-1)$$

where f is the longest focal length of the entire image forming lens system at a time of focusing to a furthest distance, fLn is a focal length of the predetermined negative lens element, and the lens element is a lens having two refractive surfaces which are an object-side surface and an image-side surface, and having no other refractive surface between the two refractive surfaces.

As described above, the volume of the front-side lens unit is largest in the optical system. Hence, in order to reduce the weight of the optical system, it is preferable that a lens element having a large weight be not disposed in the front-side lens unit.

A negative lens element that satisfies Conditional Expression (a-1) is a lens element having large refractive power, that is, a negative lens element having a large weight. Hence, it is preferable that a negative lens element that satisfies Conditional Expression (a-1) be not included in the front-side lens unit.

In order that a negative lens element that satisfies Conditional Expression (a-1) is not made to be included in the front-side lens unit, it is desirable that the front-side lens unit and the rear-side lens unit are separated with the predetermined negative lens element on the boundary. The predetermined negative lens is a negative lens element located closest to the object side in the rear-side lens unit, among the negative lens elements that satisfy Conditional Expression (a-1).

By making such that the front-side lens unit includes all the lens elements located closer to the object side than the predetermined negative lens element, a lens element having a large weight is not included in the front-side lens unit. When not only a lens element but also a lens component is located closer to the object side than the predetermined negative lens element, the lens component is also included in the front-side lens unit.

The lens element that does not reach the lower limit value of Conditional Expression (a-1) is a lens element having small refractive power. Therefore, even when a negative lens element is disposed in the front-side lens unit, the volume of the lens is not increased as long as the lens element that dose not reach the lower limit value of Conditional Expression (a-1).

Furthermore, because the refractive power is small, even when such a lens element is disposed in the front-side lens unit, it is possible to ensure positive refractive power necessary for the front-side lens unit with no problem. Hence, it is acceptable that a lens that does not reach the lower limit value of Conditional Expression (a-1) is disposed in the front-side lens unit.

It is preferable that following Conditional Expression (a-1'), (a-1''), or (a-1''') be satisfied instead of Conditional Expression (a-1):

$$0.5 \leq |f/fLn| \quad (a-1')$$

$$0.6 \leq |f/fLn| \quad (a-1'')$$

$$0.7 \leq |f/fLn| \quad (a-1''').$$

In the image forming lens system of the present embodiment, it is preferable that the front-side lens unit include a lens located closer to the object side than a predetermined negative lens that satisfies following Conditional Expression (c):

$$0.007 \leq DNx/LTLmin \quad (c)$$

where

DNx is the thickness on an optical axis of the predetermined negative lens element, and LTLmin is a minimum total length of the image forming lens system.

The total length of the image forming lens system is the distance from the plane located closest to the object side to the imaging plane.

The lens element that satisfies Conditional Expression (c) is a lens element with a large thickness. If a lens element with a large thickness is disposed in the front-side lens unit, the size of the front-side lens unit is increased. Thus, it is preferable that the front-side lens unit do not include a negative lens element that satisfies Conditional Expression (c).

The lens element that does not reach the lower limit value of Conditional Expression (c) is a lens element with a small thickness. Therefore, even when a negative lens element is disposed in the front-side lens unit, the volume of the front-side lens unit is not increased as long as the lens element that does not reach the lower limit value of Conditional Expression (c). Hence, it is acceptable that the lens element that does not reach the lower limit value of Conditional Expression (c) is disposed in the front-side lens unit.

It is preferable that following Conditional Expression (c') or (c") be satisfied instead of Conditional Expression (c):

$$0.0065 \leq DNx/LTLmin \quad (c')$$

$$0.006 \leq DNx/LTLmin \quad (c'').$$

An image pickup apparatus of the present embodiment includes an optical system and an image pickup element having an image plane and converting an image formed on the image plane by the optical system to an electrical signal, and the optical system is the image forming lens system of the present embodiment.

It is possible to provide an image pickup apparatus having excellent portability and producing a high-quality image.

Examples of image forming lens system will be described in details below based on the drawings. It is noted that the present invention is not limited by those Examples.

The lens cross-sectional diagrams of Examples will be described.

FIG. 1A, FIG. 2A, FIG. 3A, FIG. 4A, FIG. 5A, FIG. 6A, FIG. 7A, FIG. 8A, and FIG. 9A show lens cross-sectional diagrams at a time of focusing to an object point at infinity.

FIG. 1B, FIG. 2B, FIG. 3B, FIG. 4B, FIG. 5B, FIG. 6B, FIG. 7B, FIG. 8B, and FIG. 9B show lens cross-sectional diagrams at a time of focusing to an object point at a close distance.

The aberration diagrams of Examples will be described.

FIG. 10A, FIG. 11A, FIG. 12A, FIG. 13A, FIG. 14A, FIG. 15A, FIG. 16A, FIG. 17A, and FIG. 18A show spherical aberration (SA) at a time of focusing to an object point at infinity.

FIG. 10B, FIG. 11B, FIG. 12B, FIG. 13B, FIG. 14B, FIG. 15B, FIG. 16B, FIG. 17B, and FIG. 18B show astigmatism (AS) at a time of focusing to an object point at infinity.

FIG. 10C, FIG. 11C, FIG. 12C, FIG. 13C, FIG. 14C, FIG. 15C, FIG. 16C, FIG. 17C, and FIG. 18C show distortion (DT) at a time of focusing to an object point at infinity.

FIG. 10D, FIG. 11D, FIG. 12D, FIG. 13D, FIG. 14D, FIG. 15D, FIG. 16D, FIG. 17D, and FIG. 18D show chromatic aberration of magnification (CC) at a time of focusing to an object point at infinity.

FIG. 10E, FIG. 11E, FIG. 12E, FIG. 13E, FIG. 14E, FIG. 15E, FIG. 16E, FIG. 17E, and FIG. 18E show spherical aberration (SA) at a time of focusing to an object point at a close distance.

FIG. 10F, FIG. 11F, FIG. 12F, FIG. 13F, FIG. 14F, FIG. 15F, FIG. 16F, FIG. 17F, and FIG. 18F show astigmatism (AS) at a time of focusing to an object point at a close distance.

FIG. 10G, FIG. 11G, FIG. 12G, FIG. 13G, FIG. 14G, FIG. 15G, FIG. 16G, FIG. 17G, and FIG. 18G show distortion (DT) at a time of focusing to an object point at a close distance.

FIG. 10H, FIG. 11H, FIG. 12H, FIG. 13H, FIG. 14H, FIG. 15H, FIG. 16H, FIG. 17H, and FIG. 18H show chromatic aberration of magnification (CC) at a time of focusing to an object point at a close distance.

An image forming lens system of Example 1 includes in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a biconvex positive lens L1, a positive meniscus lens L2 having a convex surface facing toward the object side, a negative meniscus lens L3 having a convex surface facing toward the object side, a biconvex positive lens L4, a biconvex positive lens L5, a biconcave negative lens L6, a positive meniscus lens L7 having a convex surface facing toward the image side, and a negative meniscus lens L8 having a convex surface facing toward the image side.

Here, the negative meniscus lens L3 and the biconvex positive lens L4 are cemented together. The biconvex positive lens L5 and the biconcave negative lens L6 are cemented together. The positive meniscus lens L7 and the negative meniscus lens L8 are cemented together.

A front-side lens unit includes the biconvex positive lens L1 and the positive meniscus lens L2. A rear-side lens unit includes a first rear-side lens unit and a second rear-side lens unit. The first rear-side lens unit includes the negative meniscus lens L3, the biconvex positive lens L4, the biconvex positive lens L5, and the biconcave negative lens L6. The second rear-side lens unit includes the positive meniscus lens L7 and the negative meniscus lens L8.

The second lens unit G2 includes a biconvex positive lens L9 and a biconcave negative lens L10. Here, the biconvex positive lens L9 and the biconcave negative lens L10 are cemented together.

The third lens unit G3 includes a negative meniscus lens L11 having a convex surface facing toward the object side, a biconvex positive lens L12, a biconvex positive lens L13, a biconcave negative lens L14, a biconcave negative lens L15, a biconvex positive lens L16, a negative meniscus lens L17 having a convex surface facing toward the image side, a biconvex positive lens L18, and a negative meniscus lens L19 having a convex surface facing toward the image side.

Here, the negative meniscus lens L11 and the biconvex positive lens L12 are cemented together. The biconvex positive lens L13 and the biconcave negative lens L14 are cemented together. The biconvex positive lens L16 and the negative meniscus lens L17 are cemented together. The biconvex positive lens L18 and the negative meniscus lens L19 are cemented together.

An object-side sub-lens unit includes the negative meniscus lens L11 and the biconvex positive lens L12. A camera shake correction lens unit includes the biconvex positive lens L13, the biconcave negative lens L14, and the biconcave negative lens L15. An image-side sub-lens unit includes the biconvex positive lens L16, the negative meniscus lens L17, the biconvex positive lens L18, and the negative meniscus lens L19.

At a time of focusing from an object at infinity to an object at a close distance, the second lens unit G2 moves to the image side. At a time of camera shake correction, the camera shake correction lens unit moves in a direction vertical to the optical axis.

An aspherical surface is provided on the image-side surface of the positive meniscus lens L2.

An image forming lens system of Example 2 includes in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a biconvex positive lens L1, a positive meniscus lens L2 having a convex surface facing toward the object side, a negative meniscus lens L3 having a convex surface facing toward the object side, a positive meniscus lens L4 having a convex surface facing toward the object side, a positive meniscus lens L5 having a convex surface facing toward the object side, a negative meniscus lens L6 having a convex surface facing toward the object side, a biconvex positive lens L7, and a negative meniscus lens L8 having a convex surface facing toward the image side.

Here, the negative meniscus lens L3 and the positive meniscus lens L4 are cemented together. The positive meniscus lens L5 and the negative meniscus lens L6 are cemented together. The biconvex positive lens L7 and the negative meniscus lens L8 are cemented together.

A front-side lens unit includes the biconvex positive lens L1 and the positive meniscus lens L2. A rear-side lens unit includes a first rear-side lens unit and a second rear-side lens unit. The first rear-side lens unit includes the negative meniscus lens L3, the positive meniscus lens L4, the positive meniscus lens L5, and the negative meniscus lens L6. The second rear-side lens unit includes the biconvex positive lens L7 and the negative meniscus lens L8.

The second lens unit G2 includes a biconvex positive lens L9 and a biconcave negative lens L10. Here, the biconvex positive lens L9 and the biconcave negative lens L10 are cemented together.

The third lens unit G3 includes a negative meniscus lens L11 having a convex surface facing toward the object side, a biconvex positive lens L12, a biconvex positive lens L13, a biconcave negative lens L14, a biconcave negative lens L15, a biconvex positive lens L16, a negative meniscus lens L17 having a convex surface facing toward the image side, a biconvex positive lens L18, and a negative meniscus lens L19 having a convex surface facing toward the image side.

Here, the negative meniscus lens L11 and the biconvex positive lens L12 are cemented together. The biconvex positive lens L13 and the biconcave negative lens L14 are cemented together. The biconvex positive lens L16 and the negative meniscus lens L17 are cemented together. The biconvex positive lens L18 and the negative meniscus lens L19 are cemented together.

An object-side sub-lens unit includes the negative meniscus lens L11 and the biconvex positive lens L12. A camera shake correction lens unit includes the biconvex positive lens L13, the biconcave negative lens L14, and the biconcave negative lens L15. An image-side sub-lens unit includes the biconvex positive lens L16, the negative meniscus lens L17, the biconvex positive lens L18, and the negative meniscus lens L19.

At a time of focusing from an object at infinity to an object at a close distance, the second lens unit G2 moves to the image side. At a time of camera shake correction, the camera shake correction lens unit moves in a direction vertical to the optical axis.

An aspherical surface is provided on the image-side surface of the positive meniscus lens L2.

An image forming lens system of Example 3 includes in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing toward the object side, a positive meniscus lens L2 having a convex surface facing toward the object side, a negative meniscus lens L3 having a convex surface facing toward the object side, a positive meniscus lens L4 having a convex surface facing toward the object side, a biconvex positive lens L5, a biconcave negative lens L6, a biconvex positive lens L7, and a negative meniscus lens L8 having a convex surface facing toward the image side.

Here, the negative meniscus lens L3 and the positive meniscus lens L4 are cemented together. The biconvex positive lens L5 and the biconcave negative lens L6 are cemented together. The biconvex positive lens L7 and the negative meniscus lens L8 are cemented together.

A front-side lens unit includes the positive meniscus lens L1 and the positive meniscus lens L2. A rear-side lens unit includes a first rear-side lens unit and a second rear-side lens unit. The first rear-side lens unit includes the negative meniscus lens L3, the positive meniscus lens L4, the biconvex positive lens L5, and the biconcave negative lens L6. The second rear-side lens unit includes the biconvex positive lens L7 and the negative meniscus lens L8.

The second lens unit G2 includes a biconvex positive lens L9 and a biconcave negative lens L10. Here, the biconvex positive lens L9 and the biconcave negative lens L10 are cemented together.

The third lens unit G3 includes a negative meniscus lens L11 having a convex surface facing toward the object side, a biconvex positive lens L12, a biconvex positive lens L13, a biconcave negative lens L14, a biconcave negative lens L15, a biconvex positive lens L16, a negative meniscus lens L17 having a convex surface facing toward the image side, a biconvex positive lens L18, and a negative meniscus lens L19 having a convex surface facing toward the image side.

Here, the negative meniscus lens L11 and the biconvex positive lens L12 are cemented together. The biconvex positive lens L13 and the biconcave negative lens L14 are cemented together. The biconvex positive lens L16 and the negative meniscus lens L17 are cemented together. The biconvex positive lens L18 and the negative meniscus lens L19 are cemented together.

An object-side sub-lens unit includes the negative meniscus lens L11 and the biconvex positive lens L12. A camera shake correction lens unit includes the biconvex positive lens L13, the biconcave negative lens L14, and the biconcave negative lens L15. An image-side sub-lens unit includes the biconvex positive lens L16, the negative meniscus lens L17, the biconvex positive lens L18, and the negative meniscus lens L19.

At a time of focusing from an object at infinity to an object at a close distance, the second lens unit G2 moves to the image side. At a time of camera shake correction, the camera shake correction lens unit moves in a direction vertical to the optical axis.

An aspherical surface is provided on the image-side surface of the biconcave negative lens L6.

An image forming lens system of Example 4 includes in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing toward the object side, a positive meniscus lens L2 having a convex surface facing toward the object side, a negative meniscus lens L3 having a convex surface facing toward the object side, a positive meniscus lens L4 having a convex surface facing toward the object side, a biconvex positive lens L5, a biconcave negative lens L6, a positive meniscus lens L7 having a convex surface facing toward the image side, and a negative meniscus lens L8 having a convex surface facing toward the image side.

Here, the negative meniscus lens L3 and the positive meniscus lens L4 are cemented together. The biconvex positive lens L5 and the biconcave negative lens L6 are cemented together. The positive meniscus lens L7 and the negative meniscus lens L8 are cemented together.

A front-side lens unit includes the positive meniscus lens L1 and the positive meniscus lens L2. A rear-side lens unit includes a first rear-side lens unit and a second rear-side lens unit. The first rear-side lens unit includes the negative meniscus lens L3, the positive meniscus lens L4, the biconvex positive lens L5, and the biconcave negative lens L6. The second rear-side lens unit includes the positive meniscus lens L7 and the negative meniscus lens L8.

The second lens unit G2 includes a biconvex positive lens L9 and a biconcave negative lens L10. Here, the biconvex positive lens L9 and the biconcave negative lens L10 are cemented together.

The third lens unit G3 includes a negative meniscus lens L11 having a convex surface facing toward the object side, a biconvex positive lens L12, a biconvex positive lens L13, a biconcave negative lens L14, a biconcave negative lens L15, a biconvex positive lens L16, a negative meniscus lens L17 having a convex surface facing toward the image side, a biconvex positive lens L18, and a negative meniscus lens L19 having a convex surface facing toward the image side.

Here, the negative meniscus lens L11 and the biconvex positive lens L12 are cemented together. The biconvex positive lens L13 and the biconcave negative lens L14 are cemented together. The biconvex positive lens L16 and the negative meniscus lens L17 are cemented together. The biconvex positive lens L18 and the negative meniscus lens L19 are cemented together.

An object-side sub-lens unit includes the negative meniscus lens L11 and the biconvex positive lens L12. A camera shake correction lens unit includes the biconvex positive lens L13, the biconcave negative lens L14, and the biconcave negative lens L15. An image-side sub-lens unit includes the biconvex positive lens L16, the negative meniscus lens L17, the biconvex positive lens L18, and the negative meniscus lens L19.

At a time of focusing from an object at infinity to an object at a close distance, the second lens unit G2 moves to the image side. At a time of camera shake correction, the camera shake correction lens unit moves in a direction vertical to the optical axis.

An aspherical surface is provided on the image-side surface of the biconcave negative lens L6.

An image forming lens system of Example 5 includes in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing toward the object side, a positive meniscus lens L2 having a convex surface facing toward the object side, a negative meniscus lens L3 having a convex surface facing toward the object side, a positive meniscus lens L4 having a convex surface facing toward the object side, a biconvex positive lens L5, a negative meniscus lens L6 having a convex surface facing toward the image side, a biconvex positive lens L7, and a negative meniscus lens L8 having a convex surface facing toward the image side.

Here, the negative meniscus lens L3 and the positive meniscus lens L4 are cemented together. The biconvex positive lens L5 and the negative meniscus lens L6 are cemented together. The biconvex positive lens L7 and the negative meniscus lens L8 are cemented together.

A front-side lens unit includes the positive meniscus lens L1 and the positive meniscus lens L2. A rear-side lens unit includes a first rear-side lens unit and a second rear-side lens unit. The first rear-side lens unit includes the negative meniscus lens L3, the positive meniscus lens L4, the biconvex positive lens L5, and the negative meniscus lens L6. The second rear-side lens unit includes the biconvex positive lens L7 and the negative meniscus lens L8.

The second lens unit G2 includes a biconvex positive lens L9 and a biconcave negative lens L10. Here, the biconvex positive lens L9 and the biconcave negative lens L10 are cemented together.

The third lens unit G3 includes a negative meniscus lens L11 having a convex surface facing toward the object side, a biconvex positive lens L12, a biconvex positive lens L13, a biconcave negative lens L14, a biconcave negative lens L15, a biconvex positive lens L16, a negative meniscus lens L17 having a convex surface facing toward the image side, a biconvex positive lens L18, and a negative meniscus lens L19 having a convex surface facing toward the image side.

Here, the negative meniscus lens L11 and the biconvex positive lens L12 are cemented together. The biconvex positive lens L13 and the biconcave negative lens L14 are cemented together. The biconvex positive lens L16 and the negative meniscus lens L17 are cemented together. The biconvex positive lens L18 and the negative meniscus lens L19 are cemented together.

An object-side sub-lens unit includes the negative meniscus lens L11 and the biconvex positive lens L12. A camera shake correction lens unit includes the biconvex positive lens L13, the biconcave negative lens L14, and the biconcave negative lens L15. An image-side sub-lens unit includes the biconvex positive lens L16, the negative meniscus lens L17, the biconvex positive lens L18, and the negative meniscus lens L19.

At a time of focusing from an object at infinity to an object at a close distance, the second lens unit G2 moves to the image side. At a time of camera shake correction, the camera shake correction lens unit moves in a direction vertical to the optical axis.

An aspherical surface is provided on the image-side surface of the negative meniscus lens L6.

An image forming lens system of Example 6 includes in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing toward the object side, a positive meniscus lens L2 having a convex surface facing toward the object side, a negative meniscus lens L3 having a convex surface facing toward the object side, a positive meniscus lens L4 having a convex surface facing toward the object side, a positive meniscus lens L5 having a convex surface facing toward the object side, a negative meniscus lens L6 having a convex surface facing toward the object side, a biconvex positive lens L7, and a negative meniscus lens L8 having a convex surface facing toward the image side.

Here, the negative meniscus lens L3 and the positive meniscus lens L4 are cemented together. The positive meniscus lens L5 and the negative meniscus lens L6 are cemented together. The biconvex positive lens L7 and the negative meniscus lens L8 are cemented together.

A front-side lens unit includes the positive meniscus lens L1 and the positive meniscus lens L2. A rear-side lens unit includes a first rear-side lens unit and a second rear-side lens unit. The first rear-side lens unit includes the negative meniscus lens L3, the positive meniscus lens L4, the positive meniscus lens L5, and the negative meniscus lens L6. The second rear-side lens unit includes the biconvex positive lens L7 and the negative meniscus lens L8.

The second lens unit G2 includes a biconvex positive lens L9 and a biconcave negative lens L10. Here, the biconvex positive lens L9 and the biconcave negative lens L10 are cemented together.

The third lens unit G3 includes a negative meniscus lens L11 having a convex surface facing toward the object side, a biconvex positive lens L12, a biconvex positive lens L13, a biconcave negative lens L14, a biconcave negative lens L15, a biconvex positive lens L16, a negative meniscus lens L17 having a convex surface facing toward the image side, a biconvex positive lens L18, and a negative meniscus lens L19 having a convex surface facing toward the image side.

Here, the negative meniscus lens L11 and the biconvex positive lens L12 are cemented together. The biconvex positive lens L13 and the biconcave negative lens L14 are cemented together. The biconvex positive lens L16 and the negative meniscus lens L17 are cemented together. The biconvex positive lens L18 and the negative meniscus lens L19 are cemented together.

An object-side sub-lens unit includes the negative meniscus lens L11 and the biconvex positive lens L12. A camera shake correction lens unit includes the biconvex positive lens L13, the biconcave negative lens L14, and the biconcave negative lens L15. An image-side sub-lens unit includes the biconvex positive lens L16, the negative meniscus lens L17, the biconvex positive lens L18, and the negative meniscus lens L19.

At a time of focusing from an object at infinity to an object at a close distance, the second lens unit G2 moves to the image side. At a time of camera shake correction, the camera shake correction lens unit moves in a direction vertical to the optical axis.

Aspherical surfaces are provided on the image-side surface of the positive meniscus lens L2 and the image-side surface of the positive meniscus lens L4.

An image forming lens system of Example 7 includes in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing toward the object side, a positive meniscus lens L2 having a convex surface facing toward the object side, a negative meniscus lens L3 having a convex surface facing toward the object side, a positive meniscus lens L4 having a convex surface facing toward the object side, a biconvex positive lens L5, a biconcave negative lens L6, a biconvex positive lens L7, and a negative meniscus lens L8 having a convex surface facing toward the image side.

Here, the negative meniscus lens L3 and the positive meniscus lens L4 are cemented together. The biconvex positive lens L5 and the biconcave negative lens L6 are cemented together. The biconvex positive lens L7 and the negative meniscus lens L8 are cemented together.

A front-side lens unit includes the positive meniscus lens L1 and the positive meniscus lens L2. A rear-side lens unit includes a first rear-side lens unit and a second rear-side lens unit. The first rear-side lens unit includes the negative meniscus lens L3, the positive meniscus lens L4, the biconvex positive lens L5, and the biconcave negative lens L6. The second rear-side lens unit includes the biconvex positive lens L7 and the negative meniscus lens L8.

The second lens unit G2 includes a biconvex positive lens L9 and a biconcave negative lens L10. Here, the biconvex positive lens L9 and the biconcave negative lens L10 are cemented together.

The third lens unit G3 includes a negative meniscus lens L11 having a convex surface facing toward the object side, a biconvex positive lens L12, a biconvex positive lens L13, a biconcave negative lens L14, a biconcave negative lens L15, a biconvex positive lens L16, a negative meniscus lens L17 having a convex surface facing toward the image side, a biconvex positive lens L18, and a negative meniscus lens L19 having a convex surface facing toward the image side.

Here, the negative meniscus lens L11 and the biconvex positive lens L12 are cemented together. The biconvex positive lens L13 and the biconcave negative lens L14 are cemented together. The biconvex positive lens L16 and the negative meniscus lens L17 are cemented together. The biconvex positive lens L18 and the negative meniscus lens L19 are cemented together.

An object-side sub-lens unit includes the negative meniscus lens L11 and the biconvex positive lens L12. A camera shake correction lens unit includes the biconvex positive lens L13, the biconcave negative lens L14, and the biconcave negative lens L15. An image-side sub-lens unit includes the biconvex positive lens L16, the negative meniscus lens L17, the biconvex positive lens L18, and the negative meniscus lens L19.

At a time of focusing from an object at infinity to an object at a close distance, the second lens unit G2 moves to the image side. At a time of camera shake correction, the camera shake correction lens unit moves in a direction vertical to the optical axis.

An aspherical surface is provided on the image-side surface of the biconcave negative lens L6.

An image forming lens system of Example 8 includes in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a biconvex positive lens L1, a positive meniscus lens L2 having a convex surface facing toward the object side, a negative meniscus lens L3 having a convex surface facing toward the object side, a negative meniscus lens L4 having a convex surface facing toward the object side, a positive meniscus lens L5 having a convex surface facing toward the object side, a biconvex positive lens L6, a biconcave negative lens L7, a biconvex positive lens L8, and a negative meniscus lens L9 having a convex surface facing toward the image side. The negative meniscus lens L3 is a thin resin layer.

Here, the positive meniscus lens L2 and the negative meniscus lens L3 are cemented together. The negative meniscus lens L4 and the positive meniscus lens L5 are cemented together. The biconvex positive lens L6 and the biconcave negative lens L7 are cemented together. The biconvex positive lens L8 and the negative meniscus lens L9 are cemented together.

A front-side lens unit includes the biconvex positive lens L1, the positive meniscus lens L2, and the negative meniscus lens L3. A rear-side lens unit includes a first rear-side lens unit and a second rear-side lens unit. The first rear-side lens unit includes the negative meniscus lens L4, the positive meniscus lens L5, the biconvex positive lens L6, and the biconcave negative lens L7. The second rear-side lens unit includes the biconvex positive lens L8 and the negative meniscus lens L9.

The second lens unit G2 includes a biconvex positive lens L10 and a biconcave negative lens L11. Here, the biconvex positive lens L10 and the biconcave negative lens L11 are cemented together.

The third lens unit G3 includes a biconvex positive lens L12, a positive meniscus lens L13 having a convex surface facing toward the object side, a negative meniscus lens L14 having a convex surface facing toward the object side, a biconcave negative lens L15, a biconvex positive lens L16, a biconcave negative lens L17, a biconvex positive lens L18, and a negative meniscus lens L19 having a convex surface facing toward the image side.

Here, the positive meniscus lens L13 and the negative meniscus lens L14 are cemented together. The biconvex positive lens L16 and the biconcave negative lens L17 are cemented together. The biconvex positive lens L18 and the negative meniscus lens L19 are cemented together.

An object-side sub-lens unit includes the biconvex positive lens L12. A camera shake correction lens unit includes the positive meniscus lens L13, the negative meniscus lens L14, and the biconcave negative lens L15. An image-side sub-lens unit includes the biconvex positive lens L16, the biconcave negative lens L17, the biconvex positive lens L18, and the negative meniscus lens L19.

At a time of focusing from an object at infinity to an object at a close distance, the second lens unit G2 moves to the image side. At a time of camera shake correction, the camera shake correction lens unit moves in a direction vertical to the optical axis.

An aspherical surface is provided on the image-side surface of the negative meniscus lens L3.

An image forming lens system of Example 9 includes in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing toward the object side, a positive meniscus lens L2 having a convex surface facing toward the object side, a negative meniscus lens L3 having a convex surface facing toward the object side, a negative meniscus lens L4 having a convex surface facing toward the object side, a positive meniscus lens L5 having a convex surface facing toward the object side, a biconvex positive lens L6, a biconcave negative lens L7, a biconvex positive lens L8, and a negative meniscus lens L9 having a convex surface facing toward the image side. The negative meniscus lens L3 is a thin resin layer.

Here, the positive meniscus lens L2 and the negative meniscus lens L3 are cemented together. The negative meniscus lens L4 and the positive meniscus lens L5 are cemented together. The biconvex positive lens L6 and the biconcave negative lens L7 are cemented together. The biconvex positive lens L8 and the negative meniscus lens L9 are cemented together.

A front-side lens unit includes the positive meniscus lens L1, the positive meniscus lens L2, and the negative meniscus lens L3. A rear-side lens unit includes a first rear-side lens unit and a second rear-side lens unit. The first rear-side lens unit includes the negative meniscus lens L4, the positive meniscus lens L5, the biconvex positive lens L6, and the biconcave negative lens L7. The second rear-side lens unit includes the biconvex positive lens L8 and the negative meniscus lens L9.

The second lens unit G2 includes a positive meniscus lens L10 having a convex surface facing toward the object side and a negative meniscus lens L11 having a convex surface facing toward the object side. Here, the positive meniscus lens L10 and the negative meniscus lens L11 are cemented together.

The third lens unit G3 includes a biconvex positive lens L12, a biconvex positive lens L13, a biconcave negative lens L14, a biconcave negative lens L15, a biconvex positive lens L16, a biconcave negative lens L17, a biconvex positive lens L18, and a negative meniscus lens L19 having a convex surface facing toward the image side.

Here, the biconvex positive lens L13 and the biconcave negative lens L14 are cemented together. The biconvex positive lens L16 and the biconcave negative lens L17 are cemented together. The biconvex positive lens L18 and the negative meniscus lens L19 are cemented together.

An object-side sub-lens unit includes the biconvex positive lens L12. A camera shake correction lens unit includes the biconvex positive lens L13, the biconcave negative lens L14, and the biconcave negative lens L15. An image-side sub-lens unit includes the biconvex positive lens L16, the biconcave negative lens L17, the biconvex positive lens L18, and the negative meniscus lens L19.

At a time of focusing from an object at infinity to an object at a close distance, the second lens unit G2 moves to the image side. At a time of camera shake correction, the camera shake correction lens unit moves in a direction vertical to the optical axis.

An aspherical surface is provided on the image-side surface of the negative meniscus lens L3.

Numerical data of each example described above is shown below. In Surface data, r denotes radius of curvature of each lens surface, d denotes a distance between respective lens surfaces, nd denotes a refractive index of each lens for a d-line, νd denotes an Abbe number for each lens and *denotes an aspherical surface.

Further, in Various data, OB denotes a object distance, f denotes a focal length of the entire system, FNO. denotes an F number, ω denotes a half angle of view, LTL denotes a lens total length of the optical system, BF denotes a back focus. Back focus is a unit which is expressed upon air conversion of a distance from a rearmost lens surface to a paraxial image surface. The lens total length is a distance from a frontmost lens surface to the rearmost lens surface plus back focus. Infinite denotes at the time of focusing on an infinite object, Close denotes at the time of focusing on a close object. Unit of OB is mm.

A shape of an aspherical surface is defined by the following expression where the direction of the optical axis is represented by z, the direction orthogonal to the optical axis is represented by y, a conical coefficient is represented by K, aspherical surface coefficients are represented by A4, A6, A8, A10, A12 . . .

$$Z=(y^2/r)/[1+\{1-(1+k)(y/r)^2\}^{1/2}]+A4y^4+A6y^6+A8y^8+A10y^{10}+A12y^{12}+\ldots$$

Further, in the aspherical surface coefficients, 'e-n' (where, n is an integral number) indicates '$10^{-n}$'. Moreover, these symbols are commonly used in the following numerical data for each example.

Example 1

| Unit mm | | | | |
|---|---|---|---|---|
| Surface data | | | | |
| Surface no. | r | d | nd | vd |
| Object plane | ∞ | ∞ | | |
| 1 | 222.316 | 7.60 | 1.48749 | 70.23 |
| 2 | −16370.000 | 25.00 | | |
| 3 | 71.637 | 14.70 | 1.43875 | 94.66 |
| 4* | 436.801 | 31.26 | | |
| 5 | 218.528 | 2.00 | 1.80400 | 46.58 |
| 6 | 49.276 | 13.20 | 1.43875 | 94.66 |
| 7 | −374.781 | 0.30 | | |
| 8 | 63.635 | 8.00 | 1.43875 | 94.66 |
| 9 | −5376.103 | 1.60 | 1.69680 | 55.53 |
| 10 | 91.169 | 18.78 | | |
| 11 | −566.763 | 7.50 | 1.71736 | 29.52 |
| 12 | −56.933 | 2.50 | 1.91082 | 35.25 |
| 13 | −156.201 | 10.00 | | |
| 14(Stop) | ∞ | Variable | | |
| 15 | 210.469 | 2.10 | 1.80810 | 22.76 |
| 16 | −148.471 | 0.85 | 1.83481 | 42.73 |
| 17 | 36.030 | Variable | | |
| 18 | 34.126 | 1.00 | 1.92286 | 20.88 |
| 19 | 26.773 | 5.00 | 1.48749 | 70.23 |
| 20 | −111.158 | 3.60 | | |
| 21 | 176.785 | 3.00 | 1.80810 | 22.76 |
| 22 | −48.156 | 0.90 | 1.69680 | 55.53 |
| 23 | 21.802 | 4.16 | | |
| 24 | −37.048 | 0.90 | 1.69680 | 55.53 |
| 25 | 82.860 | 3.30 | | |
| 26 | 48.468 | 6.70 | 1.67270 | 32.10 |
| 27 | −31.215 | 2.50 | 1.92286 | 20.88 |
| 28 | −64.693 | 0.20 | | |
| 29 | 63.261 | 8.78 | 1.73800 | 32.26 |
| 30 | −28.147 | 2.00 | 1.92286 | 20.88 |
| 31 | −82.497 | 34.23 | | |
| Image plane | ∞ | | | |

Aspherical surface data

4th surface k = 0.000
A4 = 9.07000e−08, A6 = −3.01000e−12, A8 = 9.10050e−17,
A10 = 1.00000e−20

Various data

| | |
|---|---|
| 2ω | 3.18 |
| LTL (in air) | 269.21 |
| BF (in air) | 34.23 |

| | Infinite | Close |
|---|---|---|
| OB | ∞ | 2.0 |
| f | 391.70 | |
| FNO. | 4.08 | 3.08 |
| d14 | 19.00 | 40.19 |
| d17 | 28.55 | 7.36 |

Unit focal length

| | | |
|---|---|---|
| f1 = 169.74 | f2 = −51.64 | f3 = 118.20 |

Example 2

| Unit mm | | | | |
|---|---|---|---|---|
| Surface data | | | | |
| Surface no. | r | d | nd | vd |
| Object plane | ∞ | ∞ | | |
| 1 | 190.113 | 12.10 | 1.48749 | 70.23 |
| 2 | −1651.724 | 2.00 | | |
| 3 | 66.543 | 19.20 | 1.43875 | 94.66 |
| 4* | 316.470 | 18.00 | | |
| 5 | 156.048 | 3.40 | 1.78800 | 47.37 |
| 6 | 44.897 | 15.00 | 1.43875 | 94.66 |
| 7 | 371.143 | 1.25 | | |
| 8 | 54.090 | 9.20 | 1.43875 | 94.66 |
| 9 | 172.719 | 3.00 | 1.69680 | 55.53 |
| 10 | 61.309 | 24.10 | | |
| 11 | 706.435 | 6.12 | 1.74077 | 27.79 |
| 12 | −49.807 | 1.70 | 1.90366 | 31.32 |
| 13 | −290.310 | 9.28 | | |
| 14(Stop) | ∞ | Variable | | |
| 15 | 232.314 | 2.10 | 1.80810 | 22.76 |
| 16 | −95.980 | 0.85 | 1.83481 | 42.73 |
| 17 | 38.485 | Variable | | |
| 18 | 31.056 | 1.00 | 1.92286 | 20.88 |
| 19 | 23.376 | 5.00 | 1.48749 | 70.23 |
| 20 | −119.067 | 3.60 | | |
| 21 | 165.029 | 3.00 | 1.80810 | 22.76 |
| 22 | −39.727 | 0.90 | 1.73400 | 51.47 |
| 23 | 22.035 | 3.90 | | |
| 24 | −43.790 | 0.90 | 1.75500 | 52.32 |
| 25 | 91.031 | 3.30 | | |
| 26 | 49.754 | 8.00 | 1.69895 | 30.13 |
| 27 | −34.128 | 2.20 | 1.92286 | 20.88 |
| 28 | −69.617 | 0.20 | | |
| 29 | 58.922 | 7.50 | 1.73800 | 32.26 |
| 30 | −34.803 | 2.30 | 1.94595 | 17.98 |
| 31 | −111.115 | 31.58 | | |
| Image plane | ∞ | | | |

Aspherical surface data

4th surface k = 0.000
A4 = 9.46900e−08, A6 = −4.18324e−12, A8 = 1.50000e−16

Various data

| | |
|---|---|
| 2ω | 3.17 |
| LTL (in air) | 247.94 |
| BF (in air) | 31.58 |

| | Infinite | Close |
|---|---|---|
| OB | ∞ | 2.0 |
| f | 392.15 | |
| FNO. | 4.07 | 3.08 |
| d14 | 17.00 | 39.84 |
| d17 | 30.26 | 7.42 |

Unit focal length

| | | |
|---|---|---|
| f1 = 173.08 | f2 = −54.43 | f3 = 123.89 |

Example 3

Unit mm

Surface data

| Surface no. | r | d | nd | vd |
|---|---|---|---|---|
| Object plane | ∞ | ∞ | | |
| 1 | 157.829 | 12.00 | 1.48749 | 70.23 |
| 2 | 1556.845 | 13.00 | | |
| 3 | 78.913 | 15.00 | 1.43875 | 94.66 |
| 4 | 271.394 | 29.50 | | |
| 5 | 168.782 | 3.40 | 1.80400 | 46.58 |
| 6 | 49.568 | 12.10 | 1.43875 | 94.66 |
| 7 | 291.118 | 1.55 | | |
| 8 | 83.191 | 12.20 | 1.43875 | 94.66 |
| 9 | −102.344 | 3.00 | 1.69680 | 55.53 |
| 10* | 419.681 | 25.05 | | |
| 11 | 497.116 | 8.00 | 1.72151 | 29.23 |
| 12 | −47.058 | 2.70 | 1.90366 | 31.32 |
| 13 | −196.236 | 7.00 | | |
| 14(Stop) | ∞ | Variable | | |
| 15 | 245.299 | 2.10 | 1.80810 | 22.76 |
| 16 | −128.004 | 0.85 | 1.80400 | 46.58 |
| 17 | 35.052 | Variable | | |
| 18 | 31.126 | 1.00 | 1.92286 | 20.88 |
| 19 | 24.901 | 5.00 | 1.48749 | 70.23 |
| 20 | −128.917 | 3.60 | | |
| 21 | 112.269 | 3.00 | 1.80810 | 22.76 |
| 22 | −46.676 | 0.90 | 1.73400 | 51.47 |
| 23 | 22.422 | 3.85 | | |
| 24 | −41.208 | 0.90 | 1.75500 | 52.32 |
| 25 | 72.180 | 3.44 | | |
| 26 | 50.663 | 6.77 | 1.73800 | 32.26 |
| 27 | −32.312 | 2.50 | 1.92286 | 20.88 |
| 28 | −78.822 | 0.20 | | |
| 29 | 75.046 | 7.50 | 1.73800 | 32.26 |
| 30 | −27.201 | 2.30 | 1.92286 | 20.88 |
| 31 | −75.380 | 31.21 | | |
| Image plane | ∞ | | | |

Aspherical surface data

10th surface $k = 0.000$
$A4 = -2.15000e-07, A6 = -7.35663e-11, A8 = -1.26184e-14$

Various data

| | | |
|---|---|---|
| 2ω | 3.16 | |
| LTL (in air) | 267.03 | |
| BF (in air) | 31.21 | |

| | Infinite | Close |
|---|---|---|
| OB | ∞ | 2.0 |
| f | 391.51 | |
| FNO. | 4.06 | 3.08 |
| d14 | 19.00 | 40.27 |
| d17 | 28.41 | 7.13 |

Unit focal length

| f1 = 170.34 | f2 = −51.31 | f3 = 124.95 |
|---|---|---|

Example 4

Unit mm

Surface data

| Surface no. | r | d | nd | vd |
|---|---|---|---|---|
| Object plane | ∞ | ∞ | | |
| 1 | 139.744 | 13.00 | 1.48749 | 70.23 |
| 2 | 3047.125 | 1.00 | | |
| 3 | 70.767 | 18.00 | 1.43875 | 94.66 |
| 4 | 294.082 | 22.50 | | |
| 5 | 212.575 | 3.40 | 1.77250 | 49.60 |
| 6 | 44.874 | 14.80 | 1.43875 | 94.66 |
| 7 | 488.117 | 0.93 | | |
| 8 | 79.987 | 11.50 | 1.43875 | 94.66 |
| 9 | −105.507 | 2.80 | 1.69680 | 55.53 |
| 10* | 230.159 | 27.32 | | |
| 11 | −600.276 | 6.00 | 1.68893 | 31.07 |
| 12 | −42.148 | 1.70 | 1.91082 | 35.25 |
| 13 | −119.862 | 3.00 | | |
| 14(Stop) | ∞ | Variable | | |
| 15 | 208.620 | 2.10 | 1.80810 | 22.76 |
| 16 | −130.039 | 0.85 | 1.83481 | 42.73 |
| 17 | 37.158 | Variable | | |
| 18 | 33.257 | 1.00 | 1.92286 | 20.88 |
| 19 | 26.590 | 5.00 | 1.48749 | 70.23 |
| 20 | −125.168 | 3.60 | | |
| 21 | 110.766 | 3.00 | 1.80810 | 22.76 |
| 22 | −45.578 | 0.90 | 1.73400 | 51.47 |
| 23 | 22.744 | 3.78 | | |
| 24 | −42.343 | 0.90 | 1.75500 | 52.32 |
| 25 | 57.537 | 3.30 | | |
| 26 | 65.519 | 6.70 | 1.72825 | 28.46 |
| 27 | −29.177 | 2.20 | 1.92286 | 20.88 |
| 28 | −84.818 | 0.20 | | |
| 29 | 52.681 | 7.50 | 1.73800 | 32.26 |
| 30 | −29.458 | 2.30 | 1.94595 | 17.98 |
| 31 | −65.933 | 34.43 | | |
| Image plane | ∞ | | | |

Aspherical surface data

10th surface $k = 0.000$
$A4 = -1.87010e-07, A6 = -9.22454e-11, A8 = -2.58615e-14,$
$A10 = -1.88249e-18$

Various data

| | | |
|---|---|---|
| 2ω | 3.17 | |
| LTL (in air) | 249.84 | |
| BF (in air) | 34.43 | |

| | Infinite | Close |
|---|---|---|
| OB | ∞ | 2.0 |
| f | 392.31 | |
| FNO. | 4.10 | 3.08 |
| d14 | 17.00 | 38.51 |
| d17 | 29.11 | 7.61 |

Unit focal length

| f1 = 169.56 | f2 = −53.60 | f3 = 125.74 |
|---|---|---|

Example 5

Unit mm

Surface data

| Surface no. | r | d | nd | νd |
|---|---|---|---|---|
| Object plane | ∞ | ∞ | | |
| 1 | 176.410 | 11.80 | 1.48749 | 70.23 |
| 2 | 7536.733 | 56.55 | | |
| 3 | 73.129 | 12.80 | 1.43875 | 94.66 |
| 4 | 259.055 | 22.50 | | |
| 5 | 183.060 | 3.80 | 1.80400 | 46.58 |
| 6 | 48.554 | 11.00 | 1.43875 | 94.66 |
| 7 | 215.281 | 1.77 | | |
| 8 | 81.117 | 12.20 | 1.43875 | 94.66 |
| 9 | −78.333 | 3.00 | 1.69680 | 55.53 |
| 10* | −2742.043 | 24.05 | | |
| 11 | 19969.113 | 8.00 | 1.71736 | 29.52 |
| 12 | −41.541 | 2.70 | 1.90366 | 31.32 |
| 13 | −123.414 | 3.01 | | |
| 14(Stop) | ∞ | Variable | | |
| 15 | 242.169 | 2.10 | 1.80810 | 22.76 |
| 16 | −188.776 | 0.85 | 1.80400 | 46.58 |
| 17 | 35.654 | Variable | | |
| 18 | 33.489 | 1.00 | 1.92286 | 20.88 |
| 19 | 26.971 | 5.00 | 1.48749 | 70.23 |
| 20 | −129.495 | 3.60 | | |
| 21 | 171.575 | 3.00 | 1.80810 | 22.76 |
| 22 | −47.173 | 0.90 | 1.69680 | 55.53 |
| 23 | 21.371 | 4.15 | | |
| 24 | −37.614 | 0.95 | 1.69680 | 55.53 |
| 25 | 100.740 | 3.45 | | |
| 26 | 46.849 | 8.00 | 1.73800 | 32.26 |
| 27 | −35.843 | 2.50 | 1.92286 | 20.88 |
| 28 | −77.161 | 0.20 | | |
| 29 | 71.260 | 7.50 | 1.73800 | 32.26 |
| 30 | −29.082 | 2.30 | 1.92286 | 20.88 |
| 31 | −110.729 | 33.91 | | |
| Image plane | ∞ | | | |

Aspherical surface data

10th surface k = 0.000
A4 = −2.81590e−07, A6 = −1.14446e−10, A8 = −1.72838e−14

Various data

| 2ω | 3.17 |
|---|---|
| LTL (in air) | 299.31 |
| BF (in air) | 33.91 |

| | Infinite | Close |
|---|---|---|
| OB | ∞ | 2.0 |
| f | 392.27 | |
| FNO. | 4.09 | 3.08 |
| d14 | 19.00 | 39.81 |
| d17 | 27.73 | 6.91 |

Unit focal length

| f1 = 169.65 | f2 = −52.44 | f3 = 132.66 |
|---|---|---|

Example 6

Unit mm

Surface data

| Surface no. | r | d | nd | νd |
|---|---|---|---|---|
| Object plane | ∞ | ∞ | | |
| 1 | 168.991 | 13.00 | 1.48749 | 70.23 |
| 2 | 9000.000 | 1.39 | | |
| 3 | 65.865 | 19.40 | 1.43875 | 94.66 |
| 4* | 419.394 | 16.30 | | |
| 5 | 172.634 | 3.40 | 1.75700 | 47.82 |
| 6 | 43.573 | 15.00 | 1.43875 | 94.66 |
| 7* | 270.883 | 1.76 | | |
| 8 | 58.037 | 11.00 | 1.43875 | 94.66 |
| 9 | 250.512 | 3.00 | 1.69680 | 55.53 |
| 10 | 66.882 | 21.40 | | |
| 11 | 291.719 | 8.00 | 1.74077 | 27.79 |
| 12 | −49.999 | 1.70 | 1.90366 | 31.32 |
| 13 | −544.576 | 8.37 | | |
| 14(Stop) | ∞ | Variable | | |
| 15 | 229.161 | 2.10 | 1.80810 | 22.76 |
| 16 | −88.588 | 0.85 | 1.83481 | 42.73 |
| 17 | 38.358 | Variable | | |
| 18 | 30.771 | 1.00 | 1.92286 | 20.88 |
| 19 | 23.463 | 5.00 | 1.48749 | 70.23 |
| 20 | −115.701 | 3.60 | | |
| 21 | 204.342 | 3.00 | 1.80810 | 22.76 |
| 22 | −38.091 | 0.90 | 1.73400 | 51.47 |
| 23 | 23.848 | 3.82 | | |
| 24 | −49.321 | 0.90 | 1.75500 | 52.32 |
| 25 | 62.836 | 3.30 | | |
| 26 | 53.599 | 7.08 | 1.69895 | 30.13 |
| 27 | −33.176 | 2.20 | 1.92286 | 20.88 |
| 28 | −77.635 | 0.20 | | |
| 29 | 57.993 | 8.20 | 1.73800 | 32.26 |
| 30 | −32.242 | 2.30 | 1.94595 | 17.98 |
| 31 | −83.902 | 38.08 | | |
| Image plane | ∞ | | | |

Aspherical surface data

4th surface k = 0.000
A4 = 9.61190e−08, A6 = −5.51230e−12, A8 = 2.67010e−16,
A10 = 1.00150e−20

7th surface k = 0.000
A4 = 1.25620e−11, A6 = −9.90000e−13

Various data

| 2ω | 3.16 |
|---|---|
| LTL (in air) | 253.63 |
| BF (in air) | 38.08 |

| | Infinite | Close |
|---|---|---|
| OB | ∞ | 2.0 |
| f | 394.97 | |
| FNO. | 4.15 | 3.08 |
| d14 | 17.00 | 39.81 |
| d17 | 30.38 | 7.57 |

Unit focal length

| f1 = 174.46 | f2 = −54.30 | f3 = 123.41 |
|---|---|---|

| Unit mm | | | | |
|---|---|---|---|---|
| Surface data | | | | |
| Surface no. | r | d | nd | vd |
| Object plane | ∞ | ∞ | | |
| 1 | 199.403 | 15.77 | 1.49700 | 81.54 |
| 2 | 46599.850 | 3.07 | | |
| 3 | 100.225 | 17.41 | 1.43875 | 94.66 |
| 4 | 268.381 | 16.70 | | |
| 5 | 143.050 | 5.05 | 1.77250 | 49.60 |
| 6 | 65.168 | 15.77 | 1.43875 | 94.66 |
| 7 | 157.327 | 5.12 | | |
| 8 | 135.151 | 14.85 | 1.43875 | 94.66 |
| 9 | −218.317 | 4.10 | 1.69680 | 55.53 |
| 10* | 439.800 | 73.27 | | |
| 11 | 197.209 | 6.15 | 1.63980 | 34.46 |
| 12 | −86.596 | 2.56 | 1.91082 | 35.25 |
| 13 | −636.111 | 3.38 | | |
| 14(Stop) | ∞ | Variable | | |
| 15 | 358.427 | 2.25 | 1.80810 | 22.76 |
| 16 | −89.251 | 0.92 | 1.77250 | 49.60 |
| 17 | 37.508 | Variable | | |
| 18 | 41.374 | 1.02 | 1.85478 | 24.80 |
| 19 | 28.580 | 5.12 | 1.52249 | 59.84 |
| 20 | −125.525 | 3.69 | | |
| 21 | 78.814 | 3.18 | 1.80810 | 22.76 |
| 22 | −74.237 | 0.92 | 1.67790 | 55.34 |
| 23 | 21.407 | 5.03 | | |
| 24 | −34.836 | 0.92 | 1.77250 | 49.60 |
| 25 | 712.849 | 3.38 | | |
| 26 | 44.044 | 6.86 | 1.67300 | 38.15 |
| 27 | −35.953 | 2.25 | 1.94595 | 17.98 |
| 28 | −68.568 | 10.55 | | |
| 29 | 106.705 | 6.66 | 1.72825 | 28.46 |
| 30 | −28.312 | 2.36 | 1.92286 | 20.88 |
| 31 | −97.698 | 36.97 | | |
| Image plane | ∞ | | | |

Aspherical surface data
10th surface k = 0.000
A4 = −2.11617e−08, A6 = −3.31730e−12, A8= −4.83617e−17

| Various data | | |
|---|---|---|
| 2ω | | 2.54 |
| LTL (in air) | | 318.01 |
| BF (in air) | | 36.97 |
| | Infinite | Close |
| OB | ∞ | 3.5 |
| f | 490.00 | |
| FNO. | 4.07 | 3.08 |
| d14 | 17.92 | 35.28 |
| d17 | 24.79 | 7.43 |

| Unit focal length | | |
|---|---|---|
| f1 = 213.87 | f2 = −56.00 | f3 = 133.11 |

Example 8

| Unit mm | | | | |
|---|---|---|---|---|
| Surface data | | | | |
| Surface no. | r | d | nd | vd |
| Object plane | ∞ | ∞ | | |
| 1 | 258.546 | 10.00 | 1.48749 | 70.23 |
| 2 | −1406.852 | 2.00 | | |
| 3 | 80.992 | 17.00 | 1.49700 | 81.54 |

-continued

| Unit mm | | | | |
|---|---|---|---|---|
| 4 | 837.994 | 0.70 | 1.60000 | 41.00 |
| 5* | 225.921 | 53.21 | | |
| 6 | 124.468 | 3.20 | 1.83481 | 42.73 |
| 7 | 44.039 | 11.00 | 1.43875 | 94.66 |
| 8 | 147.154 | 0.40 | | |
| 9 | 53.474 | 9.80 | 1.43875 | 94.66 |
| 10 | −114.559 | 2.90 | 1.77250 | 49.60 |
| 11 | 115.702 | 25.05 | | |
| 12 | 107.147 | 7.80 | 1.71736 | 29.52 |
| 13 | −77.114 | 2.00 | 1.91082 | 35.25 |
| 14 | −665.155 | 3.33 | | |
| 15(Stop) | ∞ | Variable | | |
| 16 | 278.186 | 2.10 | 1.80810 | 22.76 |
| 17 | −100.028 | 0.80 | 1.71300 | 53.87 |
| 18 | 32.155 | Variable | | |
| 19 | 39.029 | 5.40 | 1.43875 | 94.66 |
| 20 | −97.053 | 3.91 | | |
| 21 | 43.671 | 2.45 | 1.92286 | 20.88 |
| 22 | 158.301 | 0.90 | 1.61800 | 63.40 |
| 23 | 17.805 | 3.92 | | |
| 24 | −43.778 | 0.90 | 1.69680 | 55.53 |
| 25 | 84.322 | 3.31 | | |
| 26 | 37.705 | 8.04 | 1.74951 | 35.33 |
| 27 | −35.693 | 1.80 | 1.92286 | 20.88 |
| 28 | 63.424 | 0.30 | | |
| 29 | 41.873 | 8.63 | 1.74077 | 27.79 |
| 30 | −23.209 | 2.30 | 1.92286 | 20.88 |
| 31 | −60.070 | 32.98 | | |
| Image plane | ∞ | | | |

Aspherical surface data

5th surface k = 0.000
A4 = −7.35194e−09, A6 = −6.59690e−13, A8 = −2.29181e−17

| Various data | | |
|---|---|---|
| 2ω | | 3.19 |
| LTL (in air) | | 270.58 |
| BF (in air) | | 32.98 |
| | Infinite | Close |
| OB | ∞ | 2.5 |
| f | 391.98 | |
| FNO. | 4.08 | 3.08 |
| d15 | 21.25 | 40.93 |
| d18 | 23.21 | 3.53 |

| Unit focal length | | |
|---|---|---|
| f1 = 189.60 | f2 = −54.93 | f3 = 146.93 |

Example 9

| Unit mm | | | | |
|---|---|---|---|---|
| Surface data | | | | |
| Surface no. | r | d | nd | vd |
| Object plane | ∞ | ∞ | | |
| 1 | 177.711 | 10.00 | 1.48749 | 70.23 |
| 2 | 793.260 | 2.00 | | |
| 3 | 78.980 | 16.43 | 1.49700 | 81.54 |
| 4 | 299.016 | 0.60 | 1.59400 | 37.00 |
| 5* | 179.309 | 50.95 | | |
| 6 | 97.480 | 3.20 | 1.88300 | 40.76 |
| 7 | 46.776 | 11.00 | 1.43875 | 94.66 |
| 8 | 180.780 | 0.49 | | |
| 9 | 58.028 | 9.80 | 1.43875 | 94.66 |

-continued

Unit mm

| | | | | |
|---|---|---|---|---|
| 10 | -139.658 | 2.90 | 1.77250 | 49.60 |
| 11 | 94.709 | 24.89 | | |
| 12 | 141.605 | 7.80 | 1.71736 | 29.52 |
| 13 | -56.955 | 2.00 | 1.91082 | 35.25 |
| 14 | -319.657 | 6.32 | | |
| 15(Stop) | ∞ | Variable | | |
| 16 | 82.322 | 2.10 | 1.80810 | 22.76 |
| 17 | 1055.833 | 0.80 | 1.71300 | 53.87 |
| 18 | 27.027 | Variable | | |
| 19 | 32.290 | 5.40 | 1.43875 | 94.66 |
| 20 | -136.369 | 3.91 | | |
| 21 | 73.473 | 2.45 | 1.92286 | 20.88 |
| 22 | -303.723 | 0.90 | 1.61800 | 63.40 |
| 23 | 17.128 | 3.92 | | |
| 24 | -30.056 | 0.90 | 1.69680 | 55.53 |
| 25 | 3912.663 | 3.31 | | |
| 26 | 38.071 | 5.66 | 1.74951 | 35.33 |
| 27 | -35.888 | 1.80 | 1.92286 | 20.88 |
| 28 | 99.292 | 0.30 | | |
| 29 | 57.696 | 8.63 | 1.69895 | 30.13 |
| 30 | -21.800 | 2.30 | 1.92286 | 20.88 |
| 31 | -41.571 | 32.97 | | |
| Image plane | ∞ | | | |

Aspherical surface data

5th surface k = 0.000
A4 = -2.72668e-09, A6 = -4.53214e-13, A8 = -1.03931e-16

Various data

| | |
|---|---|
| 2ω | 3.22 |
| LTL (in air) | 270.57 |
| BF (in air) | 32.97 |

| | Infinite | Close |
|---|---|---|
| OB | ∞ | 2.5 |
| f | 391.96 | |
| FNO. | 4.08 | 3.08 |
| d15 | 21.38 | 43.94 |
| d18 | 25.46 | 2.89 |

Unit focal length

| | | |
|---|---|---|
| f1 = 196.37 | f2 = -61.60 | f3 = 139.64 |

The values of the conditional expressions in Examples are listed below. The value of Conditional Expression (9-1), (9-2), and (9-3) are the same as the value of Conditional Expression (9).

| | Example 1 | Example 2 | Example 3 |
|---|---|---|---|
| (1)ΔGFGR/f | 0.080 | 0.046 | 0.075 |
| (2)DGFoGRo/f | 0.201 | 0.131 | 0.178 |
| (1A)ΔGFGRmax/f | 0.080 | 0.046 | 0.075 |
| (3)vdGFave | 82.445 | 82.445 | 82.445 |
| (4)vdGFmax | 94.660 | 94.660 | 94.660 |
| (5)DGR1GR2/f | 0.048 | 0.061 | 0.064 |
| (6)fGF/f | 0.360 | 0.315 | 0.386 |
| (7)fL1/fGF | 3.187 | 2.837 | 2.379 |
| (8)fGF/fGR1 | -0.436 | -0.650 | -0.439 |
| (9)|fG2/f| | 0.132 | 0.139 | 0.131 |
| (10)|MGG2B$^2$ × (MGG2$^2$ − 1)| | 4.715 | 4.481 | 4.666 |
| (13)|MGISB × (MGIS − 1)| | 2.042 | 1.948 | 1.933 |
| (14)DGFairmax/DGF | 0.529 | 0.060 | 0.325 |
| (15)ΔGFGR/fGF | 0.221 | 0.146 | 0.195 |
| (16)vdLp1 | 70.230 | 70.230 | 70.230 |
| (17)|fG1/fG2| | 3.287 | 3.180 | 3.319 |
| (18)ΣdGF/fGF | 0.335 | 0.270 | 0.265 |
| (19)vdGFnmin | — | — | — |
| (21)|fGFn/fGF| | — | — | — |
| (22)|ΔZah1| | 9.662 | 10.095 | 7.710 |
| (23)|ΔZah1|/|ΔZah2| | 7.660 | 7.540 | 9.463 |

| | Example 4 | Example 5 | Example 6 |
|---|---|---|---|
| (1)ΔGFGR/f | 0.057 | 0.057 | 0.041 |
| (2)DGFoGRo/f | 0.139 | 0.264 | 0.127 |
| (1A)ΔGFGRmax/f | 0.057 | 0.057 | 0.041 |
| (3)vdGFave | 82.445 | 82.445 | 82.445 |
| (4)vdGFmax | 94.660 | 94.660 | 94.660 |
| (5)DGR1GR2/f | 0.070 | 0.061 | 0.054 |
| (6)fGF/f | 0.316 | 0.400 | 0.301 |
| (7)fL1/fGF | 2.417 | 2.359 | 2.971 |
| (8)fGF/fGR1 | -0.575 | -0.423 | -0.722 |
| (9)|fG2/f| | 0.137 | 0.134 | 0.137 |
| (10)|MGG2B$^2$ × (MGG2$^2$ − 1)| | 4.687 | 4.719 | 4.565 |
| (13)|MGISB × (MGIS − 1)| | 2.051 | 2.031 | 2.182 |
| (14)DGFairmax/DGF | 0.031 | 0.697 | 0.041 |
| (15)ΔGFGR/fGF | 0.181 | 0.143 | 0.137 |
| (16)vdLp1 | 70.230 | 70.230 | 70.230 |
| (17)|fG1/fG2| | 3.164 | 3.235 | 3.213 |
| (18)ΣdGF/fGF | 0.258 | 0.517 | 0.284 |
| (19)vdGFnmin | — | — | — |
| (21)|fGFn/fGF| | — | — | — |
| (22)|ΔZah1| | 6.400 | 8.505 | 9.801 |
| (23)|ΔZah1|/|ΔZah2| | 10.649 | 9.499 | 7.431 |

| | Example 7 | Example 8 | Example 9 |
|---|---|---|---|
| (1)ΔGFGR/f | 0.034 | 0.136 | 0.130 |
| (2)DGFoGRo/f | 0.108 | 0.212 | 0.204 |
| (1A)ΔGFGRmax/f | 0.034 | 0.136 | 0.130 |
| (3)vdGFave | 88.100 | 75.885 | 75.885 |
| (4)vdGFmax | 94.660 | 81.540 | 81.540 |
| (5)DGR1GR2/f | 0.150 | 0.064 | 0.064 |
| (6)fGF/f | 0.388 | 0.424 | 0.451 |
| (7)fL1/fGF | 2.121 | 2.701 | 2.641 |
| (8)fGF/fGR1 | -0.357 | -1.058 | -0.931 |
| (9)|fG2/f| | 0.114 | 0.140 | 0.157 |
| (10)|MGG2B$^2$ × (MGG2$^2$ − 1)| | 4.690 | 3.838 | 3.428 |
| (13)|MGISB × (MGIS − 1)| | 2.057 | 1.622 | 1.799 |
| (14)DGFairmax/DGF | 0.085 | 0.067 | 0.069 |
| (15)ΔGFGR/fGF | 0.088 | 0.320 | 0.288 |
| (16)vdLp1 | 81.540 | 70.230 | 70.230 |
| (17)|fG1/fG2| | 3.819 | 3.452 | 3.188 |
| (18)ΣdGF/fGF | 0.191 | 0.179 | 0.164 |
| (19)vdGFnmin | — | 41.000 | 37.000 |
| (21)|fGFn/fGF| | — | 3.103 | 4.270 |
| (22)|ΔZah1| | 2.354 | 1.165 | 0.197 |
| (23)|ΔZah1|/|ΔZah2| | 9.297 | 9.051 | 4.746 |

Figure 19:
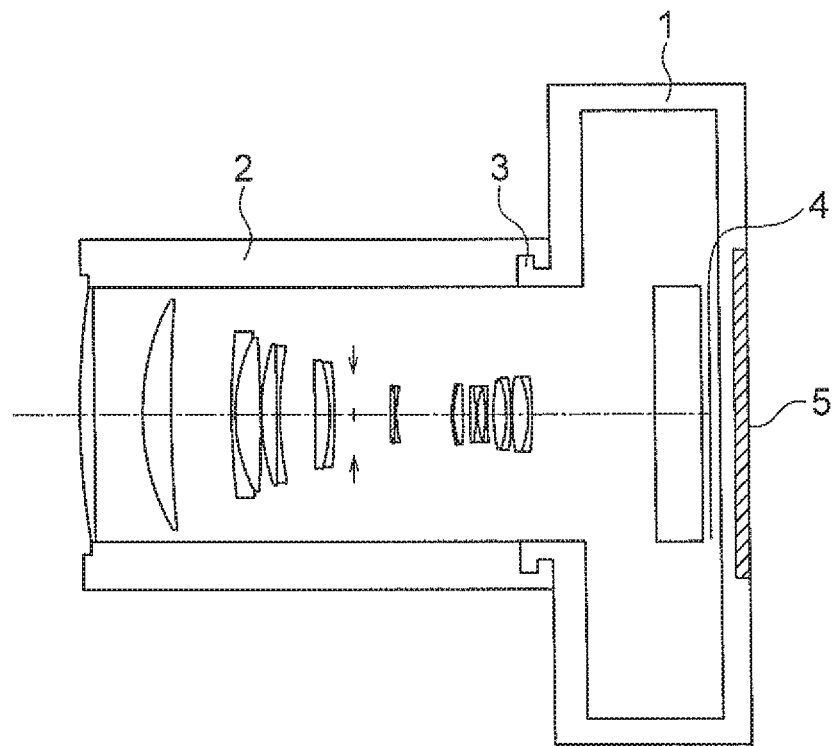
FIG. 19 is a cross-sectional view of an image pickup apparatus.

FIG. 19 is a cross-sectional view of a single-lens mirrorless camera as an electronic image pickup apparatus. In FIG. 19, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the image forming lens system described in any one of the examples from the first example to the nine example is to be used.

Figure 20:
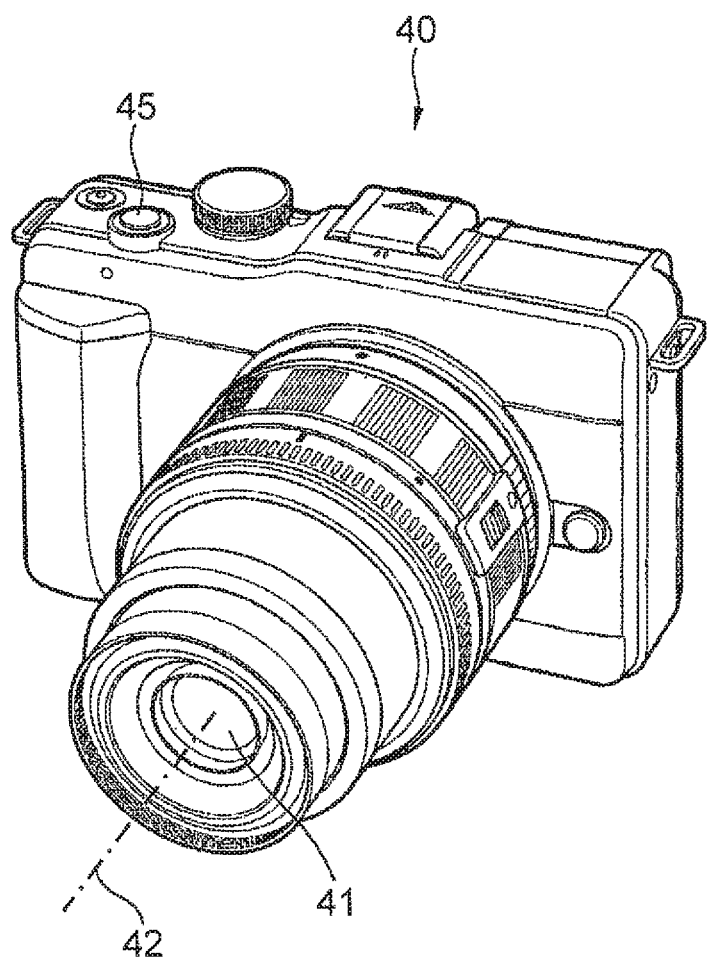
FIG. 20 is a front perspective view of the image pickup apparatus.
Figure 21:
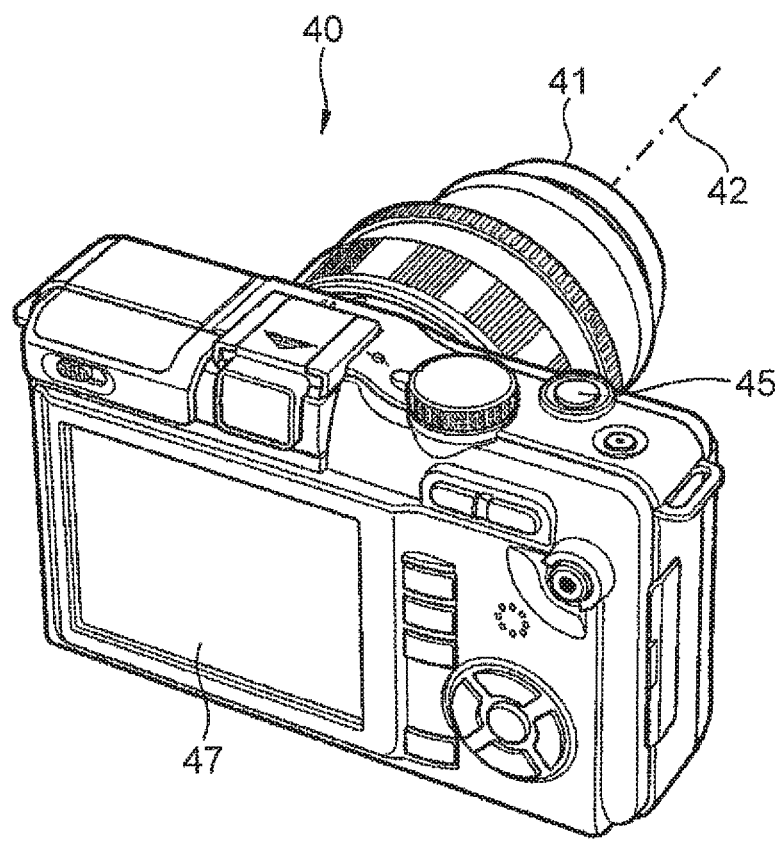
FIG. 21 is a rear perspective view of the image pickup apparatus.

FIG. 20 and FIG. 21 are conceptual diagrams of an arrangement of the image pickup apparatus. FIG. 20 is a front perspective view of a digital camera 40 as the image pickup apparatus, and FIG. 21 is a rear perspective view of the digital camera 40. The image forming lens system according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the image forming lens system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

FIG. 22 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 22, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

The present invention can have various modified examples without departing from the scope of the invention. Moreover, shapes of lenses and the number of lenses are not necessarily restricted to the shapes and the number of lenses indicated in the examples. In the examples described heretofore, the cover glass may not be disposed necessarily. A lens that is not shown in the diagrams of the examples described above, and that does not have a refractive power practically may be disposed in a lens unit or outside the lens unit.

A lens may be formed of a single material or may be formed of a plurality of materials. Examples of the lens formed of a plurality of glass materials include cemented lenses as well as hybrid lenses and diffractive optical elements as described above. Diffractive optical elements exist, for example, in two forms. In the first form, a diffraction-effect surface is formed on the surface of a lens formed of a single material. In the second form, another material is formed on the surface of a lens formed of a single material and a diffraction-effect surface is formed on the surface of the other material.

The present invention can provide an image forming lens system having excellent portability and in which aberration is corrected favorably, and an image pickup apparatus including the same.

As described above, the present invention is suitable for an image forming lens system having excellent portability and in which aberration is corrected favorably, and for an image pickup apparatus having excellent portability and capable of producing a high-quality image.

What is claimed is:

1. An image forming lens system comprising, in order from an object side to an image side:
   a first lens unit having a positive refractive power;
   a second lens unit having a negative refractive power; and
   a third lens unit,
   wherein:
   the first lens unit includes in order from the object side, a front-side lens unit having a positive refractive power and a rear-side lens unit with an air space interposed therebetween,
   the second lens unit moves by changing respective air spaces on the object side and the image side at a time of focusing, the third lens unit includes a positive lens element,
the rear-side lens unit includes a negative lens element and a positive lens element,
the front-side lens unit has an aspherical surface having a positive refractive power on an axis and in which an absolute value of a radius of curvature in any effective region off the axis is larger than an absolute value of a radius of curvature on the axis on a plane including an optical axis, or
the rear-side lens unit has an aspherical surface having a negative refractive power on an axis and in which an absolute value of a radius of curvature in any effective region off the axis is larger than an absolute value of a radius of curvature on the axis on a plane including an optical axis,
a lens element closest to the object side in the first lens unit is fixed in position, and
the following Conditional Expression (9) is satisfied:

$$0.06 \leq |fG2/f| \leq 0.195 \quad (9)$$

where
fG2 is a focal length of the second lens unit,
f is a longest focal length of the entire image forming lens system at a time of focusing to a furthest distance, and
a lens element is a lens having two refractive surfaces which are an object-side surface and an image-side surface, and having no other refractive surface between the two refractive surfaces.

2. An image forming lens system comprising, in order from an object side to an image side:
a first lens unit having a positive refractive power;
a second lens unit having a negative refractive power; and
a third lens unit,
wherein:
the first lens unit includes in order from the object side, a front-side lens unit having a positive refractive power and a rear-side lens unit with an air space interposed therebetween,
the second lens unit moves by changing respective air spaces on the object side and the image side at a time of focusing,
the third lens unit includes a positive lens element,
the rear-side lens unit includes a negative lens element and a positive lens element,
the front-side lens unit has an aspherical surface having a positive refractive power on an axis and in which an absolute value of a radius of curvature in any effective region off the axis is larger than an absolute value of a radius of curvature on the axis on a plane including an optical axis, or
the rear-side lens unit has an aspherical surface having a negative refractive power on an axis and in which an absolute value of a radius of curvature in any effective region off the axis is larger than an absolute value of a radius of curvature on the axis on a plane including an optical axis,
a lens element closest to the object side in the first lens unit is fixed in position,
an aperture stop that restricts on-axis luminous flux is disposed between the first lens unit and the second lens unit, and
the following Conditional Expression (9-1) is satisfied:

$$0.04 \leq |fG2/f| \leq 0.41 \quad (9\text{-}1)$$

where
fG2 is a focal length of the second lens unit,
f is a longest focal length of the entire image forming lens system at a time of focusing to a furthest distance, and
a lens element is a lens having two refractive surfaces which are an object-side surface and an image-side surface, and having no other refractive surface between the two refractive surfaces.

3. An image forming lens system comprising, in order from an object side to an image side:
a first lens unit having a positive refractive power;
a second lens unit having a negative refractive power; and
a third lens unit,
wherein:
the first lens unit includes in order from the object side, a front-side lens unit having a positive refractive power and a rear-side lens unit with an air space interposed therebetween,
the second lens unit moves by changing respective air spaces on the object side and the image side at a time of focusing,
the third lens unit has a positive lens element,
each lens element in the front-side lens unit is a lens element that satisfies the following Conditional Expression (a),
the rear-side lens unit includes a negative lens element and a positive lens element,
the front-side lens unit has an aspherical surface having a positive refractive power on an axis and in which an absolute value of a radius of curvature in any effective region off the axis is larger than an absolute value of a radius of curvature on the axis on a plane including an optical axis, or
the rear-side lens unit has an aspherical surface having a negative refractive power on an axis and in which an absolute value of a radius of curvature in any effective region off the axis is larger than an absolute value of a radius of curvature on the axis on a plane including an optical axis, and
the following Conditional Expression (1) is satisfied:

$$-0.7 \leq f/f\text{Lens} \quad (a)$$

$$0.015 \leq \Delta GFGR/f \leq 0.25 \quad (1)$$

where
f is a longest focal length of the entire image forming lens system at a time of focusing to a furthest distance,
fLens is a focal length of each lens element in the front-side lens unit,
ΔGFGR is an on-axis air space from an image-side surface in the front-side lens unit to an object-side surface in the rear-side lens unit, and
a lens element is a lens having two refractive surfaces which are an object-side surface and an image-side surface, and having no other refractive surface between the two refractive surfaces.

4. An image forming lens system comprising, in order from an object side to an image side:
a first lens unit having a positive refractive power;
a second lens unit having a negative refractive power; and
a third lens unit,
wherein:
the first lens unit includes in order from the object side, a front-side lens unit having a positive refractive power and a rear-side lens unit with an air space interposed therebetween,
the second lens unit moves by changing respective air spaces on the object side and the image side at a time of focusing, the third lens unit includes a positive lens element,
each lens element in the front-side lens unit does not include a predetermined negative lens element that satisfies the following Conditional Expression (b),
the rear-side lens unit includes a negative lens element and a positive lens element,
the front-side lens unit has an aspherical surface having a positive refractive power on an axis and in which an absolute value of a radius of curvature in any effective region off the axis is larger than an absolute value of a radius of curvature on the axis on a plane including an optical axis, or
the rear-side lens unit has an aspherical surface having a negative refractive power on an axis and in which an absolute value of a radius of curvature in any effective region off the axis is larger than an absolute value of a radius of curvature on the axis on a plane including an optical axis, and
the following Conditional Expression (1) is satisfied:

$$0.02 \leq DNx/\varphi enp \quad (b)$$

$$0.015 \leq \Delta GFGR/f \leq 0.25 \quad (1)$$

where
DNx is a thickness on an optical axis of the predetermined negative lens element,
φenp is a maximum diameter of an entrance pupil of the image forming lens system in a state of achieving a longest focal length at a time of focusing to a furthest distance,
f is a longest focal length of the entire image forming lens system at a time of focusing to a furthest distance,
ΔGFGR is an on-axis air space from an image-side surface in the front-side lens unit to an object-side surface in the rear-side lens unit, and
a lens element is a lens having two refractive surfaces which are an object-side surface and an image-side surface, and having no other refractive surface between the two refractive surfaces.

5. An image forming lens system comprising, in order from an object side to an image side:
a first lens unit having a positive refractive power;
a second lens unit having a negative refractive power; and
a third lens unit,
wherein:
the first lens unit includes in order from the object side, a front-side lens unit having a positive refractive power and a rear-side lens unit with an air space interposed therebetween,
the second lens unit moves by changing respective air spaces on the object side and the image side at a time of focusing,
the third lens unit includes a positive lens element,
the rear-side lens unit includes a negative lens element and a positive lens element,
each lens element in the front-side lens unit is a lens element that satisfies the following Conditional Expression (a), or
each lens element in the front-side lens unit does not include a predetermined negative lens element that satisfies following the Conditional Expression (b), and
the following Conditional Expressions (1), (9-2), and (3″) are satisfied:

$$-0.7 \leq f/fLens \quad (a)$$

$$0.02 \leq DNx/\varphi enp \quad (b)$$

$$0.015 \leq \Delta GFGR/f \leq 0.25 \quad (1)$$

$$0.06 \leq |fG2/f| \leq 0.22 \quad (9\text{-}2)$$

$$77 \leq vdGFave \quad (3'')$$

where
f is a longest focal length of the entire image forming lens system at a time of focusing to a furthest distance,
fLens is a focal length of each lens element in the front-side lens unit,
DNx is a thickness on an optical axis of the predetermined negative lens element,
φenp is a maximum diameter of an entrance pupil of the image forming lens system in a state of achieving a longest focal length at a time of focusing to a furthest distance,
ΔGFGR is an on-axis air space from an image-side surface in the front-side lens unit to an object-side surface in the rear-side lens unit,
fG2 is a focal length of the second lens unit,
vdGFave is an average Abbe number of positive lens elements in the front-side lens unit, and
a lens element is a lens having two refractive surfaces which are an object-side surface and an image-side surface, and having no other refractive surface between the two refractive surfaces.

6. The image forming lens system according to claim 4, wherein the predetermined negative lens element is disposed in any lens unit closer to the image side than the front-side lens unit.

7. The image forming lens system according to claim 1, wherein:
the rear-side lens unit includes a first rear-side lens unit and a second rear-side lens unit with an air space interposed therebetween,
the first rear-side lens unit includes a negative lens element and a positive lens element, and
the second rear-side lens unit includes a positive lens element.

8. The image forming lens system according to claim 1, wherein the following Conditional Expression (1) is satisfied:

$$0.015 \leq \Delta GFGR/f \leq 0.25 \quad (1)$$

where
f is the longest focal length of the entire image forming lens system at a time of focusing to a furthest distance, and
ΔGFGR is an on-axis air space from an image-side surface in the front-side lens unit to an object-side surface in the rear-side lens unit.

9. The image forming lens system according to claim 1, wherein the following Conditional Expression (2) is satisfied:

$$0.10 \leq DGFoGRo/f \leq 0.5 \quad (2)$$

where
DGFoGRo is a distance from a surface closest to the object side in the front-side lens unit to a surface closest to the object side in the rear-side lens unit, and
f is the longest focal length of the entire image forming lens system at a time of focusing to a furthest distance.

10. The image forming lens system according to claim 1, wherein the following Conditional Expression (3) is satisfied:

$$72 \leq vdGFave \quad (3)$$

where
vdGFave is an average Abbe number of positive lens elements in the front-side lens unit, and
a lens element is a lens having two refractive surfaces, namely, an object-side surface and an image-side surface and having no other refractive surface between the two refractive surfaces.

11. The image forming lens system according to claim 1, wherein the following Conditional Expression (4) is satisfied:

$$60 \leq vdGFmax \qquad (4)$$

where
vdGFmax is a largest Abbe number of Abbe numbers of positive lens elements in the front-side lens unit.

12. The image forming lens system according to claim 1, wherein the front-side lens unit has a plurality of the positive lens elements.

13. The image forming lens system according to claim 1, wherein the following Conditional Expression (6) is satisfied:

$$0.2 \leq fGF/f \leq 0.8 \qquad (6),$$

where,
fGF is a focal length of the front-side lens unit; and
f is the longest focal length of the entire image forming lens system at a time of focusing to a furthest distance.

14. The image forming lens system according to claim 1, wherein:
a first lens element is disposed closest to the object, and the following Conditional Expression (7) is satisfied:

$$1.6 \leq fL1/fGF \leq 5.0 \qquad (7),$$

where,
fL1 is a focal length of the first lens element; and
fGF is a focal length of the front-side lens unit.

15. The image forming lens system according to claim 3, wherein the following Conditional Expression (9-3) is satisfied:

$$0.06 \leq |fG2/f| \leq 0.25 \qquad (9\text{-}3),$$

where,
fG2 is a focal length of the second lens unit; and
f is the longest focal length of the entire image forming lens system at a time of focusing to a furthest distance.

16. The image forming lens system according to claim 1, wherein the following Conditional Expression (10) is satisfied:

$$3.0 \leq |MGG2B^2 \times (MGG2^2 - 1)| \leq 6.5 \qquad (10),$$

where,
MGG2B is a lateral magnification of a first rear-side lens system;
MGG2 is a lateral magnification of the second lens unit;
the lateral magnification is a lateral magnification at the time of focusing on an infinite object; and
the first rear-side lens system is a lens system comprising all of lenses positioned closer to an image side than the second lens unit.

17. The image forming lens system according to claim 1, wherein the second lens unit includes two or less lens elements.

18. The image forming lens system according to claim 1, wherein the second lens unit includes a negative lens element and a positive lens element.

19. The image forming lens system according to claim 1, wherein the second lens unit comprises one negative lens element and one positive lens element.

20. The image forming lens system according to claim 1, wherein:
the third lens unit has a camera shake-correction lens unit, and
the camera shake-correction lens unit moves in a direction vertical to an optical axis.

21. The image forming lens system according to claim 1, wherein the third lens unit has:
an object-side sub-lens unit having a positive refractive power,
a camera shake-correction lens unit having a negative refractive power, and
an image-side sub-lens unit having a positive refractive power.

22. The image forming lens system according to claim 1, wherein the aperture stop is disposed on the object side of the second lens unit.

23. The image forming lens system according to claim 1, wherein the aperture stop is disposed between the first lens unit and the second lens unit.

24. The image forming lens system according to claim 1, wherein the aperture stop is disposed between the first rear-side lens unit and the second lens unit.

25. The image forming lens system according to claim 1, wherein the following Conditional Expression (14) is satisfied:

$$0.19 \leq DGFairmax/DGF \leq 1.0 \qquad (14),$$

where,
DGFairmax is a largest axial air space, of axial air spaces in the front-side lens unit; and
DGF is an axial thickness of the front-side lens unit.

26. The image forming lens system according to claim 1, wherein the following Conditional Expression (1A) is satisfied:

$$0.01 \leq \Delta GFGRmax/f \leq 0.2 \qquad (1A)$$

where
f is the longest focal length of the entire image forming lens system at a time of focusing to a furthest distance, and
$\Delta GFGRmax$ is a largest on-axis air space of on-axis air spaces from an image-side surface in the front-side lens unit to an object-side surface in the rear-side lens unit.

27. The image forming lens system according to claim 1, wherein the following Conditional Expression (15) is satisfied:

$$0.05 \leq \Delta GFGR/fGF \leq 0.4 \qquad (15)$$

where
$\Delta GFGR$ is an on-axis air space from an image-side surface in the front-side lens unit to an object-side surface in the rear-side lens unit, and
fGF is a focal length of the front-side lens unit.

28. The image forming lens system according to claim 1, wherein the following Conditional Expression (16) is satisfied:

$$50 \leq vdLp1 \qquad (16),$$

where,
vdLp1 is an Abbe number of a positive lens element positioned closest to the object.

29. The image forming lens system according to claim 1, wherein the front-side lens unit comprises two positive lens elements.

30. The image forming lens system according to claim 1, wherein the first rear-side lens unit has at least two negative lenses.

31. The image forming lens system according to claim 1, wherein the following Conditional Expression (17) is satisfied:

$$1.5 \leq |fG1/fG2| \leq 6.5 \quad (17)$$

where, fG1 is a focal length of the first lens unit; and
fG2 is the focal length of the second lens unit.

32. The image forming lens system according to claim 1, wherein the third lens unit includes a positive lens element and a negative lens element.

33. The image forming lens system according to claim 1, wherein the following Conditional Expression (18) is satisfied:

$$0.12 \leq \Sigma dGF/fGF \leq 0.7 \quad (18)$$

where

ΣdGF is a total thickness of the front-side lens unit, and
fGF is a focal length of the front-side lens unit.

34. The image forming lens system according to claim 1, wherein the following Conditional Expression (19) is satisfied:

$$15 \leq vdGFn\min \leq 57 \quad (19)$$

where vdGFnmin is a smallest Abbe number of Abbe numbers of negative lens elements in the front-side lens unit.

35. The image forming lens system according to claim 1, wherein a negative lens element in the front-side lens unit is a resin lens.

36. The image forming lens system according to claim 1, wherein the following Conditional Expression (21) is satisfied:

$$2.2 \leq |fGFn/fGF| \leq 6.5 \quad (21)$$

where fGFn is a focal length of any given negative lens element in the front-side lens unit, and
fGF is a focal length of the front-side lens unit.

37. The image forming lens system according to claim 1, wherein a distance between the front-side lens unit and the first rear-side lens unit and a distance between the first rear-side lens unit and the second rear-side lens unit are always constant.

38. The image forming lens system according to claim 1, wherein the front-side lens unit includes a lens element located closer to the object side than the predetermined negative lens element that satisfies following Conditional Expression (b-1):

$$0.025 \leq DNx/\varphi enp \quad (b-1)$$

where

DNx is a thickness on an optical axis of the predetermined negative lens element, and
φenp is a maximum diameter of an entrance pupil of the image forming lens system in a state of achieving a longest focal length at a time of focusing to a furthest distance.

39. The image forming lens system according to claim 1, wherein the first rear-side lens unit has an aspherical surface having a negative refractive power on an axis and in which an absolute value of a radius of curvature in any effective region off the axis is larger than an absolute value of a radius of curvature on the axis on a plane including an optical axis.

40. The image forming lens system according to claim 1, wherein a lens element closest to the object side in the first lens unit is fixed in position.

41. The image forming lens system according to claim 1, wherein a lens unit located closest to the image side is fixed in all states.

42. The image forming lens system according to claim 1, wherein an aperture stop is fixed in position in all states.

43. The image forming lens system according to claim 1, wherein the first lens unit is fixed in all states.

44. The image forming lens system according to claim 1, wherein only the second lens unit moves in an optical axis direction.

45. The image forming lens system according to claim 1, wherein the following Conditional Expression (22) is satisfied:

$$0.01 \leq |\Delta Zah1| \leq 20 \quad (22)$$

where $$\Delta Zah1 = 1000 \times N \times (\Delta Zasph1/h1),$$

h1 is a maximum height of on-axis subordinate light rays in the aspherical surface,
ΔZasph1 is a difference between the aspherical surface and a reference spherical surface that is measured in a direction horizontal to an optical axis at the maximum height, where the reference spherical surface is set such that its radius is a paraxial radius of curvature of the aspherical surface and its surface top is a surface top of the aspherical surface, and
N is a refractive index on d Line of a lens element having the aspherical surface.

46. The image forming lens system according to claim 1, wherein the following Conditional Expression (23) is satisfied:

$$5 \leq |\Delta Zah1|/|\Delta Zah2| \leq 40 \quad (23)$$

where $$\Delta Zah1 = 1000 \times N \times (\Delta Zasph1/h1),$$

$$\Delta Zah2 = 1000 \times N \times (\Delta Zasph2/h2),$$

h1 is a maximum height of on-axis subordinate light rays in the aspherical surface,
h2 is a height half the maximum height,
ΔZasph1 is a difference between the aspherical surface and a reference spherical surface that is measured in a direction horizontal to an optical axis at the maximum height, where the reference spherical surface is set such that its radius is a paraxial radius of curvature of the aspherical surface and its surface top is a surface top of the aspherical surface,
ΔZasph2 is a difference between the aspherical surface and the reference spherical surface that is measured in the direction horizontal to an optical axis at a height half the maximum height, and
N is a refractive index on d Line of a lens element having the aspherical surface.

47. The image forming lens system according to claim 1, wherein the front-side lens unit includes a lens element located closer to the object side than the predetermined negative lens element that satisfies following Conditional Expression (b):

$$0.02 \leq DNx/\varphi enp \quad (b)$$

where

DNx is a thickness on an optical axis of the predetermined negative lens element, and φenp is a maximum diameter of an entrance pupil of the image forming lens system in a state of achieving a longest focal length at a time of focusing to a furthest distance.

48. The image forming lens system according to claim 1, wherein the front-side lens unit includes a lens element located closer to the object side than a predetermined negative lens element that satisfies following Conditional Expression (a-1):

$$0.4 \leq |f/fLn| \tag{a-1}$$

where
f is the longest focal length of the entire image forming lens system at a time of focusing to a furthest distance,
fLn is a focal length of the predetermined negative lens element, and
a lens element is a lens having two refractive surfaces which are an object-side surface and an image-side surface, and having no other refractive surface between the two refractive surfaces.

49. The image forming lens system according to claim 1, wherein the front-side lens unit includes a lens located closer to the object side than a predetermined negative lens that satisfies following Conditional Expression (c):

$$0.007 \leq DNx/LTLmin \tag{c}$$

where
DNx is a thickness on an optical axis of the predetermined negative lens element, and
LTLmin is a minimum total length of the image forming lens system.

50. An image pickup apparatus comprising:
an optical system; and
an image pickup element having an image plane and converting an image formed on the image plane by the optical system to an electrical signal,
wherein the optical system is the image forming lens system according to claim 1.

* * * * *